United States Patent
Narisi et al.

(10) Patent No.: US 6,233,619 B1
(45) Date of Patent: May 15, 2001

(54) VIRTUAL TRANSPORT LAYER INTERFACE AND MESSAGING SUBSYSTEM FOR HIGH-SPEED COMMUNICATIONS BETWEEN HETEROGENEOUS COMPUTER SYSTEMS

(75) Inventors: Anthony Narisi, Glenmoore; Michael T. Kain, Chester Springs; Gary Salamon, West Chester; Susan Jennion, Chester Springs; Lois B. Coyne, Lansdale, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/126,920

(22) Filed: Jul. 31, 1998

(51) Int. Cl.[7] .................................... G06F 13/00

(52) U.S. Cl. .................... 709/230; 709/227; 709/250; 709/324; 709/329

(58) Field of Search .................... 709/217, 227, 709/228, 230, 236, 237, 238, 245, 246, 250, 319, 320, 321, 328, 329

(56) References Cited

U.S. PATENT DOCUMENTS

| | | | |
|---|---|---|---|
| 3,400,372 | 9/1968 | Beausoleil et al. | 340/172.5 |
| 4,155,117 | 5/1979 | Mitchell et al. | 364/200 |
| 4,414,620 | 11/1983 | Tsuchimoto et al. | 364/200 |
| 5,093,780 | 3/1992 | Sunahara | 395/800 |
| 5,117,486 | 5/1992 | Clark et al. | 395/250 |
| 5,247,616 | 9/1993 | Berggren et al. | 395/200 |
| 5,265,239 | * 11/1993 | Ardolino | 395/527 |
| 5,321,817 | 6/1994 | Feinstein | 395/325 |
| 5,379,296 | 1/1995 | Johnson et al. | 370/60 |
| 5,381,534 | 1/1995 | Shi | 395/200 |
| 5,459,836 | 10/1995 | Whittaker et al. | 395/200.07 |
| 5,491,693 | * 2/1996 | Britton et al. | 370/401 |

(List continued on next page.)

FOREIGN PATENT DOCUMENTS

| | | |
|---|---|---|
| 0 456 249 | 11/1991 | (EP) . |
| WO 97/01944 | 1/1997 | (WO) . |
| WO 97/28623 | 8/1997 | (WO) . |
| WO 98/56150 | 12/1998 | (WO) . |

OTHER PUBLICATIONS

Chun B N et al: "Virtual Network Transport Protocols for Myrinet" IEEE, Micro, US, IEEE Inc. New York, vol. 18, No. 1, Jan. 1, 1998, pp. 53–63, XP000736974, ISSN: 0272–1732, p. 54–p. 55.
98/56150

*Primary Examiner*—Viet D. Vu
(74) *Attorney, Agent, or Firm*—Rocco L. Adornato; Mark T. Starr; Woodcock Washburn Kurtz Mackiewicz & Norris LLP

(57) ABSTRACT

Methods and apparatus that enable network applications executing on respective directly interconnected computer systems to communicate at high speed, with low latency, over the interconnection therebetween such that both systems may use their native mechanisms to communicate with each other without change in those mechanisms, rather than over conventional network communication paths such as Ethernet. Communication between applications in co-resident, closely coupled processing environments is provided by replacing the conventional TCP transport layer and the conventional IP network layer with a reliable messaging subsystem ("MSS") for data transfers between the closely coupled systems which provides an interface which is independent of the communication protocol of the interconnect and a virtual transport layer ("VTL") which simulates a known transport layer protocol, such as TCP/IP, to the network applications. MSS is a system interconnect independent messaging transport which presents to its users many different delivery and notification mechanisms for the transfer of both control and data information between different heterogeneous environments, while VTL uses the MSS connection to provide a consistent, interconnect independent interface to the session layer.

15 Claims, 49 Drawing Sheets

U.S. PATENT DOCUMENTS

| | | | | |
|---|---|---|---|---|
| 5,537,417 | * | 7/1996 | Sharma et al. | 709/228 |
| 5,561,806 | | 10/1996 | Fitchett et al. | 395/800 |
| 5,581,709 | | 12/1996 | Ito et al. | 395/200.15 |
| 5,581,741 | | 12/1996 | Clark et al. | 395/500 |
| 5,590,281 | * | 12/1996 | Stevens | 709/227 |
| 5,612,953 | | 3/1997 | Olnowich | 370/367 |
| 5,634,015 | | 5/1997 | Chang et al. | 395/309 |
| 5,648,965 | | 7/1997 | Thadani et al. | 370/241 |
| 5,655,140 | | 8/1997 | Haddock | 395/200 |
| 5,669,002 | | 9/1997 | Buch | 395/726 |
| 5,701,423 | | 12/1997 | Crozier | 395/335 |
| 5,734,865 | * | 3/1998 | Yu | 709/250 |
| 5,802,053 | * | 9/1998 | Bollella et al. | 370/401 |

* cited by examiner

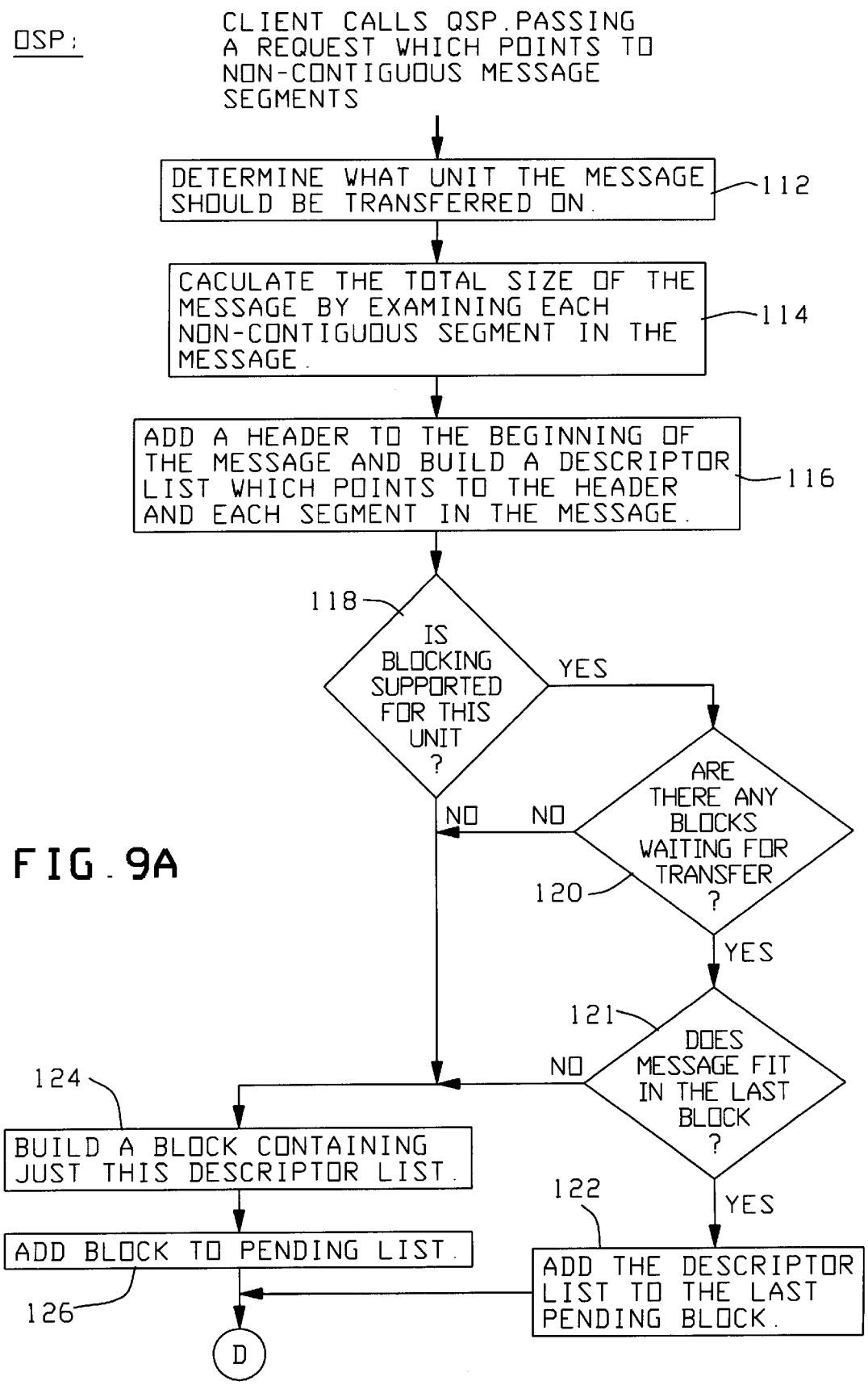

EMULATION-BASED OUTPUT DATA TRANSFER FLOW DIAGRAM

EMULATION-BASED INPUT TRANSFER FLOW DIAGRAM

— DATA REFERENCE
→ DATA MOVEMENT

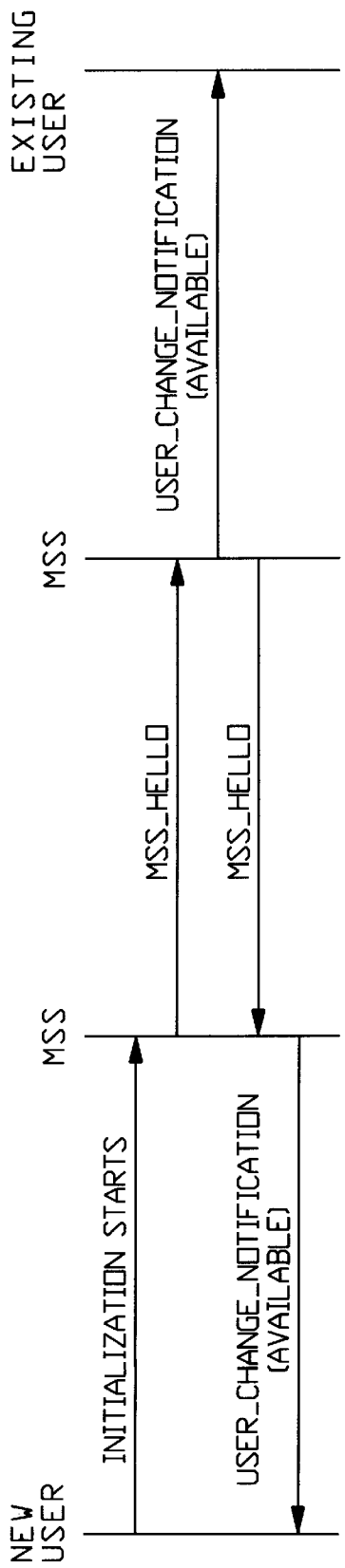
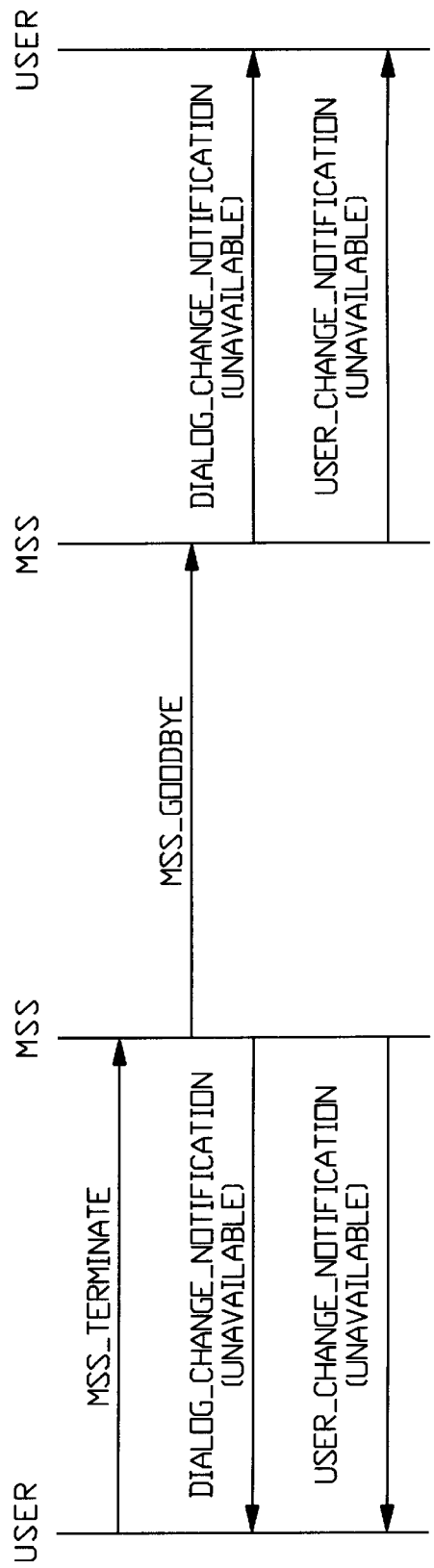
FIG. 18 MSS INITIALIZATION/GREETING
FIG. 19 MSS TERMINATION

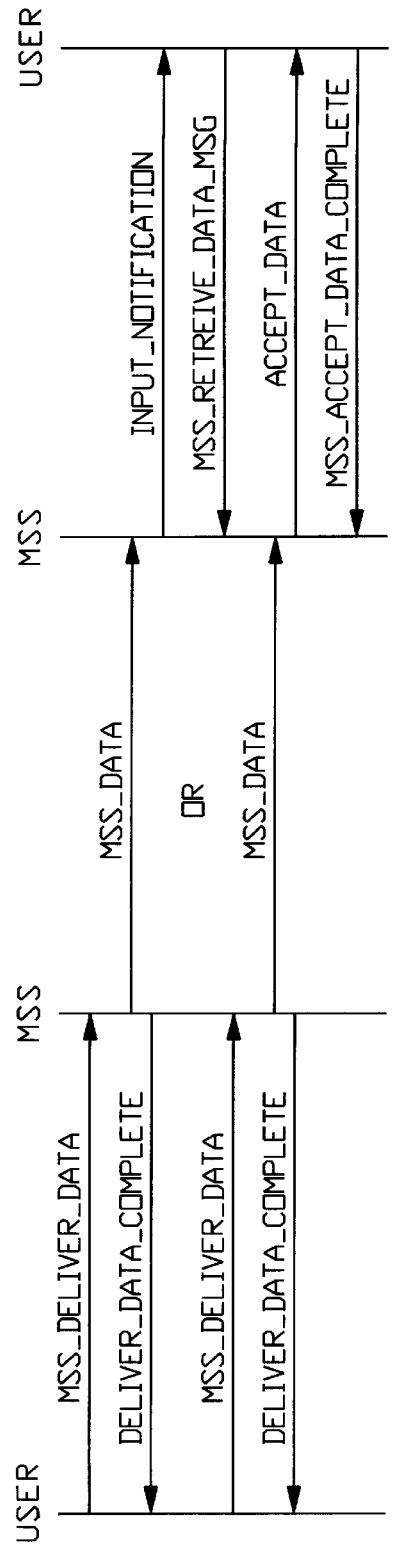
FIG. 20 MSS DATA TRANSFER
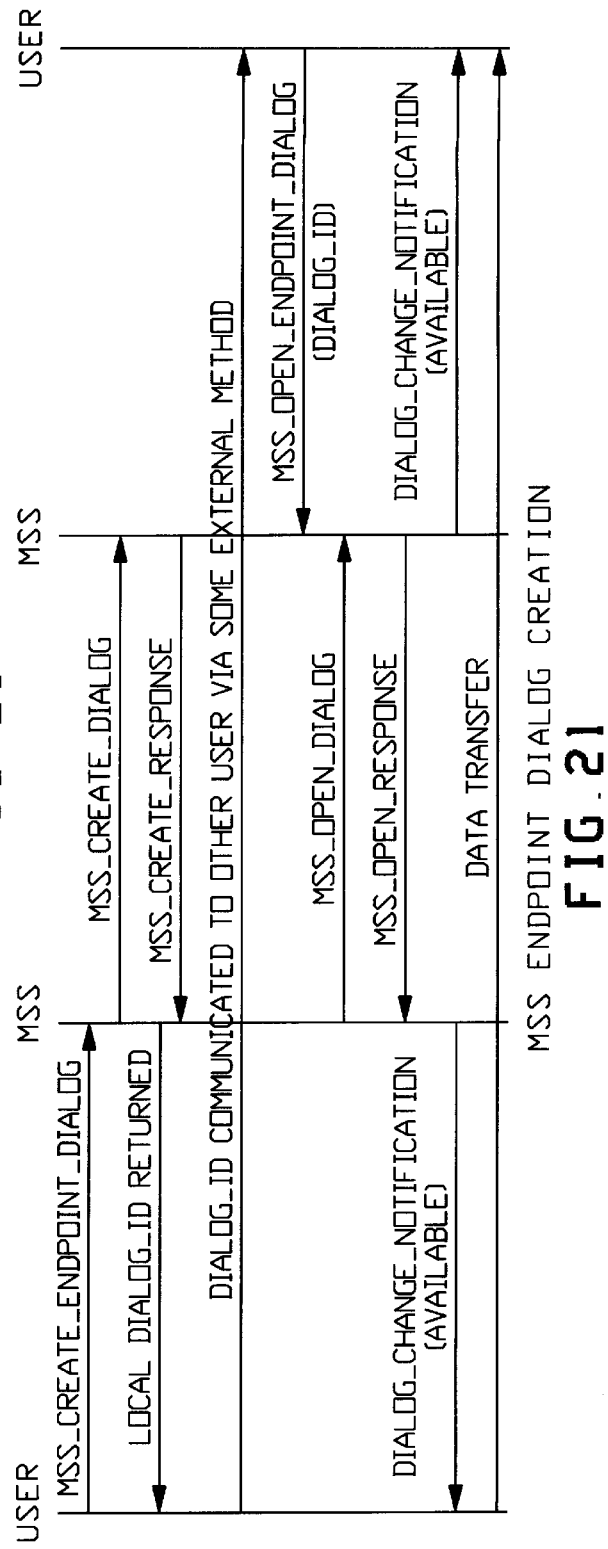
FIG. 21 MSS ENDPOINT DIALOG CREATION

MSS ENDPOINT DIALOG TERMINATION (NORMAL CLOSE)

MSS ENDPOINT DIALOG TERMINATION (DESTROY)

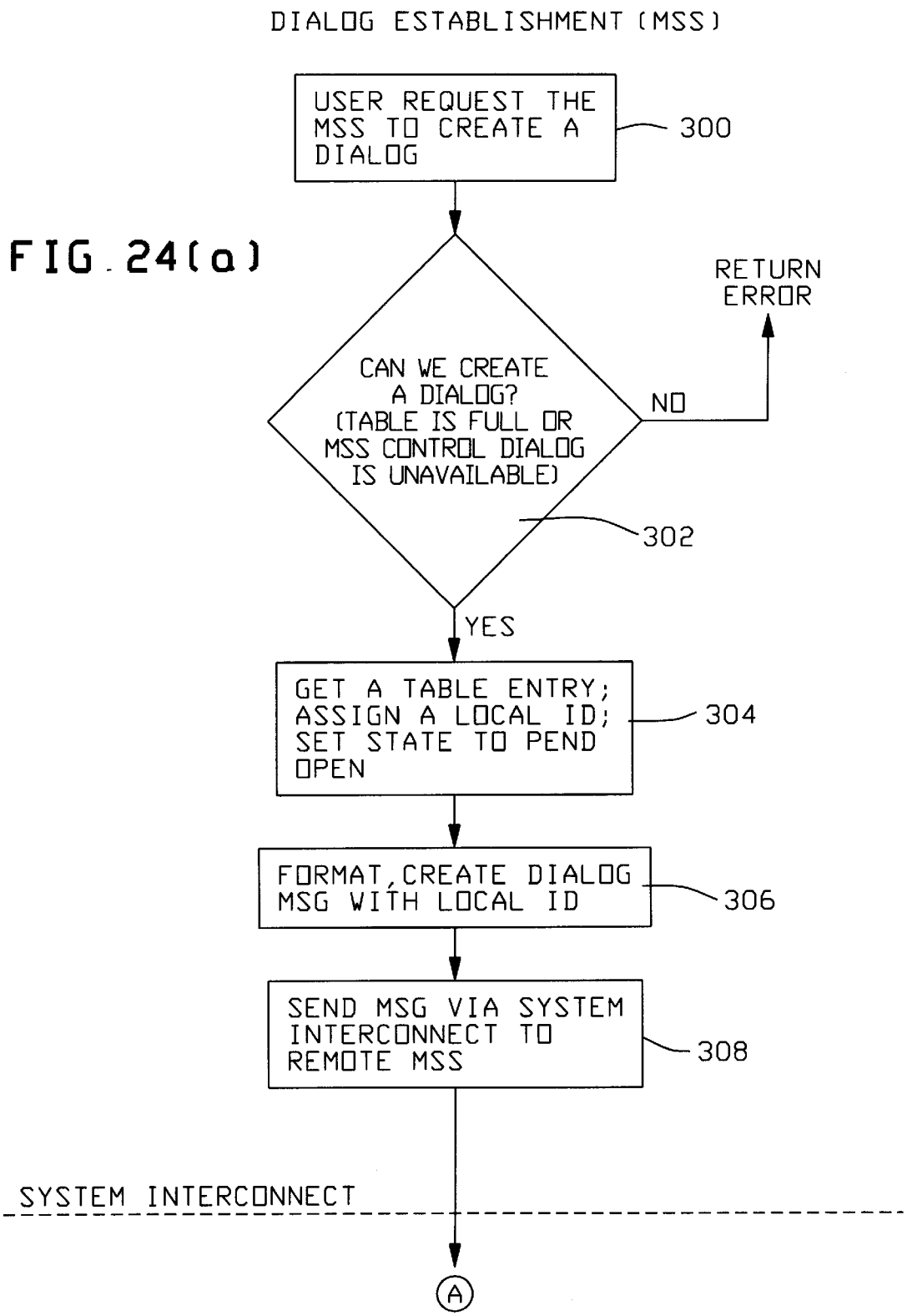

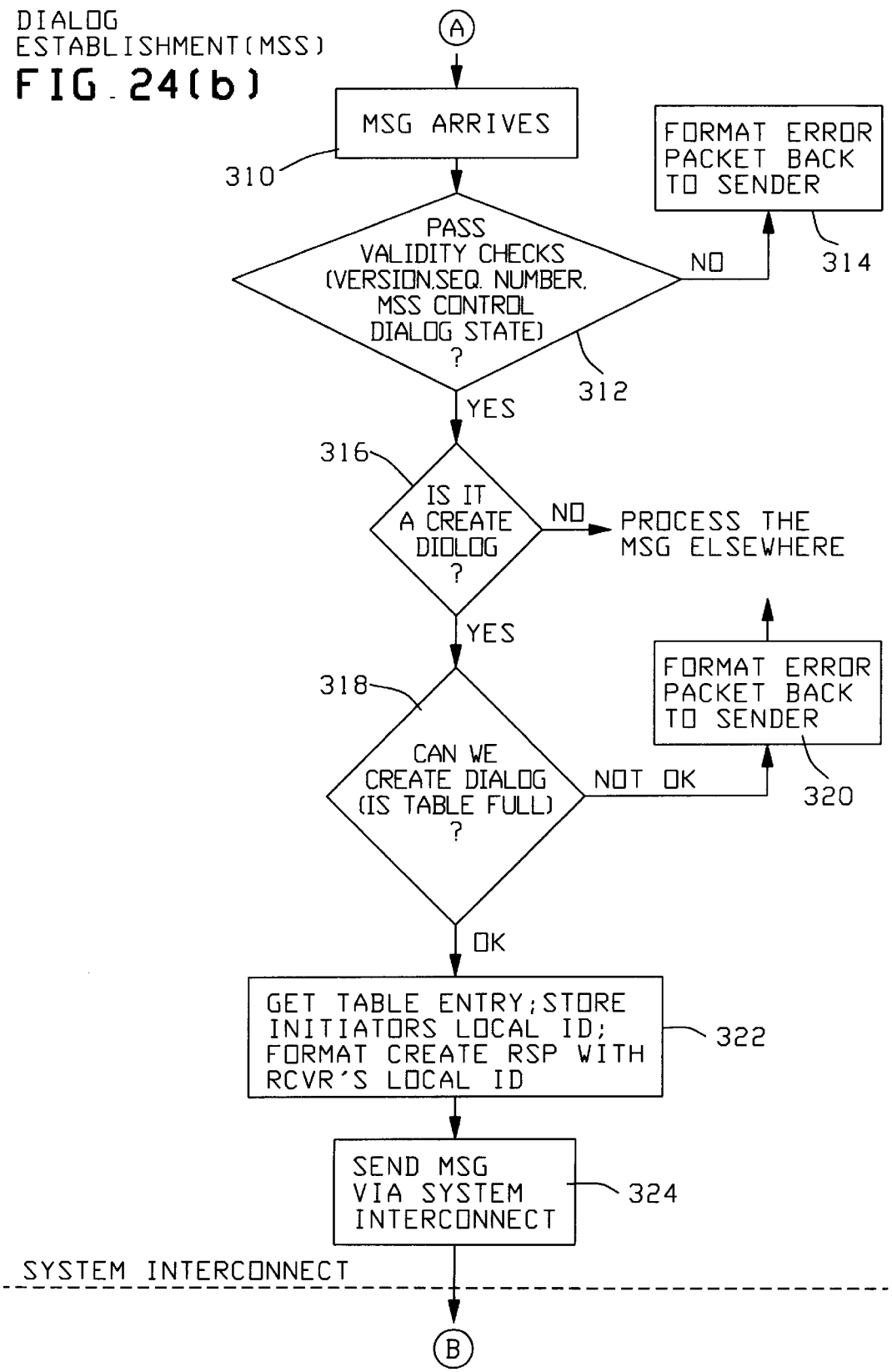
FIG. 24(b) DIALOG ESTABLISHMENT (MSS)

DIALOG ESTABLISHMENT(MSS)

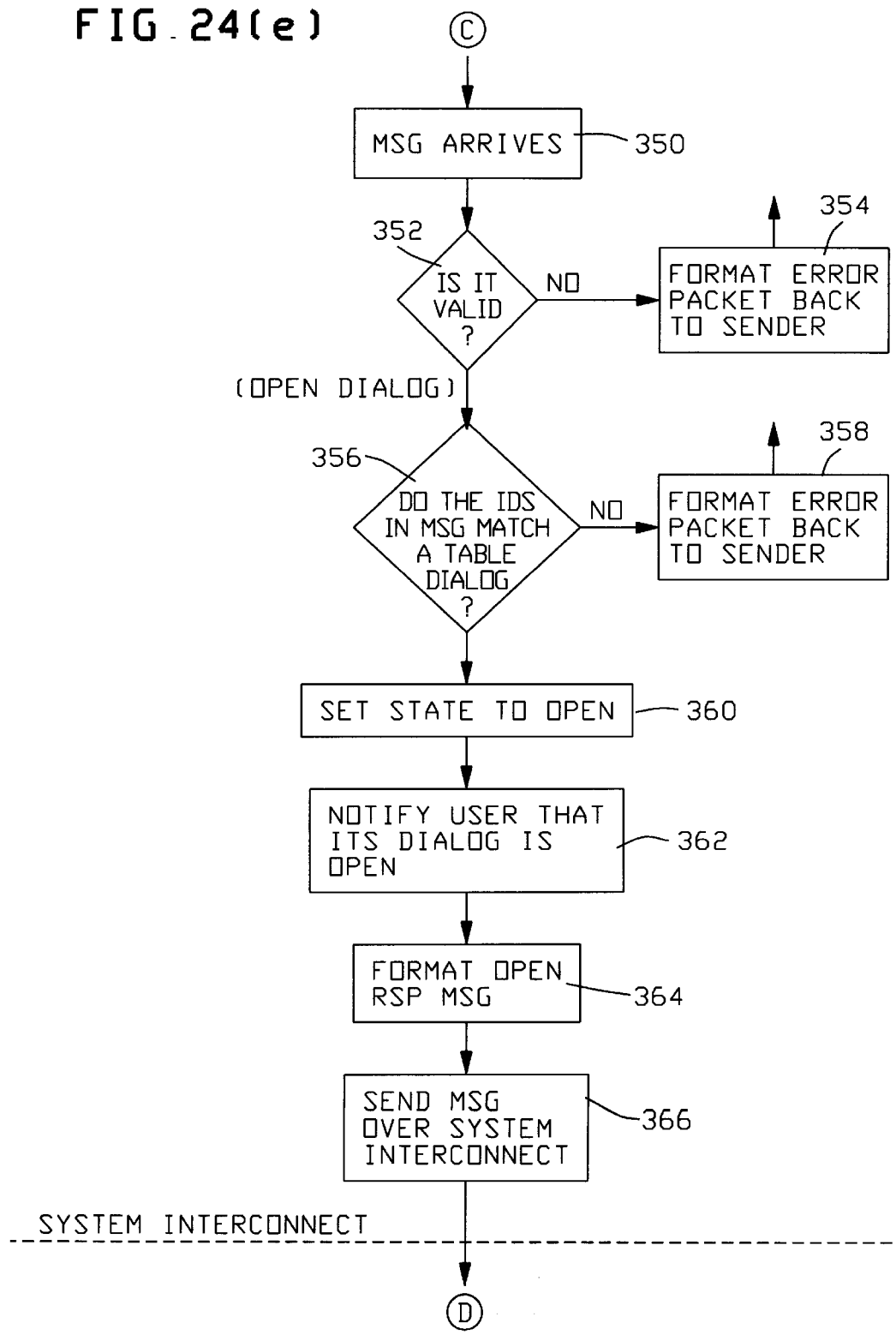
FIG. 24(e) DIALOG ESTABLISHMENT

DIALOG ESTABLISHMENT

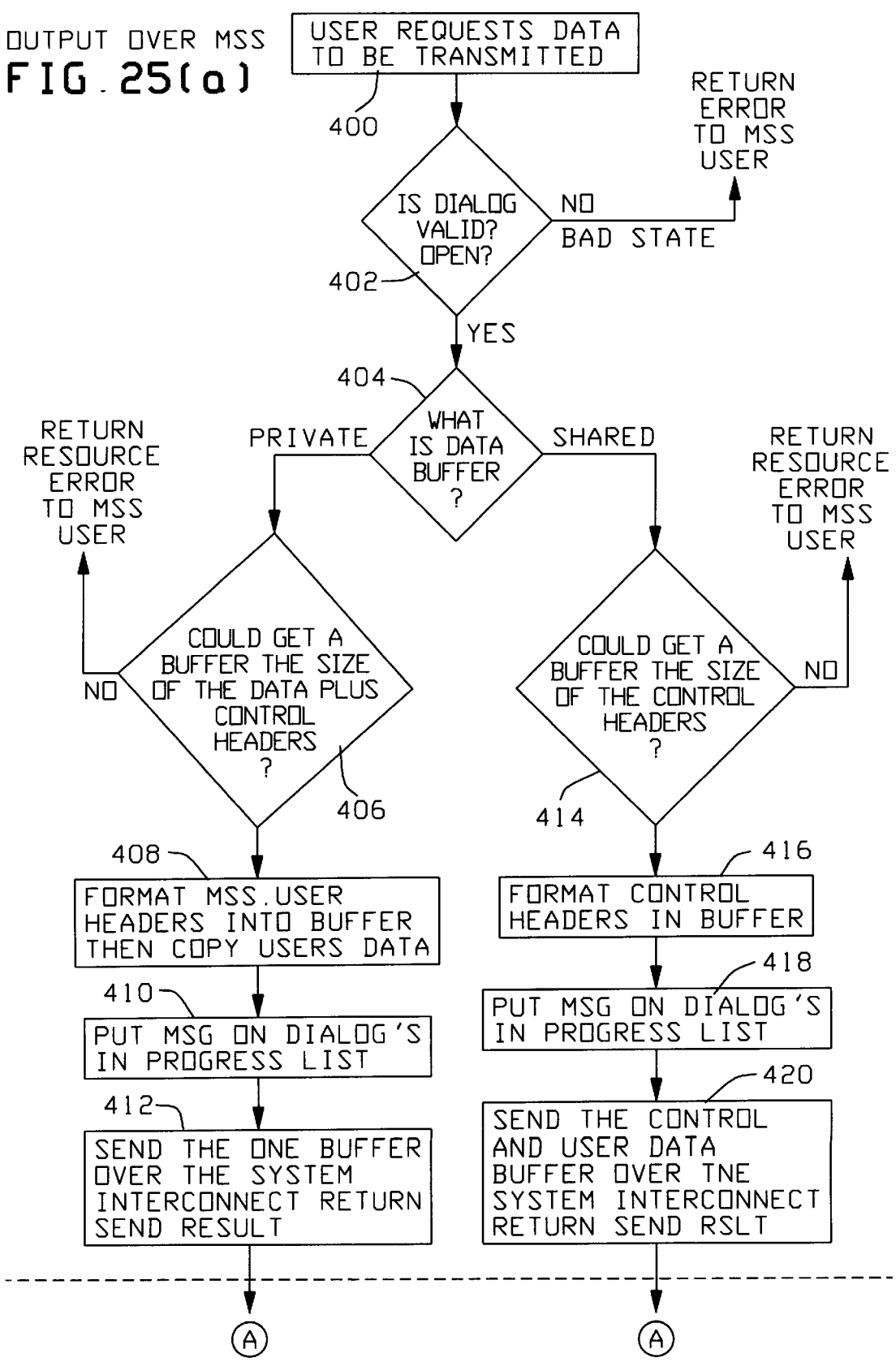

OUTPUT

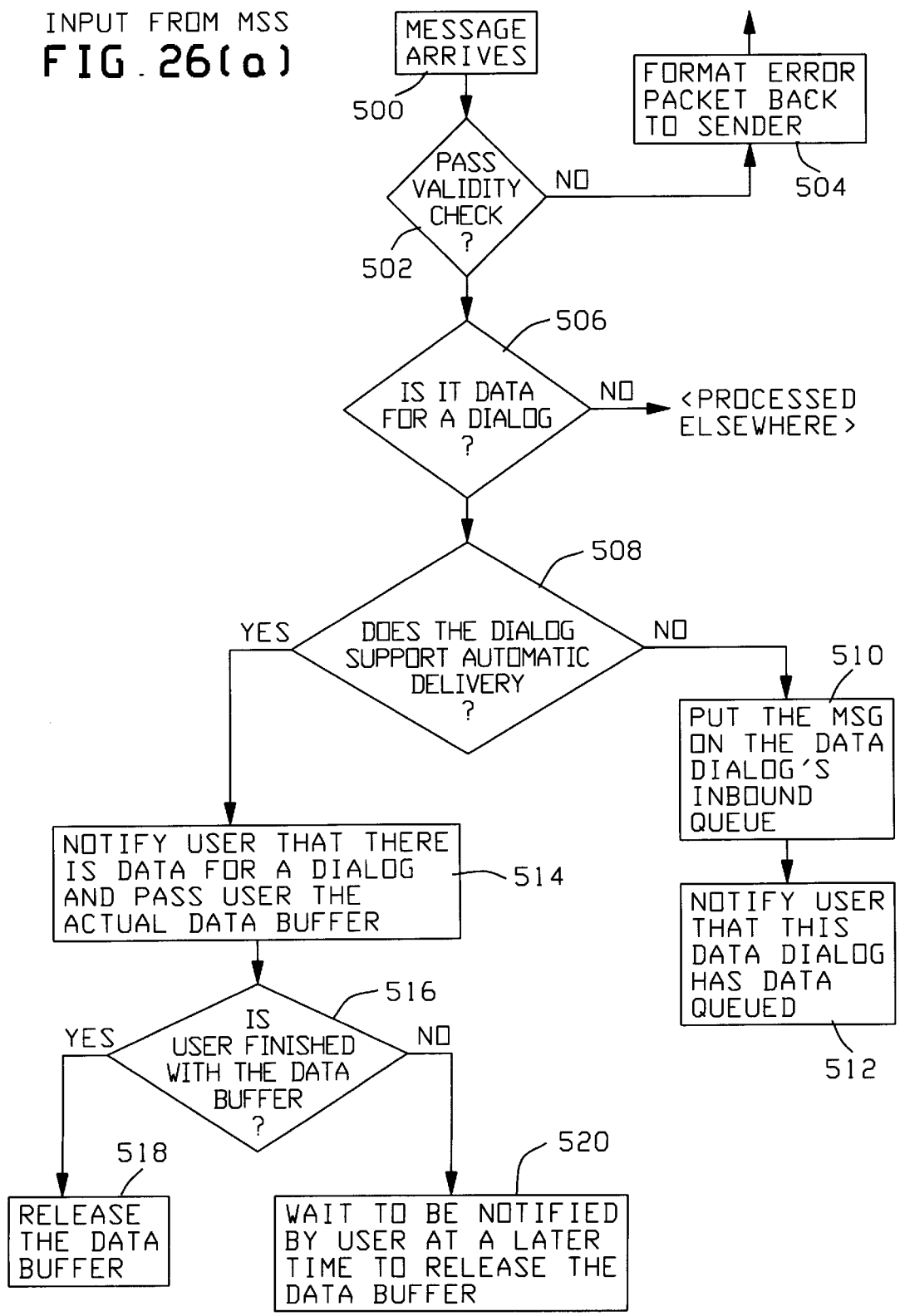

INPUT FROM MSS

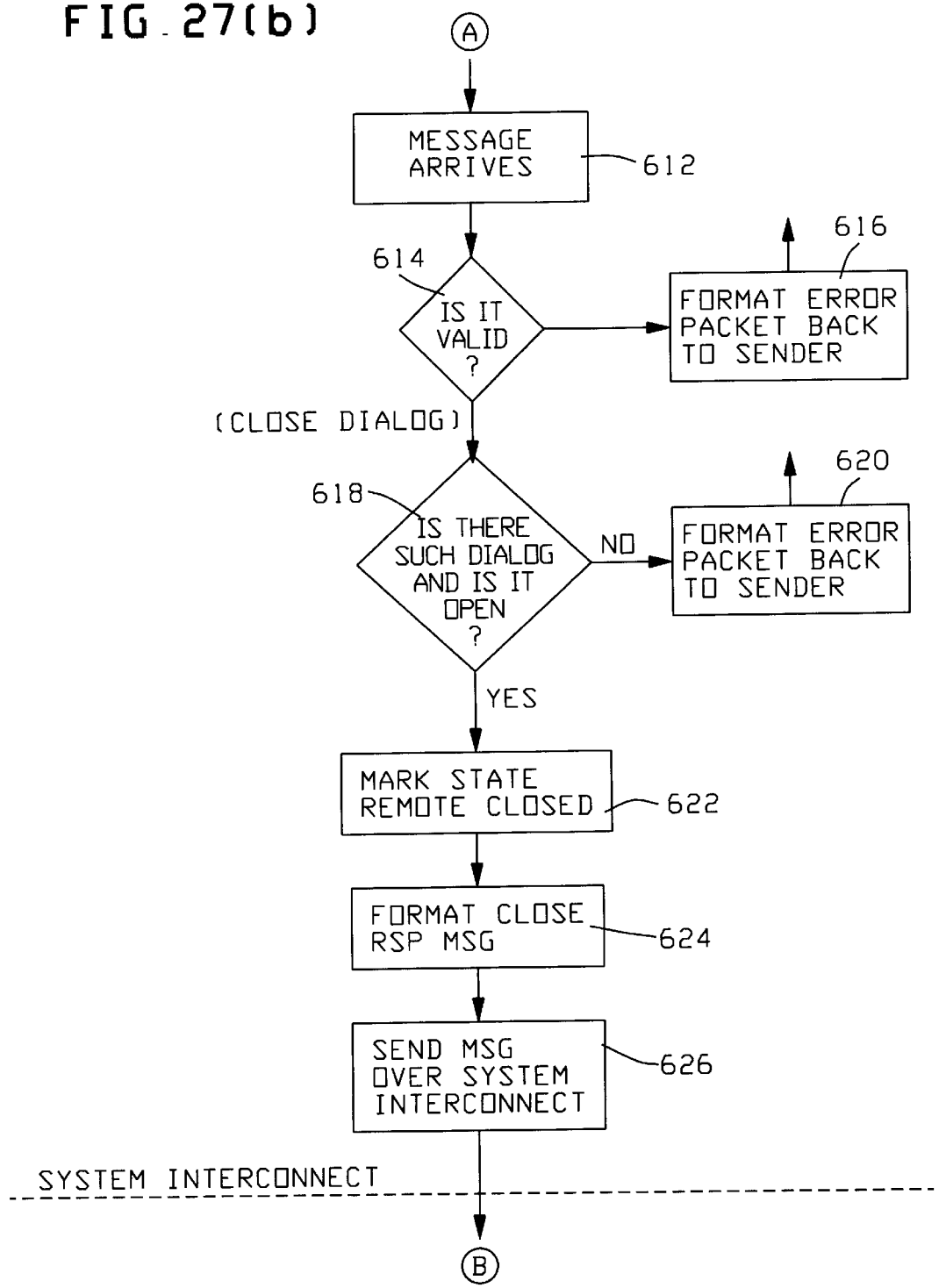

DIALOG TERMINATION(MSS)

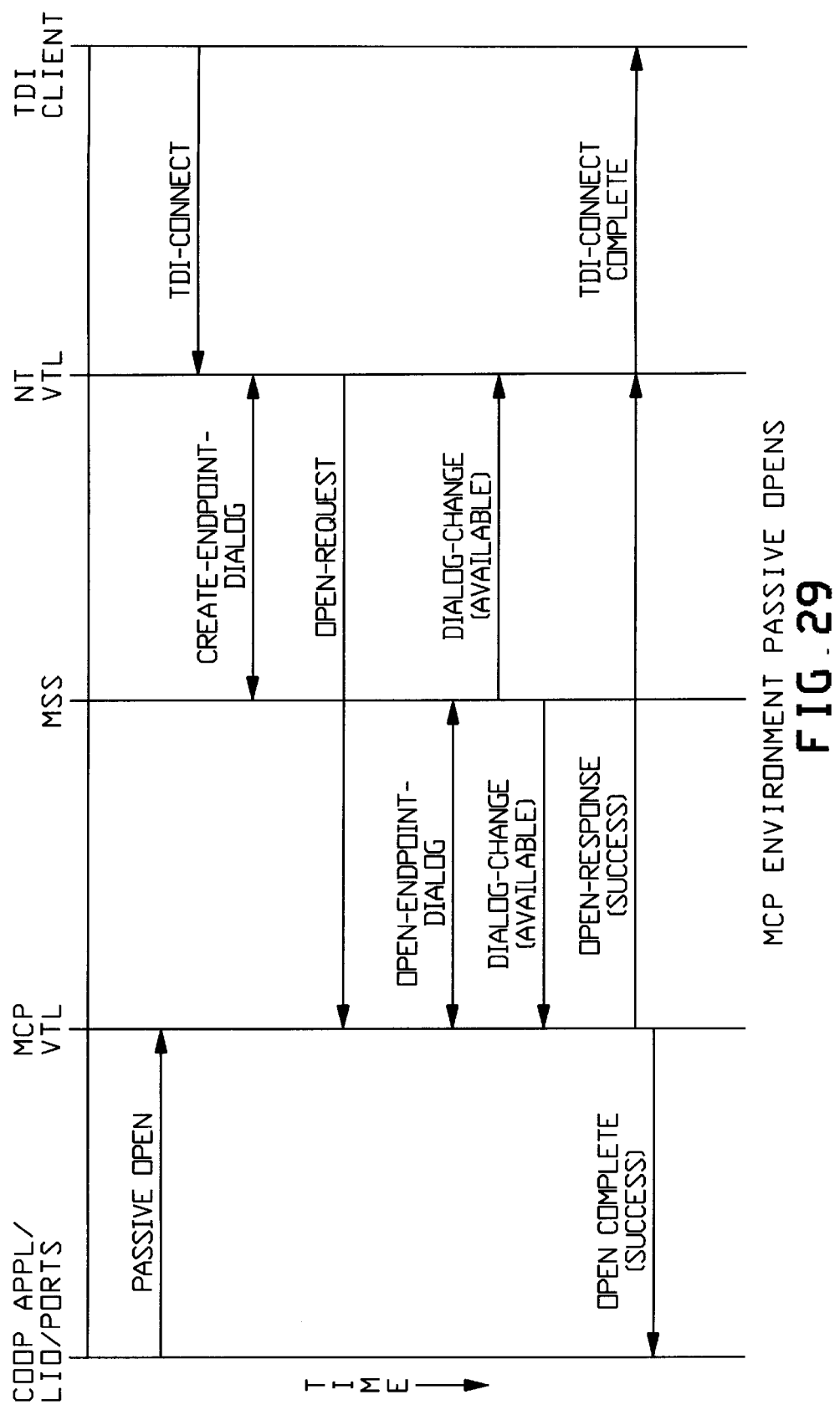
FIG. 29 MCP ENVIRONMENT PASSIVE OPENS

MCP ENVIRONMENT DIRECTED OPENS

FIG. 31 GENERAL DATA PATH DESIGN

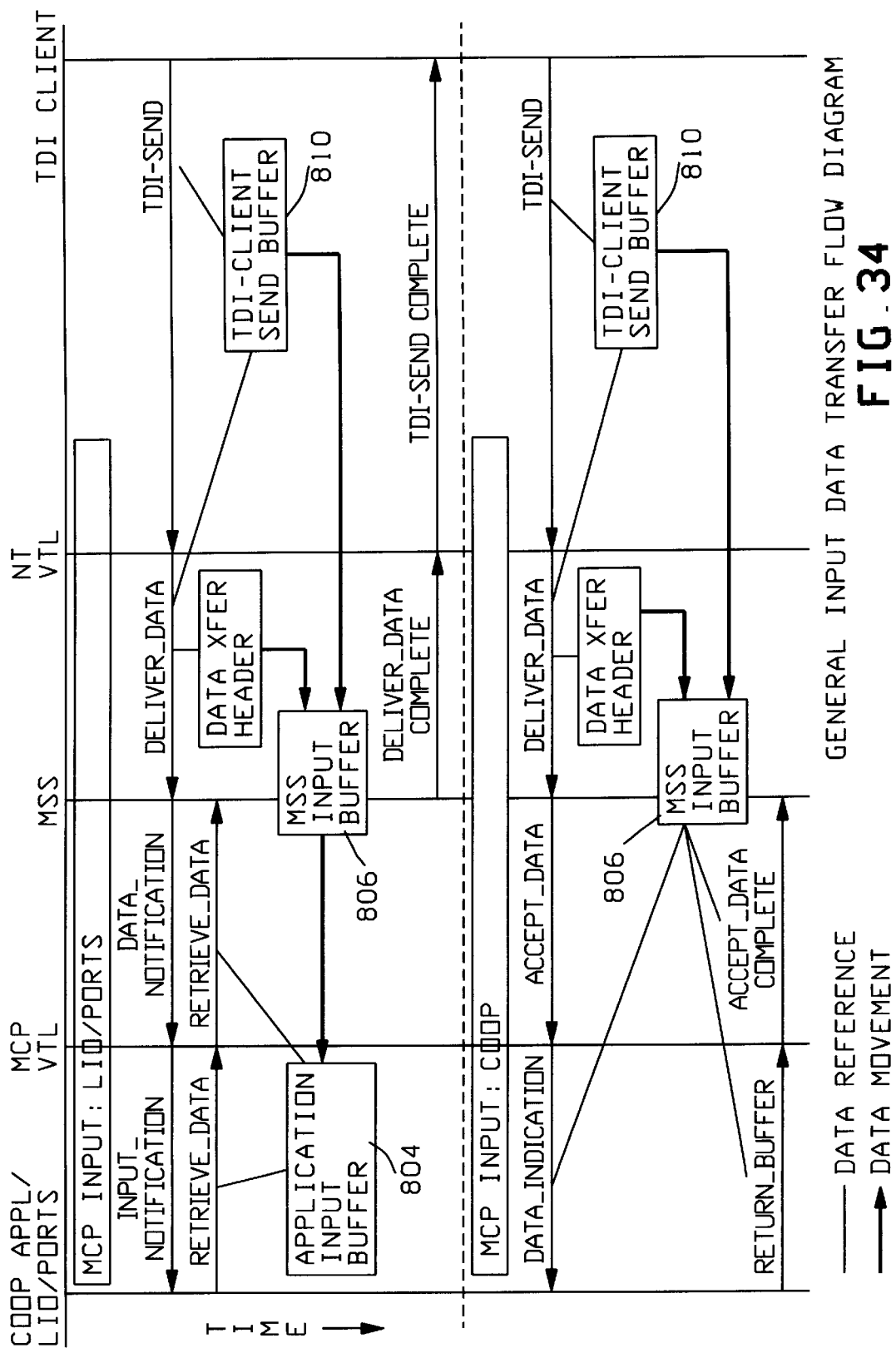

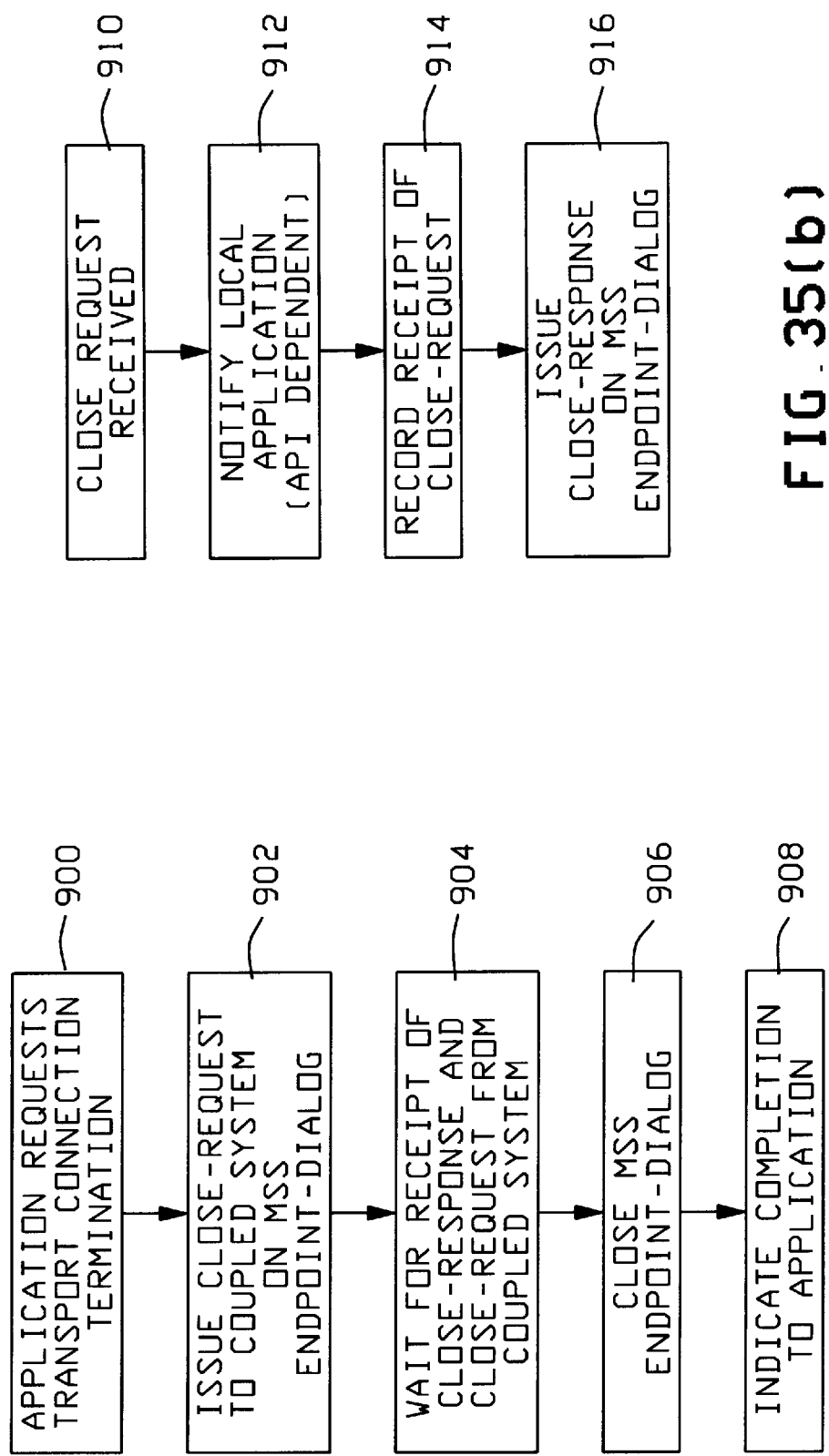

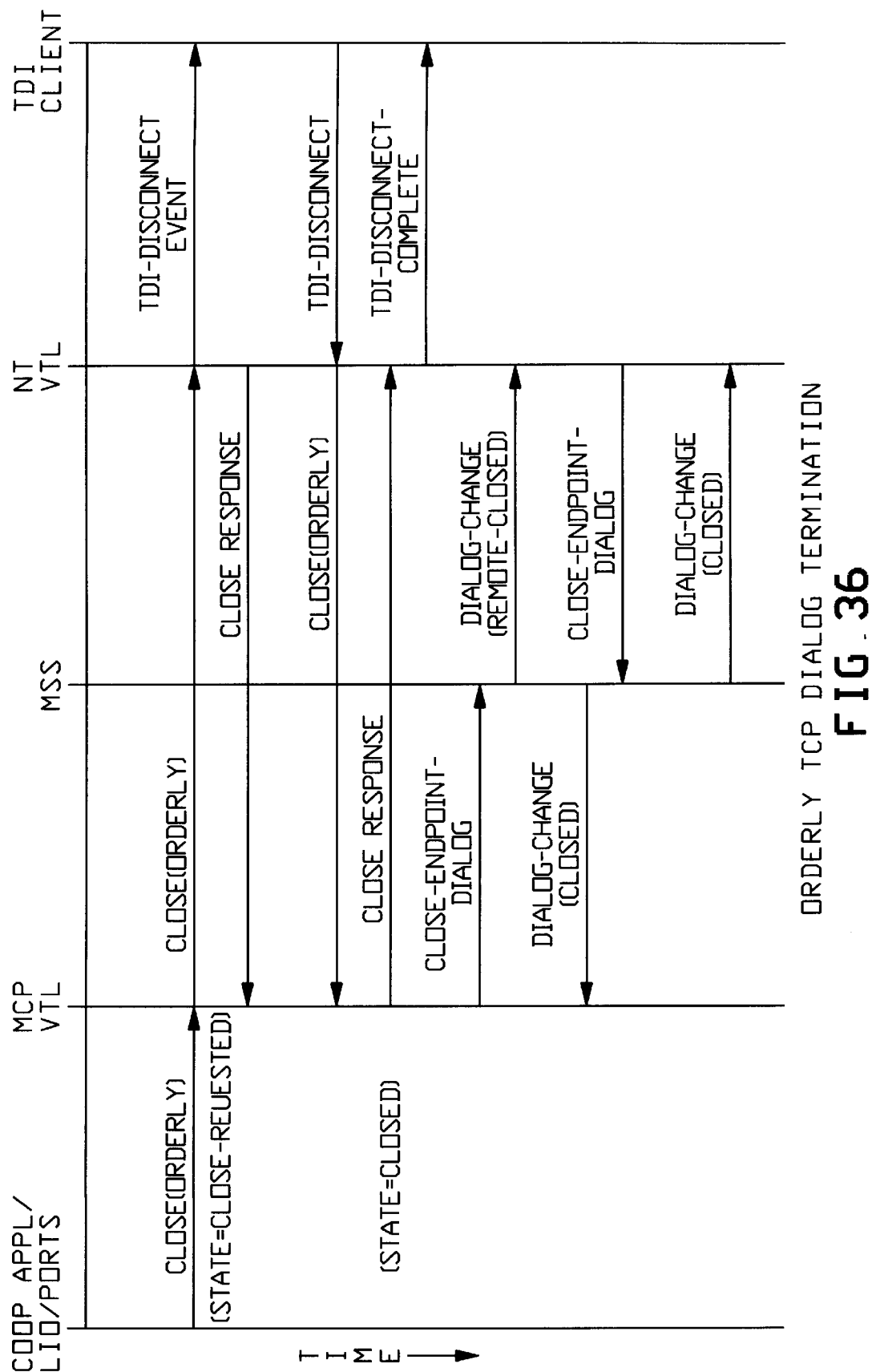
FIG. 36 ORDERLY TCP DIALOG TERMINATION

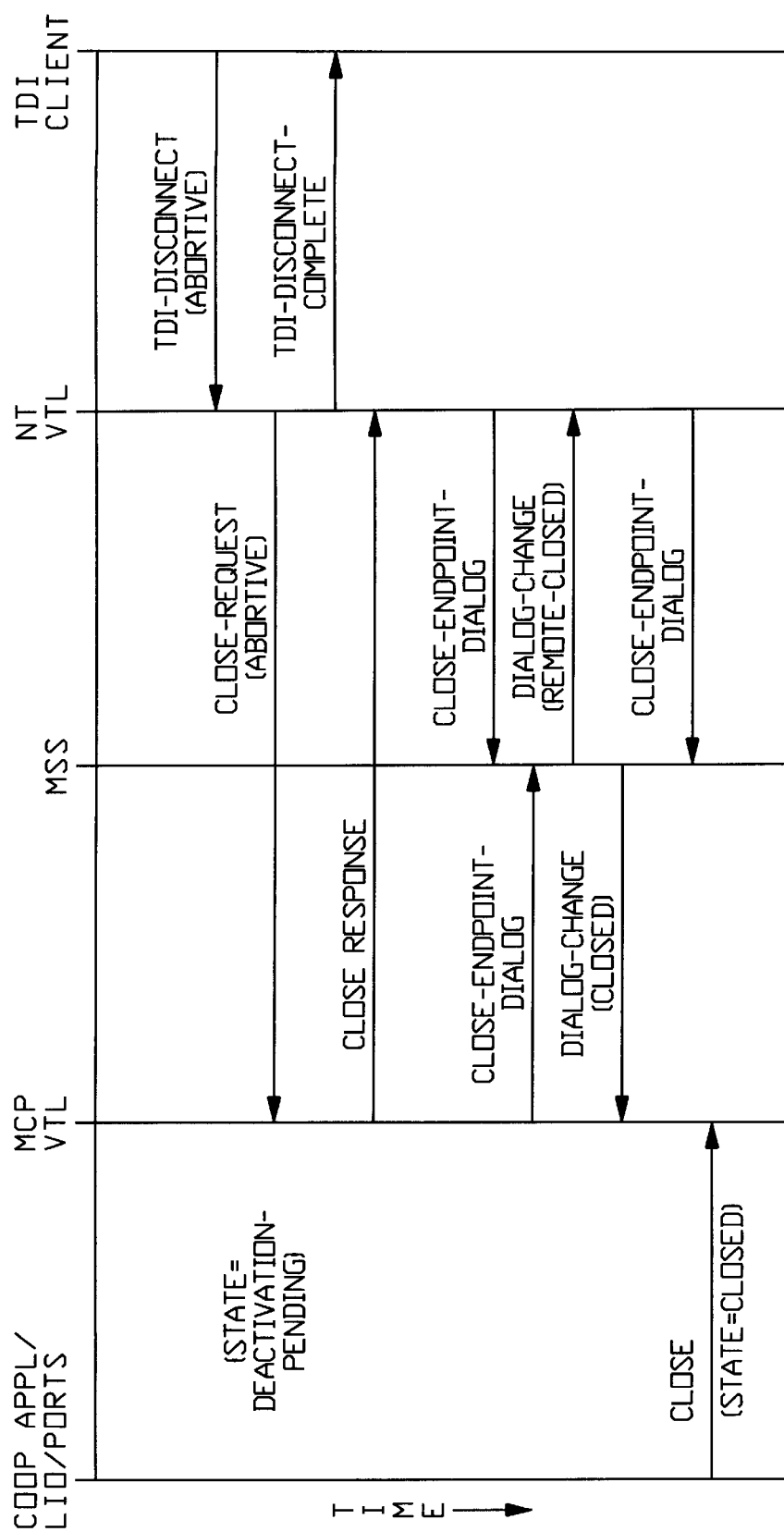
FIG. 37 ABORTIVE TCP DIALOG TERMINATION

VIRTUAL TRANSPORT LAYER INTERFACE AND MESSAGING SUBSYSTEM FOR HIGH-SPEED COMMUNICATIONS BETWEEN HETEROGENEOUS COMPUTER SYSTEMS

BACKGROUND

1. Field of the Invention

The present invention relates to the field of computer networking, and, more particularly, to apparatus and methods for allowing two closely coupled heterogeneous computer systems to communicate with each other via a messaging system over an interconnection including a simulated or "virtual" transport layer interface.

2. Description of the Prior Art

The ability for heterogeneous computer systems to communicate with each other over a network using standard ISO and/or proprietary networking protocols is known. Most computer systems have some form of networking architecture that enables the computer system to perform networking in accordance with those protocols. For example, the generic networking platform with the standard 7 layer ISO Reference Model includes a network stack: applications, presentation, and sessions levels under user control, and transport, network, data link, and physical levels under kernel (operating system) control. Typical networking architectures comprise both system software and hardware.

FIG. 1 is a block diagram illustrating the components of a networking architecture employed by a Unisys A Series enterprise server 10 in order to communicate with other hosts, or nodes, on a network 15. The A Series enterprise server 10 executes the Unisys MCP operating system 12, and has an I/O subsystem that comprises one or more I/O Modules (IOM) 14 housed within the A Series chassis. The IOM 14 implements a Unisys proprietary I/O bus architecture referred to as CS-BUS II or CS-Bus III (hereinafter "the CS Bus"). A plurality of card slots, e.g. slots 16a–d, are provided for connecting interface cards, referred to as "channel adapters", into the CS Bus. Different groups, or racks, of channel adapter slots are each controlled by a Channel Manager Unit (CMU) (e.g., CMUs 18a, 18b). An IOM can contain several CMUs, each of which controls a different rack of channel adapter card slots via the CS-Bus. The CMUs manage the physical and data layers of the CS-Bus data transfer protocol.

Channel adapter cards, which each may occupy one or more channel adapter card slots within the IOM 14, provide various connectivity solutions for the A Series enterprise server 10. For example, Unisys provides a channel adapter card that implements the Small Computer System Interface (SCSI) protocol for connecting SCSI peripherals to the enterprise server 10.

For network connectivity, Unisys provides several channel adapters to support various physical networking protocols. These channel adapters are generally referred to as network processors (NP). For example, Unisys ICP22 and ICP26 network processors are channel adapter cards that implement the Ethernet network protocol and can be used to connect an A Series enterprise server 10 to an Ethernet network. Unisys also provides network processors for connectivity to FDDI and ATM networks. As shown in FIG. 1, a number of different network processors (e.g., NPs 20a, 20b, and 20c) can be installed in respective channel adapter slots (e.g., slots 16b, 16c, and 16d) of the IOM 14, in order to provide different network connectivity solutions.

As shown in the more detailed view of network processor 20c (installed in channel adapter slot 16d), a network processor may comprise a plurality of different lines, e.g., Line0, Line1 . . . LineN, where a line represents a physical endpoint within a network. For example, the Unisys ICP22 network processor has two lines, each of which comprises a separate Ethernet connection—one line could be connected to one Ethernet network, and the other to a different Ethernet network.

Each line of a network processor can have one station group defined on that line. A station group consists of one or more stations. A station is a logical endpoint that represents a logical dialog on that line. Thus, more than one logical dialog can take place over a given line of a network processor. This is achieved through multiplexing. For example, with a connection-oriented networking protocol, such as the Burroughs Network Architecture—Version 2 protocol (BNAv2), one station may represent a logical dialog with one other BNAv2 host on the network, whereas another station may represent a logical dialog to a different BNAv2 host. As illustrated in FIG. 1, for example, Station0 of LineN may represent a logical dialog with BNAv2 host 22, and Station1 of LineN may represent a logical dialog with BNAv2 host 24. For networking protocols that are not connection-oriented, like the Internet Protocol (IP), only one station needs to be defined to handle all communications for that protocol stack. For example, in FIG. 1, StationN of LineN could be defined as the logical endpoint for all IP traffic over LineN. A Local Area Network Station Group (LANSG) module 26, which comprises software executing on the network processor 20c, provides callable procedures for creating and maintaining stations and station groups on the various lines of the network processor 20d and for sending and receiving data over them.

Other software components that execute on the network processor 20c include a Queue Service Provider (QSP) module 28, which handles the passing of messages between the NP Support 40 and the channel adapters. QSP module 28 also multiplexes and demultiplexes data for all stations defined on a given NP. Some data is blocked together for efficiency; other data is not. Other components include two stub modules—a Network Services Manager stub (NSM-stub) 30 and a Link Layer Manager stub (LLM-stub) 32—which interface with corresponding modules of a Core Network Services (CNS) software component 34, to and from modules within the MCP environment.

Generally, a network processor (e.g., NP 20a, 20b, or 20c) implements the data link and physical layers of the 7-layer ISO Reference Model. Higher level networking protocols that a client application 46 may wish to employ in order to communicate with applications running on different hosts of the network 15, such as the BNAv2 and TCP/IP networking protocols, are implemented as network protocol providers on the A Series system 10. A network protocol provider is a software module that implements these higher level networking protocols. For example, Unisys provides both BNAv2 Host Resident Network Provider (HRNP) modules and TCP/IP HRNP modules. In the example of FIG. 1, a BNAv2 HRNP 42 and a TCP/IP HRNP 44 are shown.

The Core Network Services (CNS) software 34 provides support for the network protocol providers 42, 44 and handles the initialization and maintenance of network processors and the station groups defined thereon. Specifically, CNS 34 comprises a Network Services Manager (NSM) 36 that initializes and manages the network processors (e.g., 20a, 20b, 20c) installed in the system, and a Link Layer Manager (LLM) 38 that initializes and maintains the identity and attributes of each station group defined on a given network processor. Another component (not shown) of CNS 34 validates attributes associated with station groups and stations created on a network processor. These attributes are passed between the network processor and CNS 34 via a control dialog when the stations are defined. Like the stub procedures for the NSM and LLM modules 36, 38, network processors also have a stub procedure (LLAH, not shown) that corresponds to the attribute handler of CNS 34. An NPSUPPORT software library 40, as well as portions of the MCP operating system 12, provide routines and procedure calls that serve as an interface between a network processor and the CNS 34 and network protocol providers 42, 44, and control loading of software to the NPs and dumping of their state.

Each network processor has an associated identifier that uniquely identifies that network processor within the system 10. When a network processor is initialized and brought on-line, the NSM-stub 30 in the network processor interfaces with the NSM 36 of CNS 34 via a control dialog in order to pass its identifier to the NSM 36. The NSM 36 manages the identifiers of all active network processors.

Each station group and station defined for a given network processor also has a unique identifier associated with it. Via a control dialog established between the LLM-stub 32 on the network processor and the LLM 38 of CNS 34, the station and station group identifiers are passed to the LLM 38 during initialization. Within the LLM 38, a station corresponds to a connection, and a station group corresponds to a connection group.

As mentioned above, the ability to define multiple stations (i.e., a station group) on a single physical line of a network processor is achieved through multiplexing. Specifically, the QSP 28 in the network processor multiplexes inbound and outbound data for multiple stations on a given line. Moreover, the QSP 28 is responsible for distributing request and response data between the NSM 36 and NSM-stub 30 and between the LLM 38 and LLM-stub 32. To that end, each entity on the network processor that receives outbound data from the MCP 12, including every station, the NSM-stub 30, and the LLM-stub 32, is assigned a unique Remote Queue Reference (RQR) by the QSP 28. The NSM-stub RQR is reported to the NSM 36 within CNS 34 via NPSUPPORT 40 when the NP is loaded. The LLM-stub RQR is reported to the LLM 38 via the NSM 36 by the NSM-stub 30 when the network processor initializes. All of the station RQRs are reported to the HRNPs 42, 44 as the stations open.

When a client application is required to send data via network 15 to some other host or node on the network 15, such as another BNAv2 Host 22, 24 or another TCP/IP host 25, it invokes the services of the appropriate network protocol provider, e.g., 42, 44. The network protocol provider 42, 44 determines the appropriate network processor and station on which the data is to be output, adds protocol headers for each of the network layers, and makes a corresponding request to the MCP 12 that includes the identifier of the network processor and the RQR of the station. The data and associated RQR are passed from the MCP 12 to the QSP 28 on the network processor (e.g., network processor 20c), which, in combination with the LANSG module 26, sends the data out to the network 15 via the appropriate line (e.g., Line0, Line1, ... or LineN) as part of the logical dialog represented by the designated station.

When data is received from the network 15 on a given line, the LANSG module 26 determines, from header information associated with the data, the station (i.e. logical dialog) for which the data is intended. The LANSG and QSP modules 26, 28, in combination with portions of the MCP 12 and NPSUPPORT library 40, pass the received data to the appropriate network protocol provider 42, 44 associated with that station, along with an indication of which station received the data. For example, one of the stations on LineN of the network processor 20c of FIG. 1 (e.g., station0) may be defined as the logical endpoint for the BNAv2 HRNP 42, while a different station (e.g., station1) may be defined as the logical endpoint on which all IP traffic over LineN is received for the TCP/IP HRNP 44. When a frame of data is received from the network on LineN, the LANSG module 26 determines from header information which of the network protocol providers (i.e., stations) is intended to receive the data. This determination is performed in accordance with the methods described in commonly assigned, U.S. Pat. No. 5,379,296, entitled "Method and Apparatus for Interfacing a Workstation to a Plurality of Computer Platforms" (Johnson et al.).

In addition to its use in A Series computers, the foregoing networking architecture is also employed in Unisys ClearPath HMP NX enterprise servers. A ClearPath HMP NX server comprises an A Series enterprise server tightly integrated with a server running Microsoft Window NT. Please note that "Microsoft," "Windows," and "Windows NT" are registered trademarks of Microsoft Corporation. Additional information concerning the foregoing networking architecture can be found in the following documents, each of which is available from Unisys Corporation, assignee of the present invention, and each of which is hereby incorporated by reference in its entirety:

ClearPath HMP NX Series with Windows NT Network Services Implementation Guide (Part No. 4198 6670); BNA/CNS Network Implementation Guide, Volume 2: Configuration (Part No. 3789 7014);

ClearPath HMP NX Series with Windows NT Implementations and Operations Guide (Part No. 8807 6542);

ClearPath HMP NX Series with Windows NT Migration Guide (Part No. 8807 7730);

Networking Capabilities Overview (Part No. 3789 7139);

Networking Operations Reference Manual, Volumes 1 and 2: Commands and Inquiries (Part No. 3787 7917); and Networking Products Installation Guide (Part No. 4198 4840).

Using a Unisys ICP22 network processor, which is an Ethernet-based channel adapter, it has been possible in the past for a Unisys A Series enterprise server to communicate with a workstation or personal computer (PC) over a network. An example of this ability is illustrated in FIG. 2. In this example, the A Series enterprise server 10 communicates with an Intel-based workstation 48 running the Microsoft Windows NT operating system (hereinafter "the NT server"). The A Series enterprise server 10 is connected to the network via network processor 20a, which may, for example, be a Unisys ICP22 Ethernet-based network processor.

The I/O subsystem of the NT server 48 comprises portions of the NT operating system kernel, an EISA or PCI bus 52, and appropriate device driver software. To provide network connectivity, a network interface card (NIC) 50 is installed in an available bus slot on the NT server 48. The NT server may support one or both of the PCI and EISA bus standards. NICs are available for both bus standards.

A NIC device driver 54 that typically is sold with the NIC card 50 is installed in the kernel space of the NT operating system. The NIC device driver 54 interfaces with a higher level network protocol provider, such as an implementation of the transport (TCP) and network and data link (IP) protocols. Microsoft Corporation provides an implementation of the TCP/IP protocol in the form of a kernel level device driver, also referred to as a transport protocol driver, named TCPIP.SYS 58. TCPIP.SYS 58 interfaces with the NIC device driver 54 via NDIS 56, an industry standard Network Driver Interface Specification jointly developed by Microsoft and 3Com. NDIS 56 defines an interface for communication between hardware-independent protocol drivers, such as TCPIP.SYS 58, which implement the Data Link, Network, and Transport layers of the ISO model, and hardware-dependent NIC drivers 54 which provide an interface to the NIC hardware and which correspond to the Physical Layer of the ISO model. A client program 60 on the NT server can communicate over the network 15 in accordance with the TCP/IP protocol by issuing suitable calls via the NT operating system to the TCPIP.SYS protocol driver 58, and the A series server 10 and NT server 48 communicate over network 15 at the physical layer of the ISO model.

To avoid the costs associated with the development of NIC cards for proprietary systems such as the A series enterprise server, it has been proposed in co-pending U.S. patent application Ser. No. 09/088,421, also assigned to the present assignee and the contents of which are hereby incorporated by reference in their entirety, to provide a direct interconnection between A series enterprise server 10 and NT server 48 so that both systems may connect to a network via a shared network interface card installed on the NT server. Such an invention is implemented as part of a Cooperative Networking Platform (CNP) deployed on a Unisys ClearPath HMP NX computer system ("the ClearPath system"). As will now be described, the ClearPath system comprises a Unisys A Series enterprise server 100 and an Intel-based server 102 running Windows NT 102 ("the NT server").

As shown in FIGS. 3, 4, and 5, the CNP may take different forms. As illustrated in these figures, the interconnection couples the I/O subsystem of the A Series server 100 to the I/O subsystem of the NT server 102 to provide a relatively high speed data path between systems. Preferably, the interconnection comprises a physical connection between the I/O subsystems of the A series enterprise server 100 and the NT server 102 and an interconnection device driver that controls access to the physical connection by other software modules on the NT server 102.

In the embodiment of FIG. 3, the physical connection comprises a feedthrough card 62 installed in a channel adapter slot of the A Series server 100, an EISA Personal Computer Channel Adapter (EPCCA) card 66 installed in an EISA slot of the I/O bus of the NT server 102, and a CS-BUS II cable 64 that connects the CS-BUS II of the A Series server 100 to the EPCCA card 66 via the feedthrough card 62. The interconnection device driver (ICD) 70 is installed in the kernel space of the NT operating system and controls access to the physical connection (specifically the EPCCA card 66) by other modules on the NT server 102. The prior art embodiment of FIG. 3 also includes a Queue Service Provider module 76 that functions analogously to the QSP 28 of FIG. 1, a LANSG module 78 that functions analogously to the LANSG module 26 of FIG. 1, and NSM-stub and LLM stub modules 84, 86 of CNP.EXE 80 that function analogously to the corresponding components 30, 32 of FIG. 1. In addition, LDM and LLAH modules 82, 88 of CNP.EXE 80 are provided which function analogously to the similar components (not shown in FIG. 1) in a traditional Unisys networking architecture.

In FIG. 3, the interconnection device driver 70, including its PCCA and OPENCA drivers 72, 74, and the physical connection formed by the feedthrough card 62, cable 64, and EPCCA card 66, together define a Host Interface Function (HIF). The procedural interface between the QSP 76 and the interconnection device driver 70 of the HIF is designed to isolate the QSP 76 from the HIF. As will be apparent from the detailed description below, this enables the present invention to be employed with different implementations of the HIF. Specifically, the procedural interface between the QSP 76 and the interconnection device driver 70 is established through a process by which each module publishes entry points (i.e., pointers) to the procedures that implement its functionality, along with any required variable values. Another device driver entity maintains a record of these entry points, while the interconnection device driver 70 of the HIF registers the entry points and their attributes and the QSP 76 registers the entry points.

In order to invoke one of the entry point functions, a call is made to the registered entry point for that function. As a result of this indirection, different interconnection device drivers are installed for different implementations of the HIF in a manner that is completely transparent to the QSP 76.

FIGS. 4 and 5 illustrate two alternate embodiments of the HIF, which illustrate the modularity provided by the procedural interface design. In FIG. 4, the physical connection (i.e., the feedthrough card 62, cable 64, and EPCCA card 66) is replaced by a PCI Bridge card 67 that connects via a cable 65 directly to a port on one of the CMUs 18b of the IOM 14 of the A Series server 100. By connecting directly to the CMU 18b, some of the latency inherent in the CS-Bus II protocol is avoided. This provides a more direct, higher speed connection between the I/O subsystems of the two servers 100, 102. Because the physical connection is changed, a modified interconnection device driver 70' is provided. The modified interconnection device driver 70' comprises a single device driver module, PXN 73, that provides the interface between the QSP 76 and the hardware on the PCI Bridge card 67. However, the procedural interface, and the mechanism by which the QSP 76 and interconnection device driver 70' register entry points to the respective procedures of that interface is unchanged. Accordingly, the changes to the HIF are transparent to the QSP 76 and the other modules that comprise the Cooperative Networking Platform (CNP).

FIG. 5 is an embodiment in which the A Series server 100 is emulated through software in the NT server 102. Unisys provides such an emulated system in its ClearPath HMP NX 4200 series enterprise servers. In this embodiment, the physical connection is emulated such that it becomes a memory-to-memory connection 63 between the memory space of the emulated I/O subsystem 14' and the memory space of the NT system 102. The emulated connection 63 functions in a manner similar to the feedthrough card 62, cable 64, EPCCA card 66, and PCCA 72 components of the hardware implementation of FIG. 3. The interconnection device driver 70' in this embodiment comprises a modified form 74' of the OPENCA module 74 of the implementation of FIG. 3. Again, however, the procedural interface between the modified OPENCA module 74' and the QSP 76 is not changed, so that the emulated A Series server 100 and its emulated connection 63 to the NT server 102 is transparent to the QSP 76 and the other modules of the present invention that comprise the Cooperative Networking Platform (CNP).

Also, a "virtual" LAN device driver 79 and an NDIS Miniport Interface Library 81 together with LANSG and the remainder of the interconnection components in the systems of FIGS. 3–5 provide a high speed, low latency communications path between the A Series server 100 and the NT server 102 as described in co-pending U.S. patent application Ser. No. 09/088,552, also assigned to the present assignee and the contents of which are hereby incorporated by reference in their entirety. As described therein, these modules, in combination with the physical connection (e.g., feedthrough card 62, cable 64, EPCCA card 66 and the interconnection device driver 70), simulate a traditional channel adapter-based network processor of the type described above and illustrated in FIG. 1. VLAN 79 allows the A series enterprise server 100 and the NT server 102 to both use their native mechanisms to communicate with each other rather than conventional network communications paths such as Ethernet, which may be considerably slower. In particular, VLAN 79 allows the A series enterprise server 100 and the NT server 102 to communicate at the data link level of the ISO network reference model by simulating the physical level with the HIF.

It is desired to further improve the communications efficiency of the ClearPath system by simulating the TCP transport protocol and the IP networking protocol between the A series enterprise server 100 and the NT server 102 via the interconnect so that data may be transferred point to point between systems at the transport level rather than the data link level. By simulating the transport and network layer protocols, it is also desired to remove the inherent limitations of the TCP/IP protocols by using a more reliable network connection through which larger blocks of data may be transmitted without being broken up into smaller data chunks with prepended network protocol information. Of course, it is desirable that this be accomplished in a manner which is transparent to the user (i.e., the session level is unaffected). The present invention provides such capabilities.

SUMMARY OF THE INVENTION

The present invention is directed to methods and apparatus that enable a first network application, executing on a first computer system, and a second network application, executing on a second computer system which is directly interconnected and closely coupled to the first computer system, to communicate at high speed, with low latency, over the interconnection therebetween such that both systems may use their native mechanisms to communicate with each other without affecting the network applications, rather than over conventional network communication paths such as TCP/IP and Ethernet. In accordance with a preferred embodiment thereof, the present invention comprises an interconnection that couples the input/output (I/O) subsystem of the first computer system to the I/O subsystem of the second computer system and over which data can be transmitted between the systems independent of a network interface card, and an interconnection messaging system executing on the first and second computer systems that provides general purpose transport interfaces, and that simulates a known transport layer protocol to the first and second network applications. The invention allows the first and second network applications to communicate in a manner which is transparent to the first and second network applications (e.g., data may be transferred between applications on the first and second computer systems without affecting sessions layer and higher layer communications protocols, including the first and second network applications).

The interconnection between the I/O subsystem of the first computer system and the I/O subsystem of the second computer system preferably comprises a physical connection between the I/O subsystems over which data can be transmitted. The invention poses no restrictions on the interconnection between the first and second computer systems, and is, in fact, intended to permit utilization of improved interconnect mechanisms as they become available. The interconnection messaging system, on the other hand, includes a messaging subsystem ("MSS") which provides general purpose transport interfaces which are independent of communication protocols of the interconnection and provides further interfaces on either end of the interconnection which are dependent on the communication protocols of the interconnection, whereby only the further interfaces must be changed when the interconnection is changed.

Preferably, the MSS includes an MSS component on each of the first and second computer systems, each MSS component having at least one local MSS user connected thereto through the interconnection independent interface. An MSS component on the first computer system creates a dialog to each complementary remote MSS user of the second computer system. Each MSS component includes means for building dialog tables for local MSS users informing the local MSS users about any complementary remote MSS users accessible via the interconnection and for updating the dialog tables as complementary remote MSS users are added or removed. Each MSS component also includes means for performing dialog management functions which allow the local MSS users to establish, receive status about, and destroy dialogs with the complementary remote MSS users over the interconnection. Each MSS component further includes means for performing control message functions which allow the local MSS users and the complementary remote MSS users to pass control messages to each other in a manner which is independent of which interconnect is being employed. Each MSS component additionally includes means for transferring data between local and remote MSS users over data dialogs established between the local and remote MSS users so as to optimize data transfers between the first and second computer systems.

The major advantage of the MSS of the present invention is the ability to isolate interconnect dependent mechanisms to a single component. In this manner, as additional functionality is added by implementing components which require inter-system communication via the interconnect independent MSS interface (i.e., as "MSS users"), changes to existing interconnects as well as opportunities to incorporate additional interconnects may be accomplished entirely via the MSS components without affecting the MSS users.

In a presently preferred embodiment, one of the local and one of the remote MSS users are complementary virtual transport layer ("VTL") components which simulate a known transport layer protocol so that the first and second network applications may communicate with each other over the interconnection in a manner which is transparent to the first and second network applications. The complementary VTL components together perform the conventional transport functions of transport dialog establishment, data transfer, and transport dialog termination using the MSS. Preferably, the VTL components interface with the first and second network applications and are implemented on the first and second computer systems as complementary MSS users which are connected to the MSS through the interconnection independent interfaces of the MSS. The control message functions of the MSS create a reliable control dialog over which the VTL components may exchange message sequences to coordinate creating and opening data dialogs.

When data is to be transferred from the first network application to the second network application over the interconnection, the VTL component interfaced to the first network application appends a VTL data transfer header to data to be transferred to the second network application and initiates a data transfer over the open dialog.

The scope of the invention also includes a method for enabling a first network application, executing on a first computer system, and a second network application, executing on a second computer system which is directly interconnected and closely coupled to the first computer system via an interconnection between an input/output (I/O) subsystem of the first computer system and an I/O subsystem of the second computer system to transmit data therebetween independent of a network interface card and in the native protocols of the first and second network applications. In accordance with the invention, such a method comprises the steps of:

simulating a known transport layer protocol to the first and second network applications on the respective first and second computer systems;

creating a dialog over the interconnection through which the first and second network applications may communicate in a manner which is transparent to the first and second network applications;

opening the dialog for data transfer between the first and second network applications;

applying to the data to be transferred a data transfer header; and transferring the data and the data transfer header over the interconnection via the open dialog.

In preferred embodiments, a plurality of dialogs over the interconnection are created for a plurality of pairs of the first and second applications whereby the applications in each pair may communicate in a manner which is transparent to the native protocols of the first and second applications in the pair, and the dialog which is to be used for the data transfer between the applications in the pair is specified.

The major advantage of the virtual transport layer of the present invention is increased throughput and decreased processor consumption. These improvements are due to two key factors: (1) because all underlying interconnects are generally capable of supporting message transfer sizes much larger than typically used for networking, fragmentation/reassembly overhead associated with traditional transport protocols is minimized, and (2) because underlying interconnects are generally reliable, the messaging system of the invention does not need to implement the acknowledgment/resend algorithms of traditional TCP/IP protocols. Moreover, if the underlying interconnect is unreliable, the messaging system may provide reliability through its connection oriented messaging protocols.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings several embodiments that are presently preferred, it being understood, however, that the invention is not limited to the specific methods and instrumentalities disclosed. In the drawings:

FIGS. 9(a)–9(f) are flow diagrams that illustrate the general operation of the interconnections illustrated in FIGS. 3–8;

FIG. 18 illustrates MSS initialization in accordance with the invention;

FIG. 19 illustrates MSS termination in accordance with the invention;

FIG. 20 illustrates MSS data transfer in accordance with the invention;

FIG. 21 illustrates the MSS_Endpoint_Dialog Creation process from the MSS's point of view;

FIGS. 24(a)–24(f) illustrate MSS_Endpoint_Dialog establishment in accordance with the invention;

FIGS. 25(a)–25(b) illustrate the procedure for outputting data from the MSS user over the interconnect using the MSS of the invention;

FIGS. 26(a)–26(b) illustrate the procedure for inputting data to the MSS user from the interconnect using the MSS of the invention;

FIGS. 27(a)–27(c) illustrate dialog termination of the MSS_Endpoint_Dialog created in accordance with the invention;

FIG. 29 illustrates the flow of TCP dialog establishment for VTL Passive Opens in accordance with the invention;

FIG. 34 illustrates normal VTL input data transfer flow to the MCP environment;

FIG. 35(a) illustrates termination of a virtual transport layer connection in accordance with the invention;

FIG. 35(b) illustrates VTL Close request processing performed by the closely coupled system receiving the VTL Close request;

FIG. 36 illustrates normal processing for orderly VTL dialog termination initiated by the MCP environment in accordance with the invention; and FIG. 37 illustrates normal processing for VTL abortive dialog termination initiated by the MCP environment in accordance with the invention.

DETAILED DESCRIPTION OF THE PREFERRED EMBODIMENT

Figure 1:
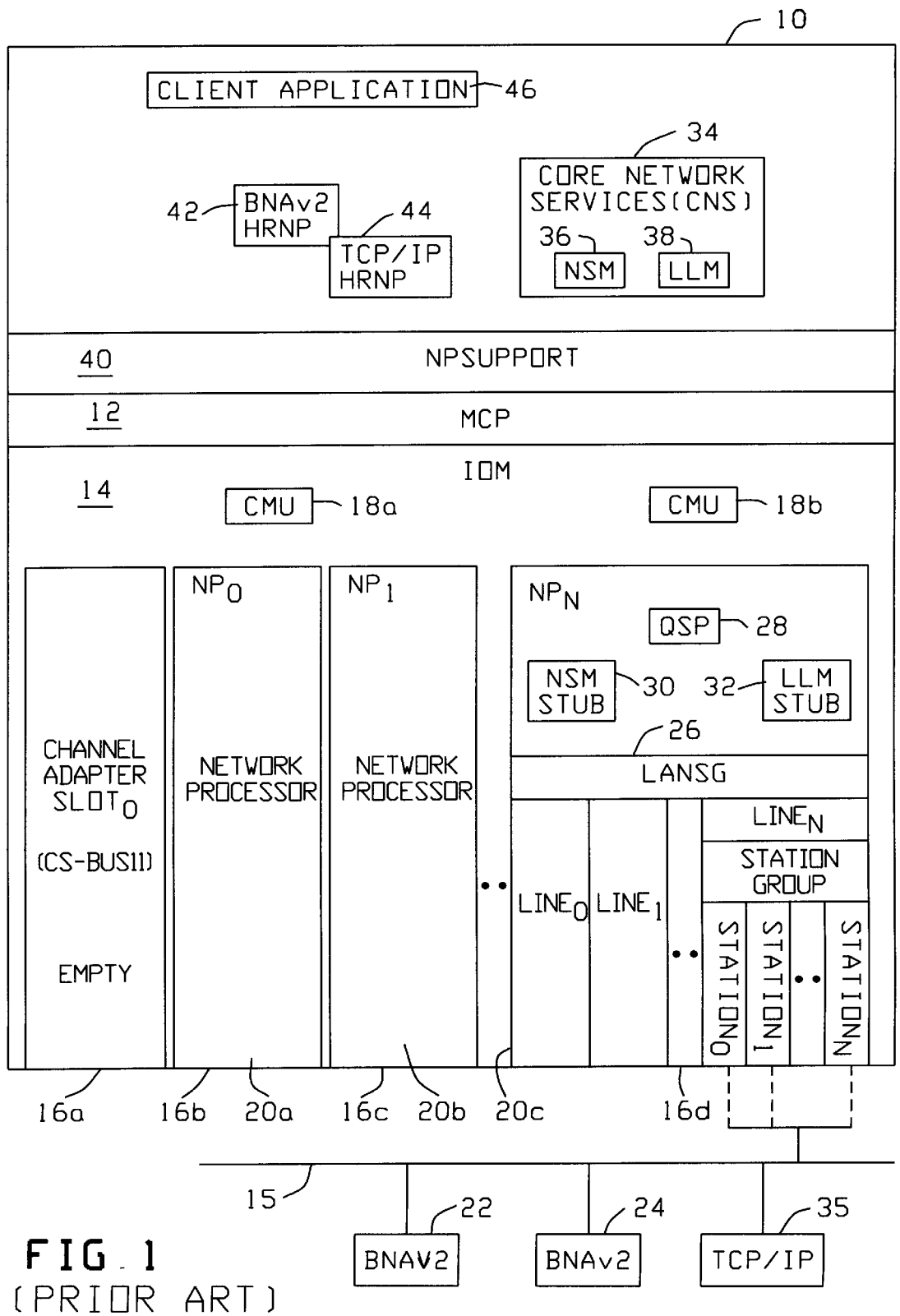
FIG. 1 is a block diagram illustrating the components of a prior art networking architecture employed by Unisys A Series enterprise servers in order to communicate with other hosts, or nodes, on a network.
Figure 2:
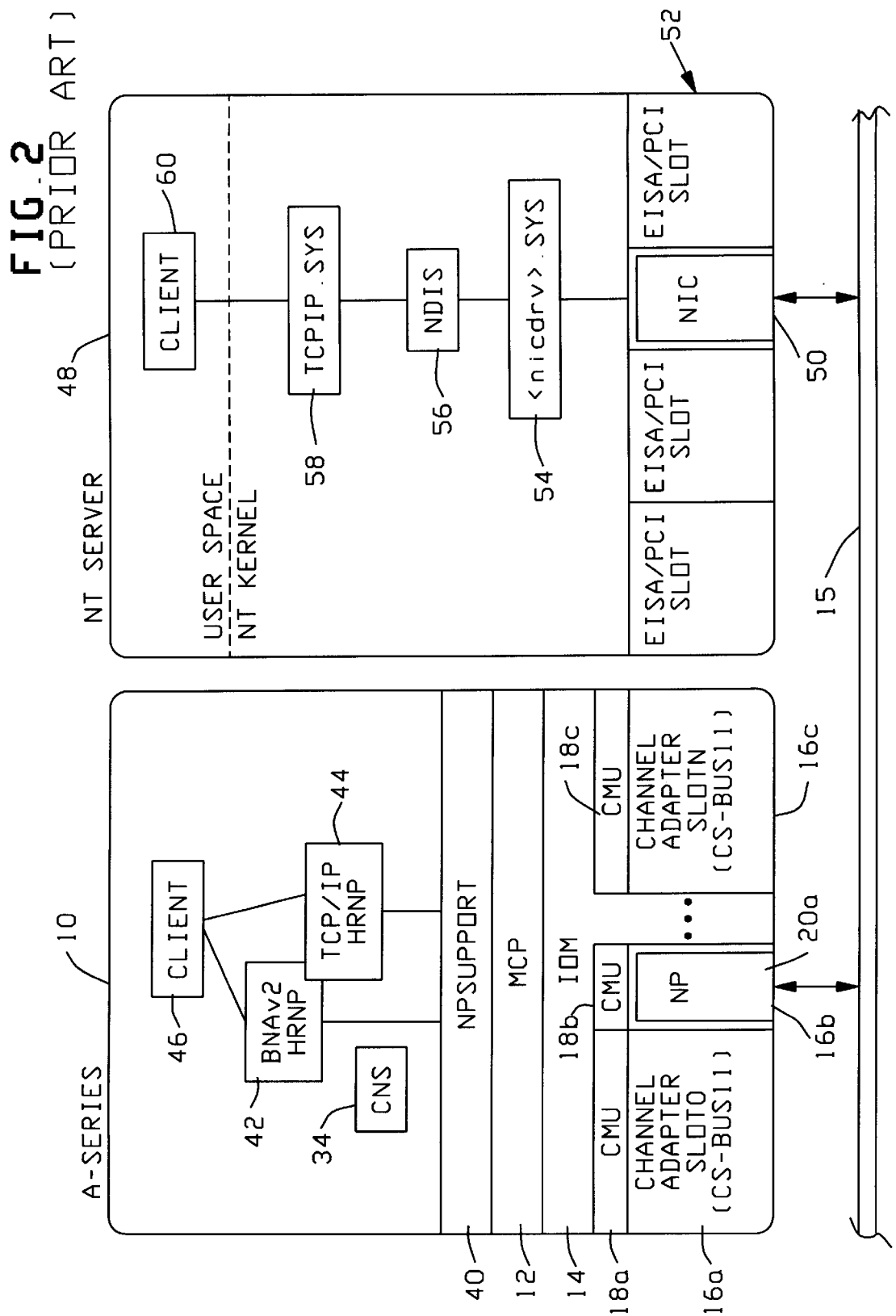
FIG. 2 is a block diagram showing a prior art method by which a Unisys A Series enterprise server can communicate via a network with a server running Microsoft Windows NT.

As will be described below with respect to FIGS. 6–37, the present invention is directed to methods and apparatus that enable a first network application, executing on a first computer system, and a second network application, executing on a second computer system, which is directly interconnected and closely coupled to the first computer system, to communicate at high speed, with low latency, over the interconnection therebetween such that both systems may use their native mechanisms to communicate with each other without affecting the network applications, rather than over conventional network communication paths such as TCP/IP and Ethernet. In accordance with a preferred embodiment thereof, the present invention comprises an interconnection that couples the input/output (I/O) subsystem of the first computer system to the I/O subsystem of the second computer system and over which data can be transmitted between the systems independent of a network interface card, an interconnection messaging system executing on the first and second computer systems that provides general purpose transport interfaces, and a virtual transport layer executing on the first and second computer systems that simulates a known transport layer protocol to the first and second network applications.

In one embodiment, described more fully hereinafter, the methods and apparatus of the present invention may be implemented as part of a Cooperative Networking Platform (CNP) (sometimes also referred to "NX/Network Services" or "NNS") provided as a feature of Unisys ClearPath HMP NX enterprise servers, in which, as mentioned above, a Unisys A Series enterprise server is tightly integrated with an Intel-based server running Microsoft Windows NT. In that embodiment, the A Series enterprise server comprises the first computer system and the NT server comprises the second computer system. As embodied in that environment, the present invention allows a network application on the A Series server to communicate with a peer network application on the NT server using native mechanisms at high speed with low latency.

The methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Apparatus of the present invention comprises an interconnection that couples the I/O subsystem of the A Series server 100 to the I/O subsystem of the NT server 102 so that data can be transmitted between the two servers, and a "virtual" transport layer ("VTL") and a messaging subsystem ("MSS") that provide communication paths between the A Series server 100 and the NT server 102. Additional details of the interconnection and of a virtual LAN ("VLAN") communication path providing data link layer network communications between the two servers are provided in the afore-mentioned related U.S. patent application Ser. No. 09/088,552, filed Jun. 1, 1998, the contents of which have been incorporated by reference. The VTL/MSS communications system implemented herein to allow transport layer network communications between the A Series server 100 and the NT server 102 will be described in detail hereinafter. Those skilled in the art will appreciate that the following detailed description is for illustrative purposes only and is not intended to limit the scope of the invention. Rather, the scope of the invention can be determined from the appended claims.

Figure 3:
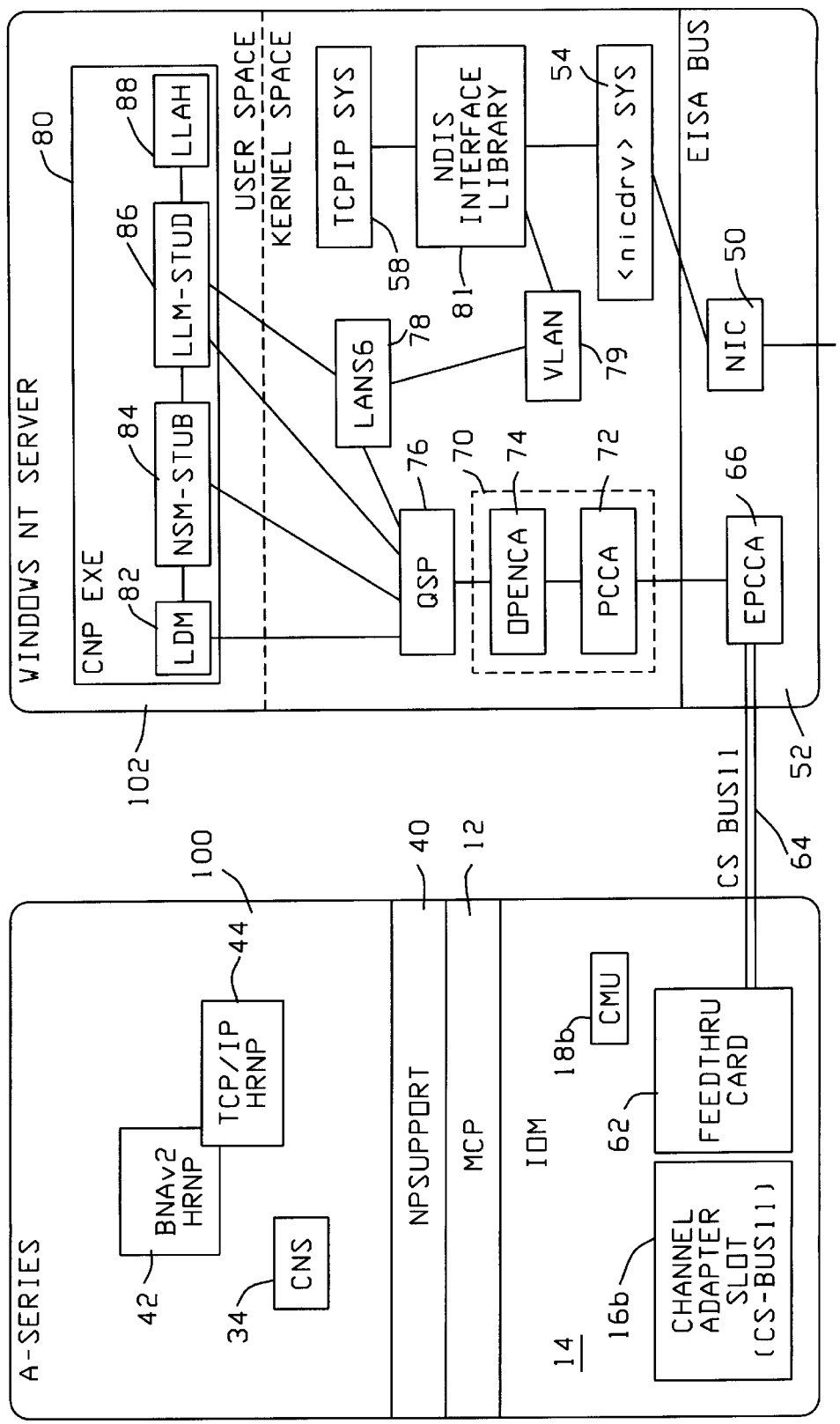
FIG. 3 is a block diagram illustrating a prior art apparatus that enables two closely coupled computer systems to communicate via a virtual LAN.
Figure 4:
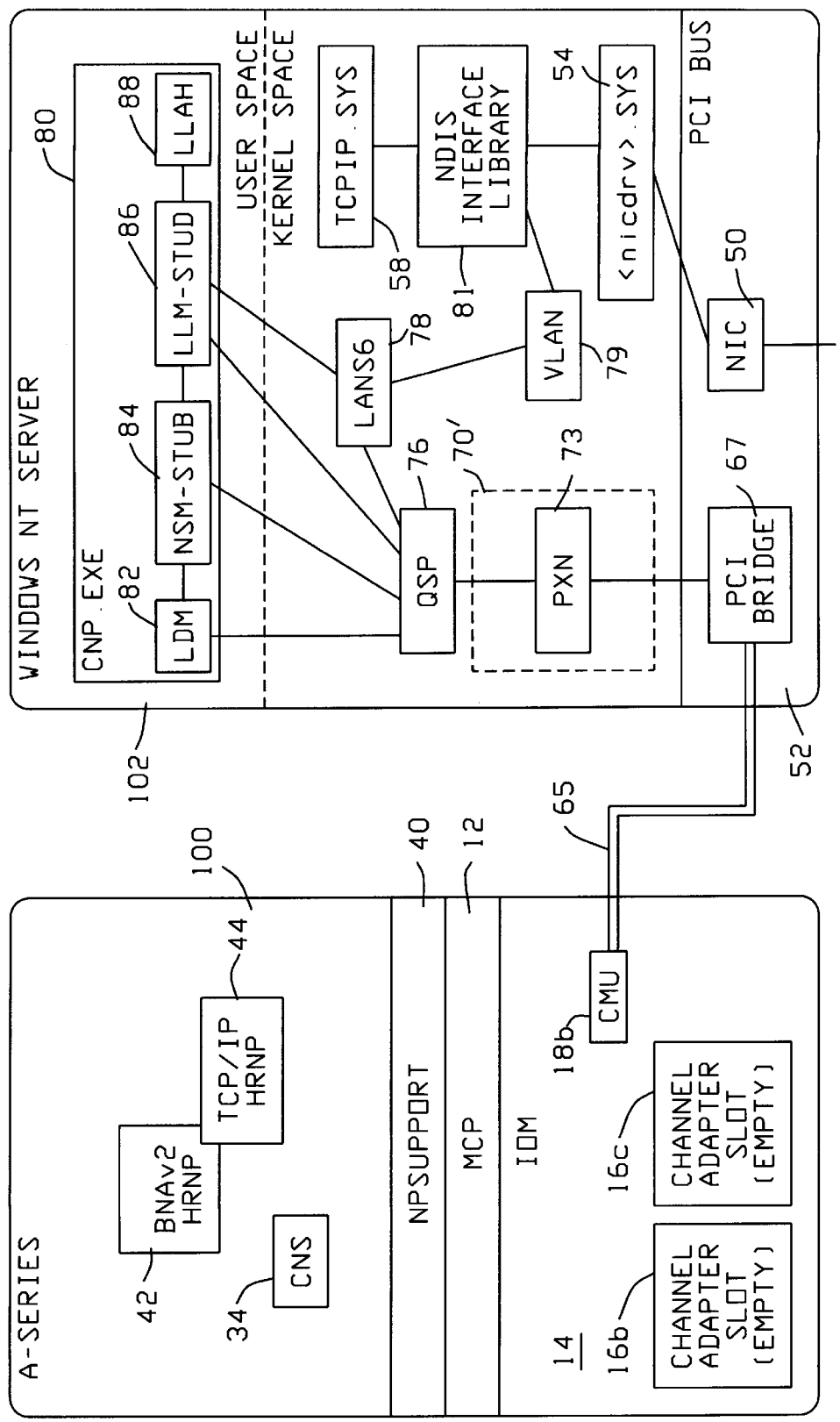
FIG. 4 is a block diagram illustrating the prior art apparatus of FIG. 3 with an alternative embodiment of the interconnection.
Figure 5:
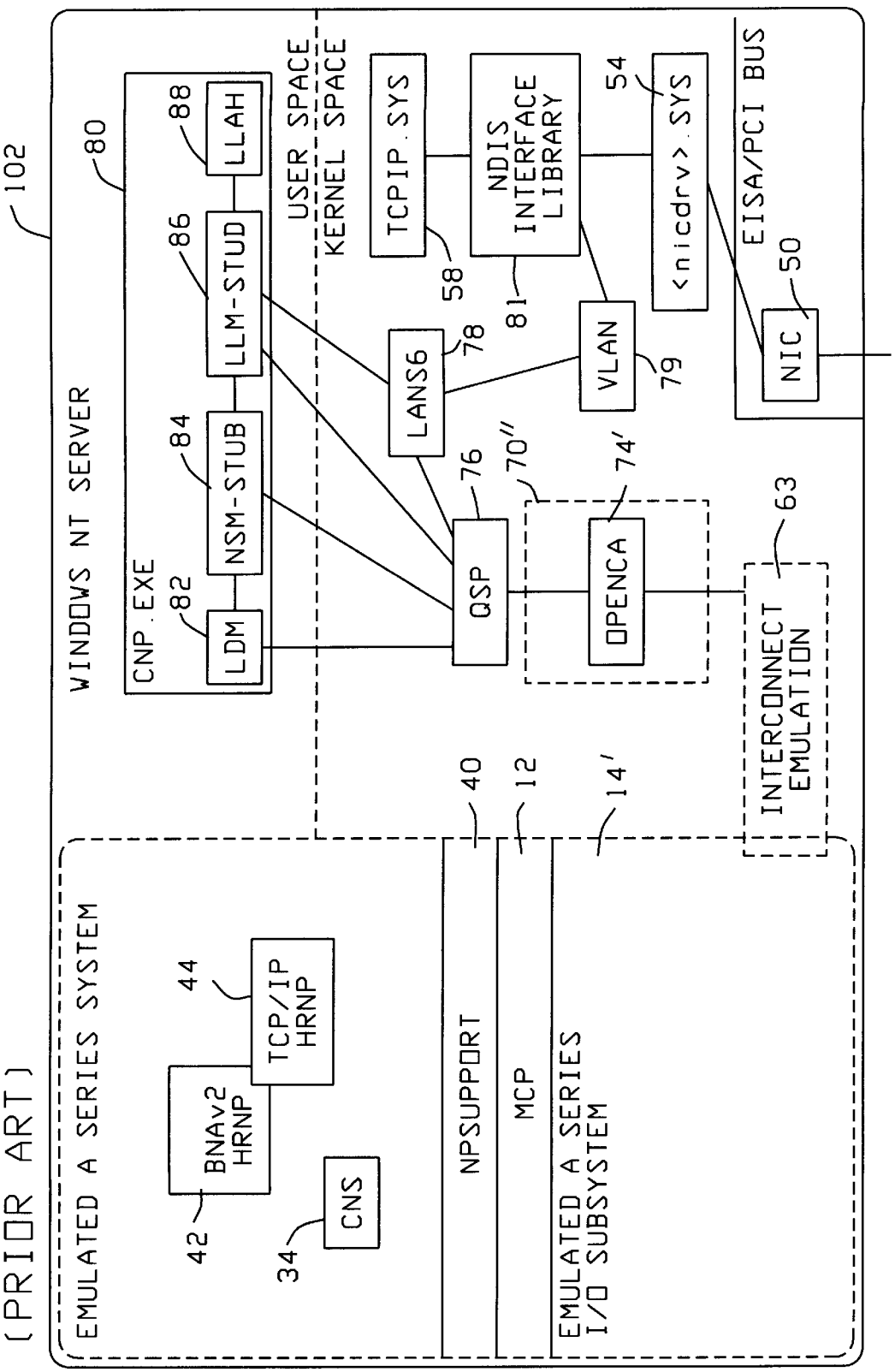
FIG. 5 is a block diagram illustrating the prior art apparatus of FIG. 3 with another alternative embodiment of the interconnection.
Figure 6:
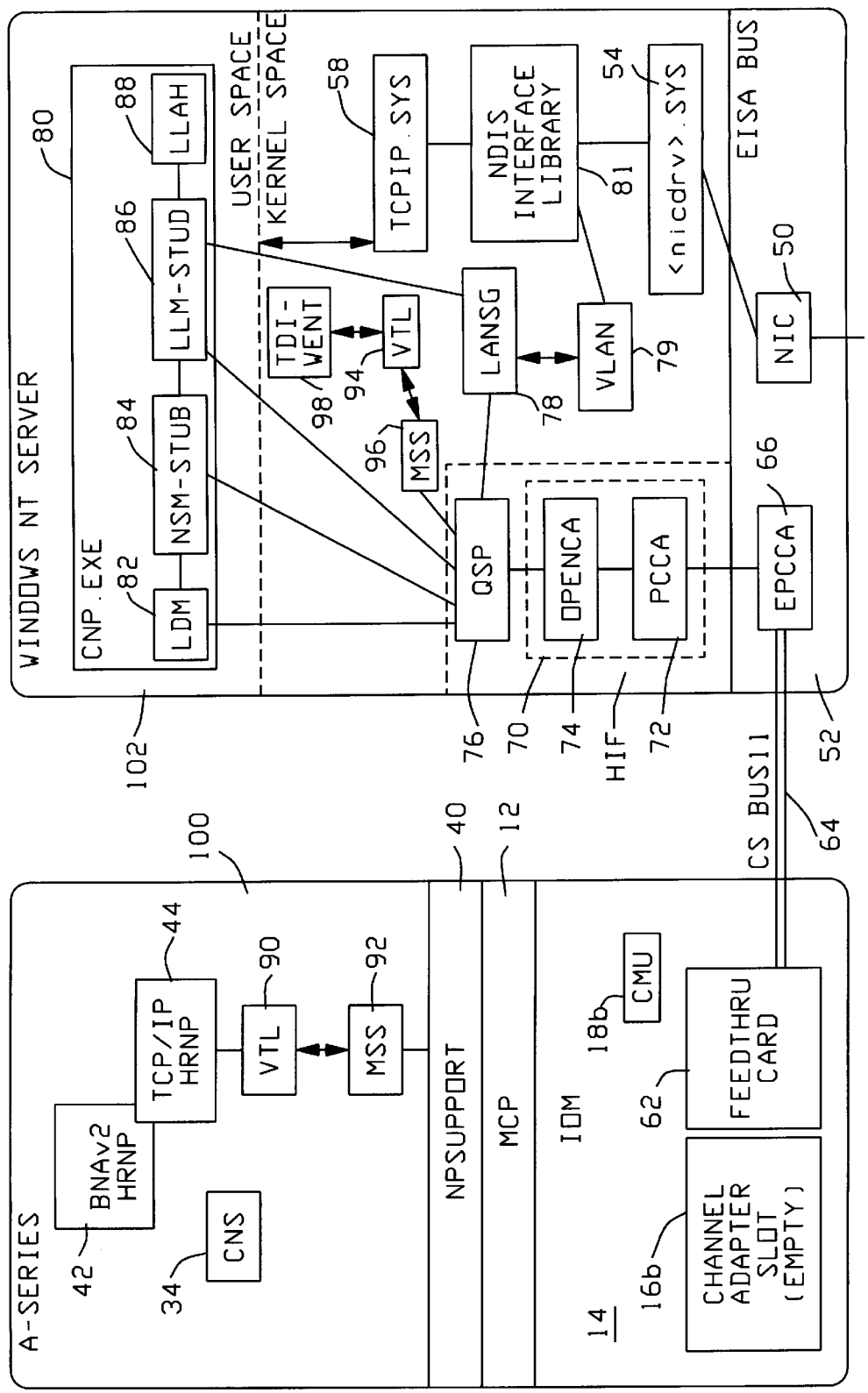
FIG. 6 is a block diagram illustrating an embodiment of the invention that enables two computer systems to communicate over the interconnect of FIG. 3 using a VTL/MSS protocol in accordance with the invention.
Figure 7:
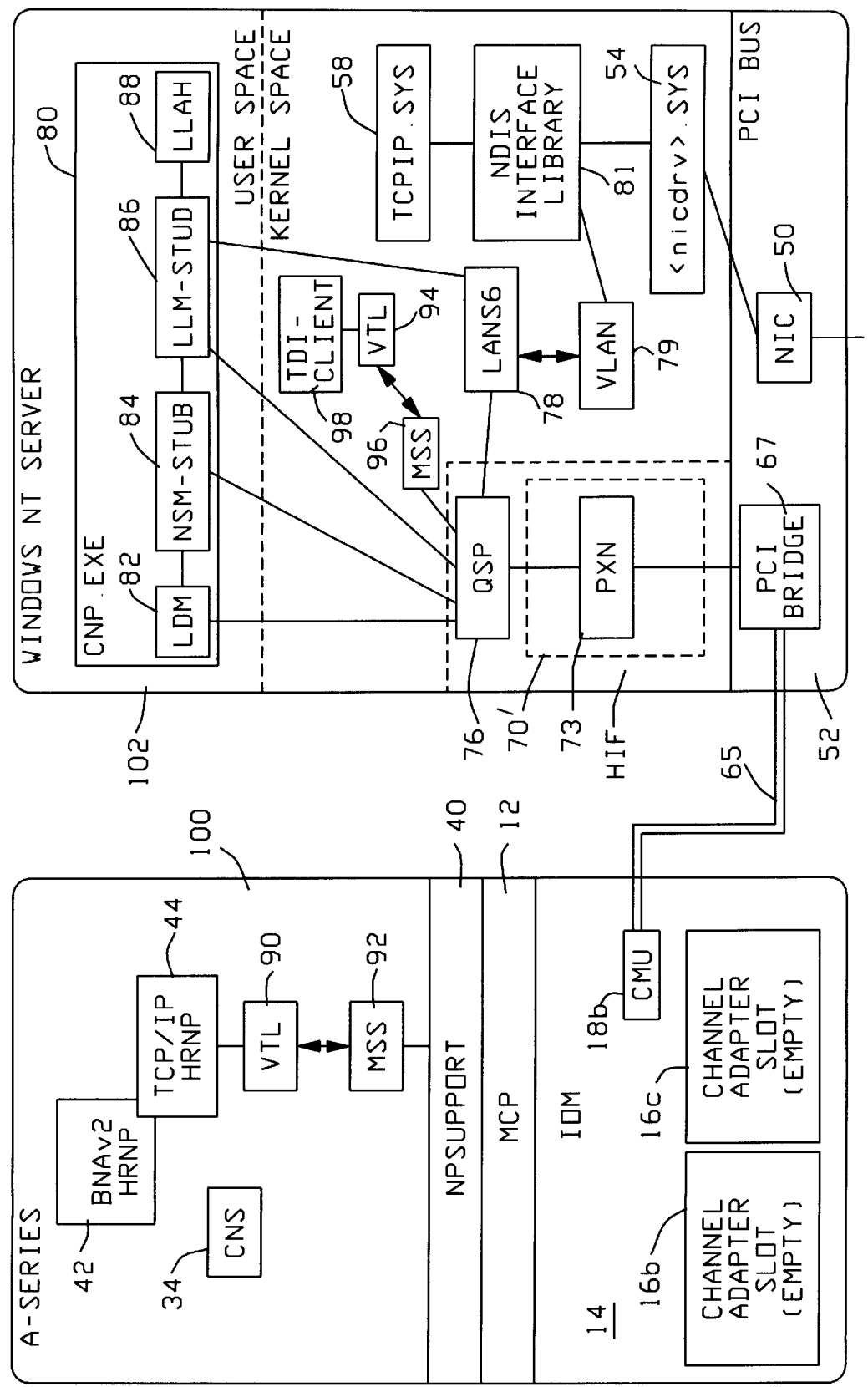
FIG. 7 is a block diagram illustrating an embodiment of the invention that enables two computer systems to communicate over the interconnect of FIG. 4 using a VTL/MSS protocol in accordance with the invention.
Figure 8:
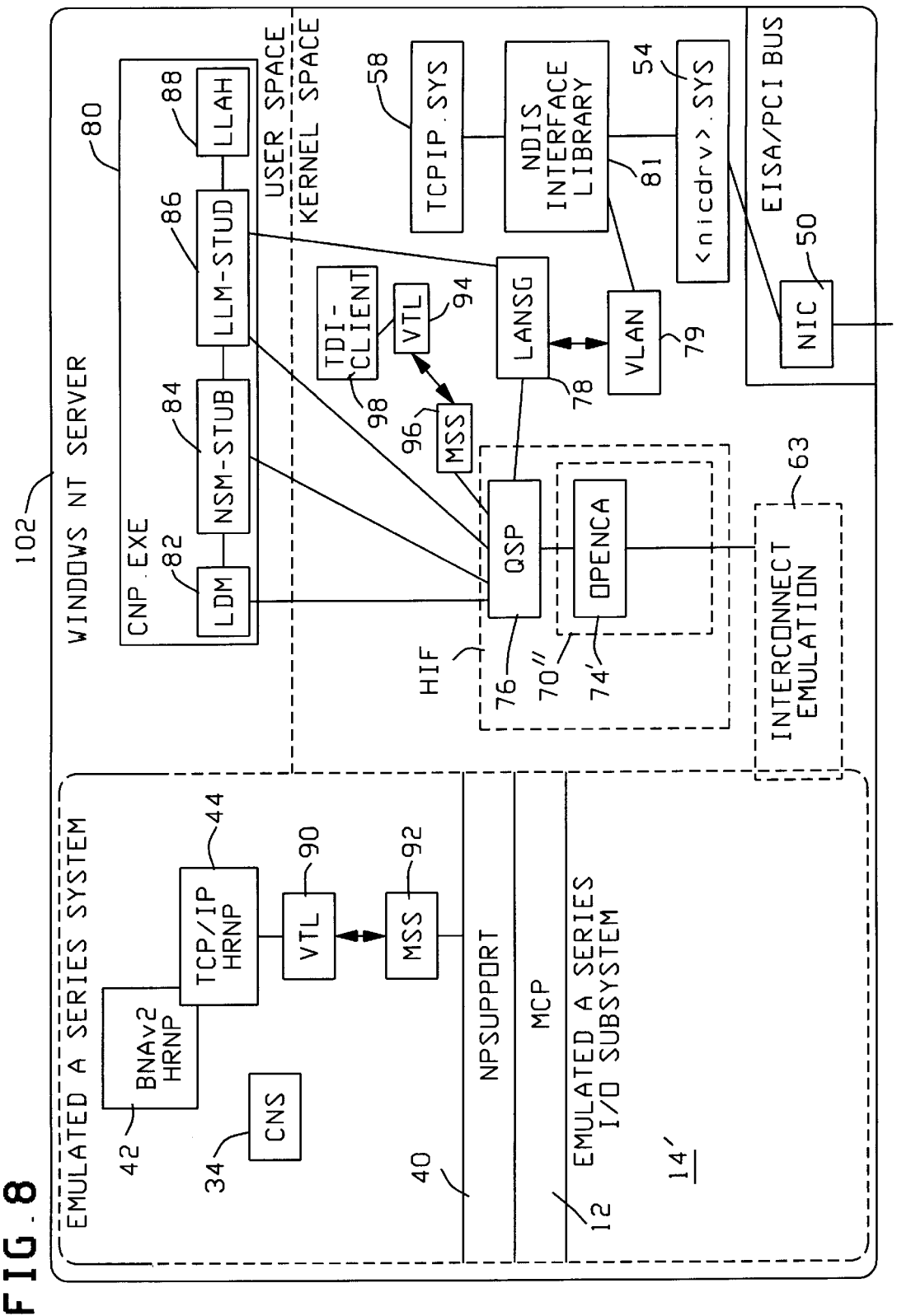
FIG. 8 is a block diagram illustrating an embodiment of the invention that enables two computer systems to communicate over the interconnect of FIG. 5 using a VTL/MSS protocol in accordance with the invention.

In the drawings, where like numerals represent like elements throughout, FIGS. 6–8 are block diagrams illustrating embodiments of the present invention for each of the interconnects described above with respect to FIGS. 3–5, in which the methods and apparatus of the present invention are implemented as part of a Cooperative Networking Platform (CNP) deployed on a Unisys ClearPath HMP NX computer system ("the ClearPath system"). In each case, a first network protocol provider 44 is provided on the A Series system 100, in this case a TCP/IP HRNP, and it has multiple network addresses (i.e., IP addresses) associated with it, one for each connection (e.g., channel adapter) out of the A Series system 100. As will be explained in detail below, the A Series system 100 also includes a Virtual Transport Layer ("VTL") 90 and a Messaging SubSystem ("MSS") 92 which allow the A Series system 100 to bypass the conventional ISO network protocol stack for communications with the NT Server 102 via the interconnect. In the embodiments of the invention, the VTL (just like the VLAN) has the unique IP address so that the A Series system 100 knows that VTL is internal, rather than external.

A second network protocol provider 58 is provided on the NT Server 102, in this case TCPIP.SYS (available from Microsoft Corporation), and it has its own network address (i.e., IP address) associated with each network interface card ("NIC") that defines a second network address in this embodiment. As also will be explained in detail below, the NT Server 102 also includes a Virtual Transport Layer ("VTL") 94 and a Messaging SubSystem ("MSS") 96 which allow the NT Server 102 to bypass the conventional ISO network protocol stack for communications with the A Series server 100 via the interconnect, where the VTL has the unique IP address so that the NT Server 102 knows that VTL is internal, rather than external. Any LAN-type NIC 50 that is compatible with Windows NT can be employed in a slot of the I/O bus of the NT Server 102. Preferably, the NIC supports the Fast-Ethernet networking protocol (e.g., 100Base-T). NICs of this type are available from numerous vendors and original equipment manufacturers (OEMs). NICs supporting other physical media types, such as Ethernet/802.3, FDDI, or Gigabit Ethernet, can alternatively be employed. Typically, a NIC vendor will supply a device driver with the NIC, which is installed in the kernel space of the operating system so that other entities on the system can access the networking functionality of the NIC. The NIC 50 of the exemplary systems of FIGS. 6–8 has a device driver 54 ("<nicdrv>.sys") that is installed in the Windows NT kernel space, as shown.

Other network protocol providers may be installed on the A Series and NT servers as well. For example, on the A Series server, a BNAv2 HRNP 42 may be provided, and an unreliable datagram protocol ("UDP") may be provided in addition to TCP/IP. However, because the BNAv2 protocol is a Unisys proprietary protocol and uses another addressing scheme for network endpoints, the BNAv2 HRNP 42 does not have an IP address associated with it.

FIGS. 9(a)–9(f) provide further details of how data is transferred between the A Series server 100 and the NT server 102 via the interconnection device driver of the HIF and the QSP module 76 in the embodiments of FIGS. 6–8. The details provided in FIGS. 9(a)–9(e) are applicable to any of the QSP-based embodiments of the Host Interface Function ("HIF") shown in FIGS. 6, 7, and 8. Thus, as used in the following discussion, the term interconnection device driver (ICD) refers to any of the three inter-connection device driver embodiments described with respect to those figures.

The QSP 76 multiplexes multiple client dialogs (e.g., dialogs with the NSM-stub and LLM-stub modules 84, 86 and with the different stations defined by LANSG 78) over one or more transfer units, which are an abstraction of the communication paths supported by the ICD. Units may be logical dialogs or physical devices. In order to more fully utilize the unit resources, the QSP 76 may aggregate messages waiting for transfer over a same unit into a block that can be transferred in a single operation. The QSP 76 supports such blocking by providing a Message-Count field in its message headers. The first message header in a block contains the number of messages that the block contains in its Message-Count field. Subsequent message headers within the block have a zero value in that field.

The ICD then takes each block and programs the physical connection (i.e., the EPCCA board 66, the PCI Bridge card 67, or the emulated memory-to-memory connection 63, depending upon the implementation) to transfer the block to the A Series server 100. In the reverse direction, the ICD is awakened when a message is transferred via the physical connection into the memory of the NT server 102, either by an interrupt (in the case of the hardware connections of FIGS. 6 and 7) or by a function call (in the case of the emulated connection 63 of FIG. 8). The ICD delivers the received message to the QSP 76, which in turn, distributes it to the appropriate client dialog (e.g., NSM-stub 84, LLM-stub 86, or a given station defined by LANSG 78), based on the destination queue address (a Remote Queue Reference or "RQR") associated with the message. In accordance with the invention, the NT Server 102 further includes a Virtual Transport Layer ("VTL") 94 and a Messaging SubSystem ("MSS") 96 which allow the NT Server 102 to bypass the conventional ISO network protocol stack for communications with the A Series Server 100 via the interconnect. Operation of the VTL and MSS interfaces will be described at length below.

FIGS. 9(a)–9(d) provide further information concerning the steps performed by the QSP 76 and ICD in transferring messages from a client on the NT server 102 (e.g., NSM-stub 84, LLM-stub 86, or a station defined by LANSG 78) to the A Series server 100 via the physical connection. This transfer process begins when a client, for example, the LANSG module 78, which may need to pass data received from TCPIP.SYS 58 to the A Series server 100, calls the QSP 76 requesting that a message (e.g., the data received from the network) be transferred to the A Series server 100. A parameter is passed with the request that points to non-contiguous message segments that comprise the full message. At step 112, the QSP 76 determines on what unit the message should be transferred. Next, at step 114, the QSP 76 calculates the total size of the message by examining each non-contiguous segment in the message. At step 116, a header is added to the beginning of the message, and a descriptor list is built that points to the header and to each segment in the message. Next, at step 118, the QSP 76 determines whether blocking (described above) is supported for this unit. If so, at step 120, the QSP 76 determines whether any blocks are presently waiting for transfer. If so, at step 121, the QSP 76 determines whether the message will fit in the last pending block. If so, then at step 122, the QSP 76 adds the descriptor list to the last pending block. Control then passes to step 127 (FIG. 9(b)).

If in step 118, blocking is not supported for this unit, or if in step 120 it is determined that there are no blocks presently waiting for transfer, or if in step 121 it is determined that the message will not fit in the last pending block, then control passes in all three cases to step 124. At step 124, the QSP 76 builds a block containing only the descriptor list built in step 116. Next, at step 126, the newly created block is added to the list of pending blocks. Control then passes to step 127 (FIG. 9(b)).

Figure 9B:
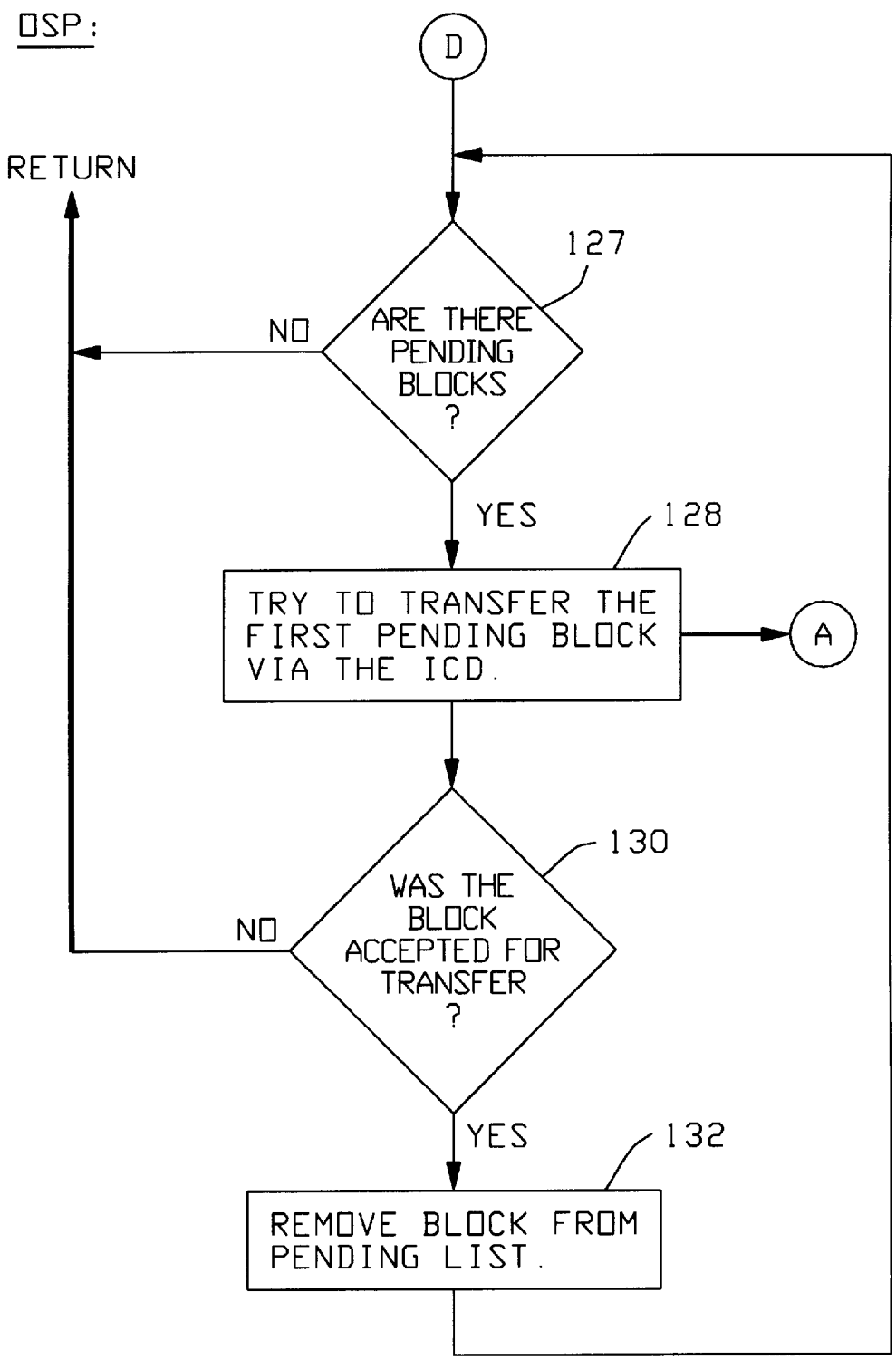

In FIG. 9(b), the QSP 76 determines whether any blocks are pending at step 127. If not, the QSP 76 simply returns to the client. However, if there are pending blocks to be transferred, then control passes to step 128.

Figure 9C:
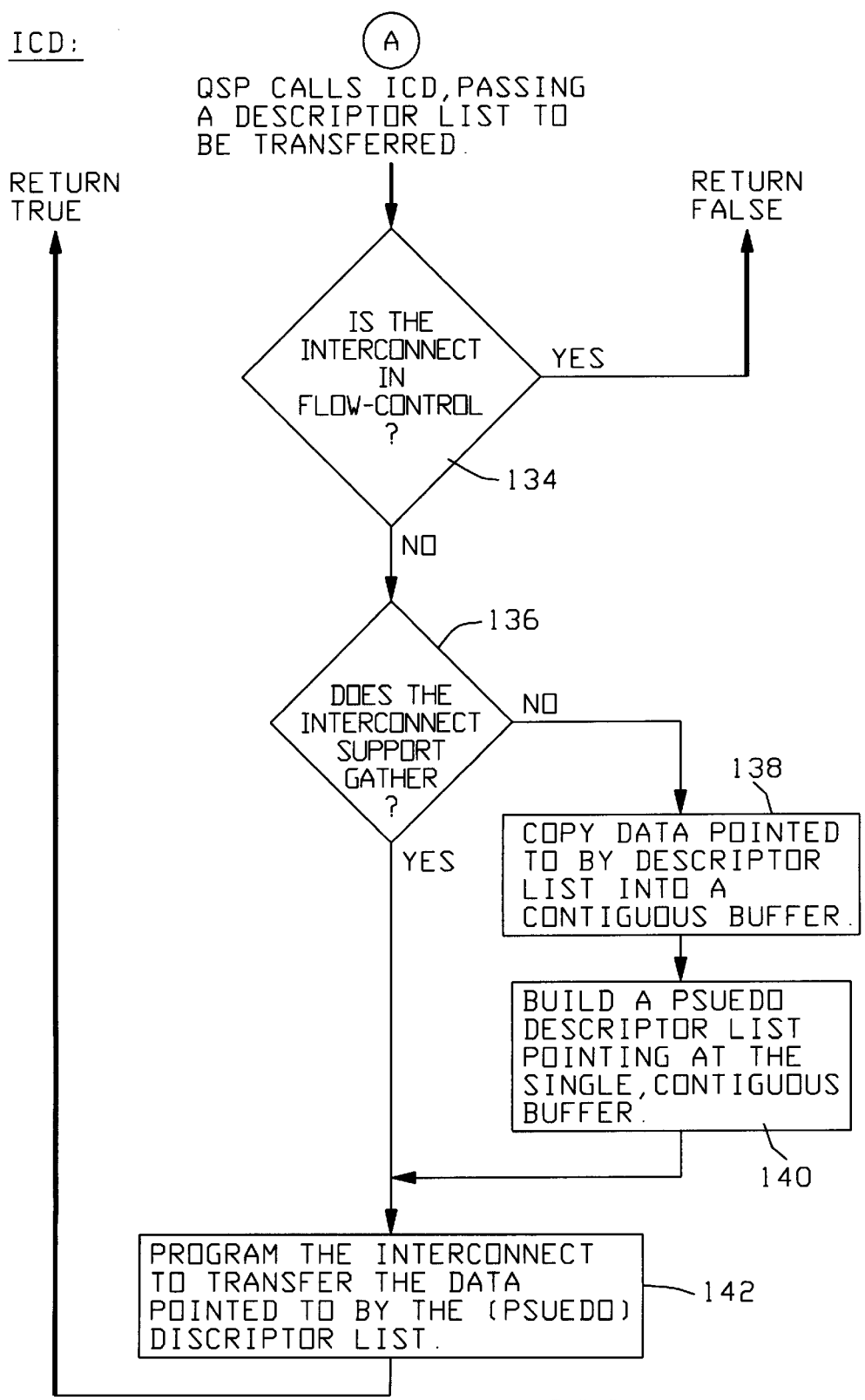

At step 128, the QSP 76 attempts to send the first block in the list of pending blocks to the ICD by invoking the HifSendBlockToHost() procedure of the ICD, which is called by the QSP 76 to deliver a block of data to the MCP 12. As indicated by the arrow labeled "A" in FIG. 9(b), the ICD begins processing the request at that point. The steps performed by the ICD are illustrated in FIG. 9(c). Still referring to FIG. 9(b), however, the QSP's processing continues to step 130, where the QSP 76 determines whether the ICD accepted the block for transfer. If so, that block is removed from the pending list at step 132, and control loops back to step 127 where the QSP 76 again checks whether there are any pending blocks to be transferred and processing continues for any such subsequent blocks. However, if in step 130 it is determined that the ICD did not accept a given block for transfer, then the QSP 76 returns to the client, leaving the block containing the message to be sent on the pending list.

As shown in FIG. 9(c), the ICD begins processing the HifSendBlockToHost() request from the QSP at step 134, where it determines whether the physical connection is in flow-control mode. Flow-control mode is a mode in which the MCP operating system 12 of the A Series server 100 is not prepared to receive data on the specific unit, for example, because no buffer is available. If the physical connection is in flow-control mode, the ICD returns a value of "FALSE" to the QSP 76 and stops processing the transfer at this point. If the physical connection is not in flow-control mode, then control passes to step 136 where the ICD determines whether the physical connection supports a Gather function. Gather is the ability to transfer data from non-contiguous memory regions in one operation. If the physical connection does not support a Gather capability, control passes to step 138 where the ICD copies the data pointed to by the descriptor list (passed to it by the QSP 76) into a contiguous buffer. Next, at step 140, the ICD builds a pseudo descriptor list that points at the single, contiguous buffer. Control then passes to step 142.

At step 142, whether entered directly from step 136 (Gather supported) or from step 140 (Gather not supported), the ICD programs the physical connection (i.e., the EPCCA board 66, the PCI Bridge card 67, or the emulated memory-to-memory connection 63 depending upon the particular embodiment) to transfer the data pointed to either by the descriptor list received from the QSP 76 (Gather) or the pseudo descriptor list created in step 140 (no Gather). The ICD then returns a value of "TRUE" to the QSP 76.

Figure 9D:
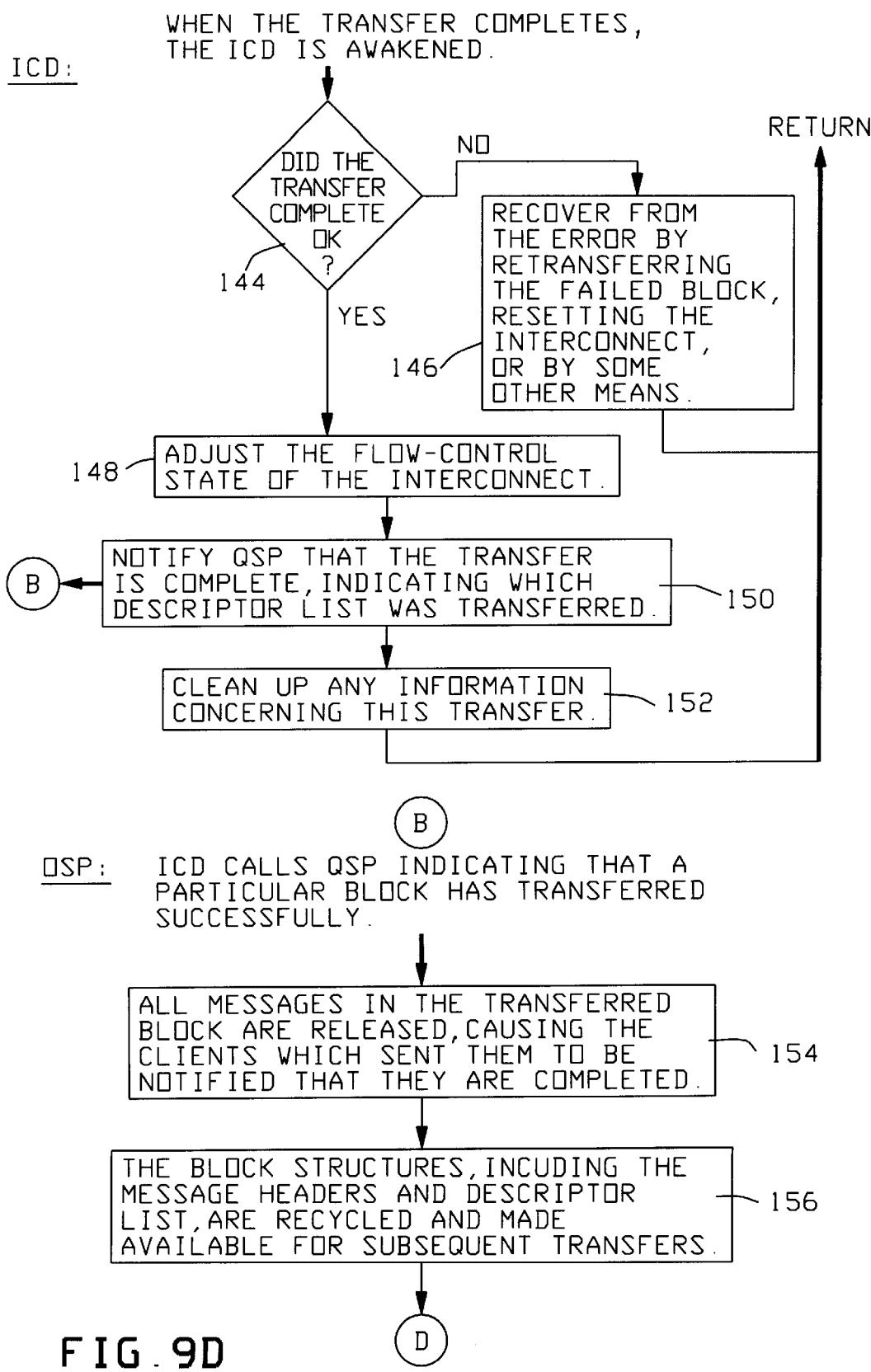

FIG. 9(d) illustrates the steps performed by the ICD and QSP 76 when the transfer completes. As shown, when the transfer completes, the ICD is awakened. At step 144, the ICD receives an indication of whether the transfer completed successfully. If not, control passes to step 146 where the ICD attempts to recover from the error by, for example, retransferring the block in question, resetting the physical connection, etc. If the transfer completed successfully, control passes to step 148. At step 148, the ICD adjusts the flow-control state of the physical connection. This is done because in the embodiments of the physical connection described above, the interconnection is polled. When a transfer completes, the interconnection may not be able to initiate another transfer until it is polled again, so the flow-control state is adjusted to reflect this. Next at step 150, the ICD calls the QspAckBlockToHost() procedure to notify the QSP that the transfer to MCP 12 is complete and to indicate which descriptor list was transferred. At step 152, the ICD performs a cleanup procedure and then returns.

As shown at point "B" in FIG. 9(d), when the QSP 76 receives the QspAckBlockToHost() indication from the ICD, notifying it that the transfer to MCP 12 completed successfully, the QSP 76 enters step 154 where all messages in the transferred block are released, causing the clients that sent them to be notified that they were successfully transferred. At step 156, the block structures, including the message headers and descriptor list, are recycled and made available for subsequent transfers. Control then loops back to step 127 of FIG. 9(b) for processing of subsequent blocks.

Figure 9E:
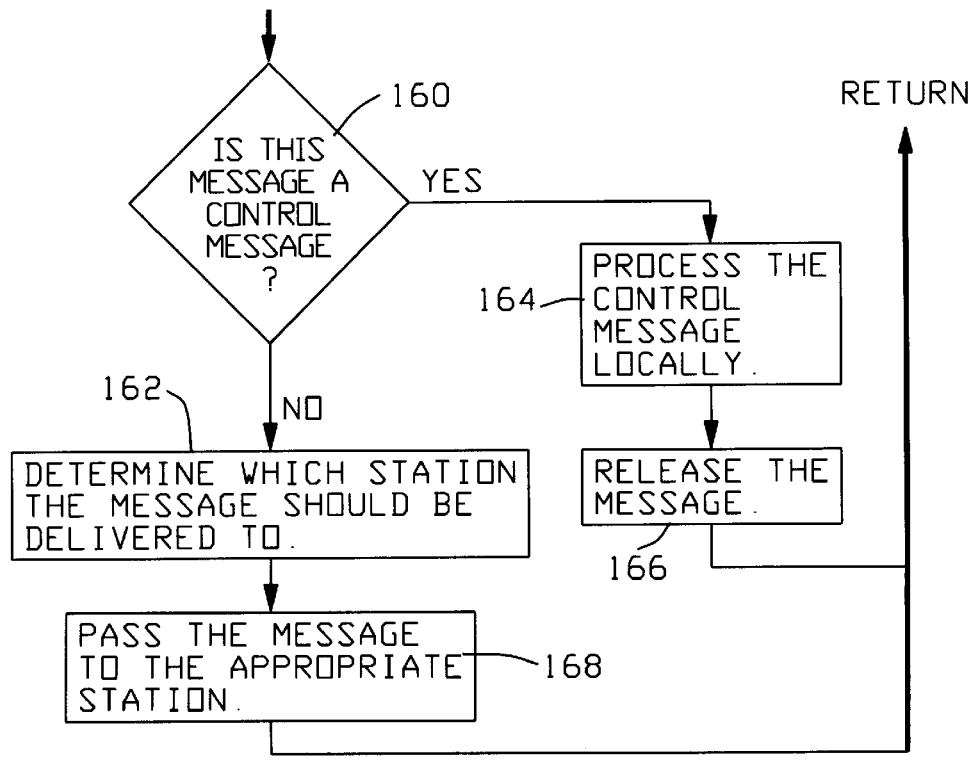
Figure 9F:
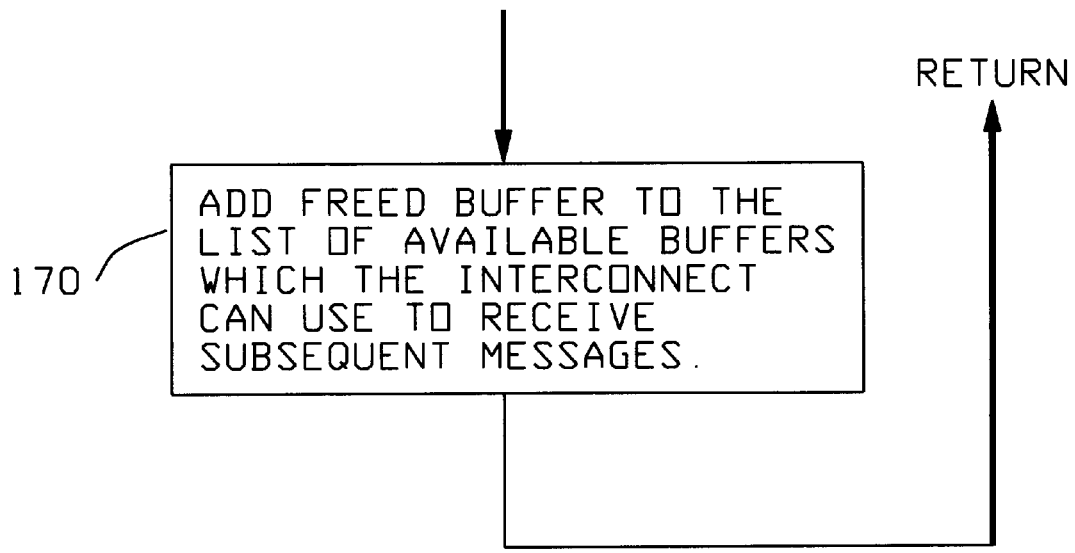

FIGS. 9(e)–9(f) illustrate the steps performed by the ICD and QSP 76 in transmitting a message from the A Series server 100 to the NT server 102. As shown, prior to the reception of any messages from the A Series server 100 via the physical connection, the ICD makes empty receive buffers available to the connection. When a message is transferred from the A Series server 100 to the NT server 102 via the physical connection (e.g., through the feedthrough card 62, across cable 64, and through the EPCCA card 66 in the embodiment of FIG. 6), the ICD is awakened with an indication that a message has been received into one of the empty receive buffers that it posted. At step 158, the ICD passes the message to the QSP 76 from the A Series server 100 using the QspLRPut() function and returns.

At step 160, the QSP 76 determines whether the message is a control message. If so, at step 164, the QSP 76 processes the control message locally, and then releases the message at step 166 and returns. If the message is not a control message, then control passes to step 162. At step 162, the QSP 76 determines from the RQR in the message header which station is to receive the message. Next, at step 168, the message is passed to the appropriate station.

As shown in FIG. 9(f), when the QSP 76 or one of its clients releases the message buffer, a free message callback function of the ICD is invoked. At step 170, the ICD adds the freed buffer to the list of available buffers which the physical connection can then use to receive subsequent messages in the manner described above.

As noted above, VLAN 79 provides a high speed communications interface between the A Series server 100 and the NT server 102. As shown in each of the embodiments of FIGS. 6–8, a Virtual LAN Miniport driver (VLAN) 79 is provided in the communications path between the A Series server 100 and the NT server 102. Generally, VLAN 79 is an NDIS device driver which appears as a "Virtual LAN" to both the A Series TCP/IP network provider (TCP/IP HRNP 44) and to the Windows NT-based TCP/IP stack (TCPIP.SYS 58). VLAN 79 implements a high speed, low latency path between an A Series server 100 and an NT server 102 such that both servers may use their native mechanisms to communicate with each other.

VLAN 79 is a Windows NT Network Driver Interface Specification (NDIS) driver that simulates an NDIS Fiber Distributed Data Interface (FDDI) network interface card (NIC) Miniport driver to TCPIP.SYS 58 on the NT server 102 and exchanges data with the LANSG 78 via line 0 for delivery to and receipt from the A Series server 100. In other words, VLAN 79 appears to be an FDDI NIC to TCPIP.SYS 58 and to the LANSG 78. However, in reality, VLAN 79 is just a NDIS device driver that simulates an FDDI interface card to the Windows NT NDIS Wrapper. VLAN 79 provides the same external interfaces as any other NDIS driver. VLAN 79 conforms to the standards set by Microsoft for NDIS Miniport Drivers in order to remain transparent to the higher layer protocols. VLAN 79 has a procedural interface to the LANSG module 78 which is not bound by strictly enforced interface definitions. Generally, the interface to LANSG is based upon a modified set of the rules that are enforced by the NDIS Wrapper.

As described in the afore-mentioned commonly owned application, VLAN 79 emulates an FDDI-like LAN, although it is really point-to-point within the memory of the NT server 102. Because a standard LAN such as FDDI is emulated, the communications protocol, for example, TCP/IP on both servers, can work unmodified. Likewise, all programs that use TCP port files on the MCP 12, and WinSock TCP sockets on the NT server 102 can intercommunicate without changes. Also, because the LAN connection is actually the memory of the NT server 102, the latency of a message going from the NT server 102 to MCP 12 or vice-versa is small, and the VLAN 79 can sustain a higher transaction rate than other channel adapters. Also, emulating an FDDI LAN allows the use of segment sizes larger than can be supported over Ethernet (4500 bytes versus 1500 bytes for Ethernet). Moreover, because the overhead of each segment is spread out over larger segments, the overall data throughput is correspondingly higher.

The present invention provides performance optimized communication between applications in co-resident, closely coupled MCP and NT processing environments by replacing the conventional TCP transport and lower layers with a virtual transport layer ("VTL") and a messaging subsystem ("MSS") for data transfers between the closely coupled systems. In accordance with the invention, VTL/MSS provide a homogeneous connection oriented interface which reliably delivers data to the other of the closely coupled systems or indicates that no connection is available. MSS is a system interconnect independent messaging transport which presents to its users many different delivery and notification mechanisms for the reliable transfer of both control and data information between different heterogeneous environments, while VTL uses the MSS connection to provide a consistent, interconnect independent interface to the session layer. In preferred embodiments, the underlying interconnection may be the afore-mentioned QSP interconnect, an emulated interconnect, or a CIA interconnect of the type described in U.S. patent applications Ser. Nos. 08/887,228, 08/887,295, or 08/887,296, all filed Jul. 2, 1997, and all assigned to the present Assignee, Unisys Corporation. The contents of these applications are hereby incorporated by reference in their entireties. For each interconnection, the MSS allows for receipt of all acknowledgments before the transmitted data is dropped from the transmitting system's memory. Large messages may be sent since it is not necessary to break the messages into LAN segment sizes, thereby further improving communications efficiency. Since the MSS interfaces directly to the host interface function ("HIF"), when the interconnect is changed, only the MSS interface to the HIF needs to be changed; all other software need not be modified.

Figure 10:
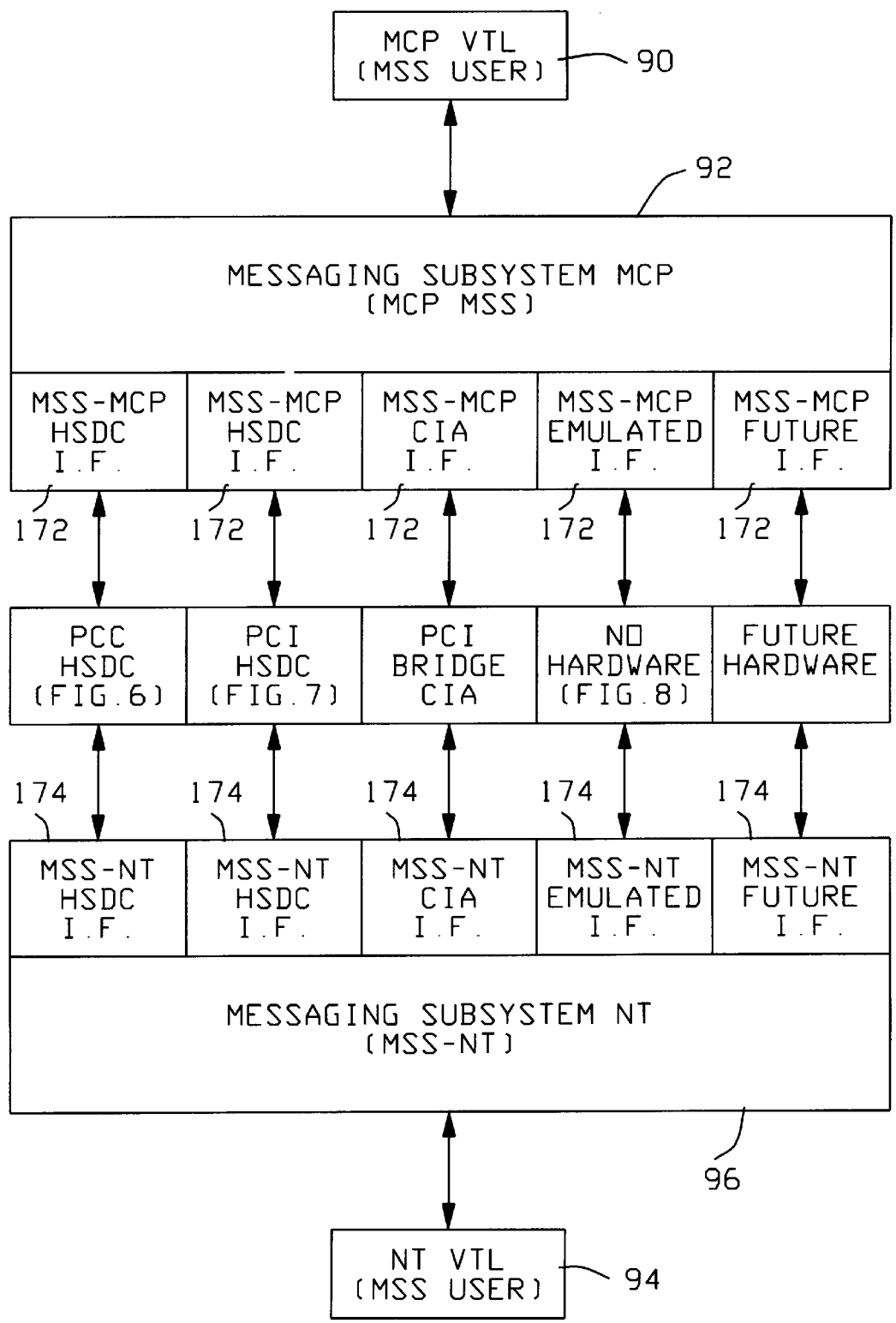
FIG. 10 illustrates the VTL/MSS interconnect communications interfaces of the invention.

FIG. 10 illustrates the VTL/MSS interconnect communications interface of the invention on a ClearPath HMP NX enterprise server with one MCP environment and one NT environment. As illustrated, the communications interface includes messaging subsystem (MCP MSS) 92 and its MSS "user" (MCP VTL 90). MCP MSS 92 includes a plurality of modules 172 which include interfaces to the respective Host Interface Functions ("HIFs") or interconnects in the respective user environments provided between the A Series server 100 and the NT Server 102 in accordance with various embodiments of the invention. For example, the HIFs include the PCCA HIF illustrated in FIG. 6, the PCI Bridge HIF illustrated in FIG. 7, the interconnect emulation of FIG. 8, the communication intraconnect architecture ("CIA") described in the afore-mentioned related patent applications, or an interconnect of another type yet to be developed. MSS-NT 96 similarly includes a corresponding plurality of modules 174 which interface to the respective HIFs. Preferably, the VTL/MSS path is designed such that when the interconnect architecture is changed, only the MSS interface modules 172, 174 to the HIF are affected. Finally, MSS-NT 96 interfaces with its MSS "user" (NT VTL 94), which, in turn, interfaces with the transport driver interface client ("TDI-Client") 98. As will be apparent from the following description, the communications interface illustrated in FIG. 10 creates a data dialog (referred to herein as "MSS_Endpoint_Dialog") which permits data to be delivered reliably in larger blocks (e.g., 64 kbytes, as determined by the maximum transfer size of the HIF) than is possible with conventional TCP/IP protocols.

The VTL/MSS protocol of the invention for use in communicating via the above-described HIFs and replacing the conventional TCP/IP protocol in accordance with the invention will be described in the following sections, starting with the messaging subsystem ("MSS") and concluding with the "virtual" transport layer (VTL).

I. MESSAGING SUBSYSTEM ("MSS")

The Messaging SubSystem ("MSS") is a system interconnect independent messaging system used by VTL or other transport layer protocols ("MSS users") in place of the the conventional TCP/IP protocols to provide different messaging models (both a pull model and a push model) and a variety of services to its users. As shown in FIG. 10, the MSS is a general purpose messaging architecture suitable for any networking use. Generally, the MSS is analogous to the current network provider's (e.g., TCP/IP and BNA network providers) I/O interface to Network Processors of the MCP 12. However, the MSS provides a level of abstraction from the actual I/O interface which allows the same interface to be used across a plurality of system platforms and system interconnect paradigms. As will be appreciated by those skilled in the art from the following description, unlike the TCP/IP protocols, MSS provides for the reliable delivery of data to its users. One such user is the Virtual Transport Layer ("VTL") to be described in detail in the next section.

Generally, in a preferred embodiment, the MSS is responsible for the initiation, data transfer, and termination of dialogs between the NT VTL component 94 and MCP VTL component 90 across the system interconnect(s) provided by the system platform architecture. The MSS provides multiple data dialogs between clients and server(s) and hides any platform or system interconnect independent characteristics and idiosyncrasies from the MSS "user." The MSS presents a procedural interface (with callbacks) for its users to perform these services.

Since all system interconnects present the same interface to the MSS "user," no changes are necessary in the MCP VTL component 90 or NT VTL component 94 because of the MSS or because of changes in the interconnect. However, since the MSS interface provides both a "pull model" and a "push model," components in different environments may wish to use different delivery semantics for environment-specific reasons.

In presently preferred embodiments of the invention implementing VTL (the "MSS user") in place of TCP, the MSS is initialized by the NT VTL component 94 and MCP VTL component 90 upon startup via a call to MSS_Initialize(). This creates any structures needed by the MSS. MSS, upon initialization, searches the interconnect for other MSS users which have already been initialized. It informs the local MSS user about any complementary MSS users via a USER-CHANGE-NOTIFICATION (e.g., it tells the local VTL components about any other VTL components found in the interconnect). There is one USER-CHANGE-NOTIFICATION for each remote MSS user found. This can be used by the local MSS user to initialize with each remote MSS user (e.g., exchange IP addresses or other configuration information). The local MSS is terminated via a call to MSS_Terminate() from the NT VTL component 94 or MCP VTL component 90. This terminates any MSS dialogs from this environment. All remote environments with dialogs to this local environment are notified via a DIALOG-CHANGE-INDICATION (for Endpoint (or data) Dialogs) and a USER-CHANGE-INDICATION (for the control dialogs).

Following initialization by a user, the MSS is responsible for initializing with all of its counterparts executing in remote complementary environments. This means that the MCP MSS 92 must initialize with all NT MSSs 96 which are active. The MSS is also responsible for allocating and reserving some amount of memory for incoming messages from remote environments as well as for outbound control information (which is transmitted along with outbound data requests). This area will be different for each environment (MCP versus NT) as well as each system interconnect paradigm (e.g., FIGS. 6, 7, 8, or CIA).

Operation of the MSS will be described below in four major areas: (1) Remote MSS User Management functions which allow the MSS to inform its users of status changes of remote MSS users (those in different co-resident environments); (2) Endpoint Dialog Management functions which allow MSS Users to establish, receive status about, and destroy MSS Endpoint Dialogs with remote MSS users; (3) Control Message Transfer Functions which allow MSS users to transfer control messages with each other such that control message content is completely transparent to the MSS; and (4) Data Transfer functions which allow MSS users to transfer data separate from Control Message Transfer in order to provide optimization of data transfers.

A. Remote MSS User Management

The MSS is responsible for informing its local users of status changes of remote users. Remote user status is distinguished only as either "available" or "unavailable". The MSS provides its users with a User-Change-Notification whenever it detects a status change for a remote user of interest to one of its local users. The notification indicates the current status of the remote user. When "available" is indicated, the MSS identifies the environment which the remote user is located in, the MSS control dialog connecting the MSS users, and the remote user's type (e.g., NT VTL component 94, MCP VTL component 90). In response, the MSS user provides its own local reference value for the indicated MSS dialog. MSS includes this reference in any other operations on the same control dialog.

On detecting a remote user's change to "unavailable" status or any error which occurs on the dialog, MSS also provides a User-Change-Notification. Once told of a remote user's unavailability, the corresponding MSS dialog can no longer be used. If the dialog is "unavailable," functions performed on that dialog will not work and return an error result to the caller. The dialog can be used again when a User-Change-Notification of "available" is presented to the MSS user.

B. Endpoint Dialog Management

In addition to the control dialog which the MSS automatically establishes on behalf of its users, an MSS user may also establish additional MSS_Endpoint_Dialogs at its discretion. MSS provides two operations for this purpose: Create-Endpoint-Dialog and Open-Endpoint-Dialog. In order to complete MSS_Endpoint_Dialog establishment, a Create-Endpoint-Dialog operation is performed by one of the MSS users and an Open-Endpoint-Dialog is performed by the peer MSS user. The Open-Endpoint-Dialog operation requires information obtained via the Create-Endpoint-Dialog; this information is communicated to the peer over a control dialog (or any other applicable mechanism).

To perform a Create-Endpoint-Dialog, the MSS user provides sufficient information to uniquely identify the remote MSS user to which a dialog should be established. This includes the environment in which the remote user is located, the remote user's type, and an identifier for the particular instance of the remote user. In addition, the MSS user also indicates any options for this dialog describing how it wishes MSS to deliver data to the remote user, along with a local reference to be used by the MSS for any notifications back to the MSS user about this dialog. On completing a Create-Endpoint-Dialog, the MSS provides a system-unique identifier for this MSS dialog. To complete the process, the peer MSS user must be given the value of the dialog identifier obtained by the Create-Endpoint-Dialog and then invoke an Open-Endpoint-Dialog, providing that value as input (along with its own local reference value for the local MSS). However, a MSS user may not utilize a dialog after a successful completion of a Create-Endpoint-Dialog or Open-Endpoint-Dialog because the dialog will not be completely established. The MSS user must wait for a Dialog-Change-Notification of "available" to start sending data over this dialog.

Generally, the MSS_Endpoint_Dialogs have five states: PENDING_OPEN, OPEN, NOT_READY, REMOTE_CLOSED, and CLOSED. PENDING_OPEN indicates that the local environment has successfully completed the create MSS_Endpoint_Dialog, but the remote environment has not initiated the corresponding open or the open has not completely finished. Data cannot be sent or received on this dialog. OPEN indicates that the MSS_Endpoint_Dialog is active and ready for use. Data can be sent or received on this dialog. NOT_READY indicates that this dialog is being flow controlled. Data cannot be sent on this dialog; however, data may be received. The REMOTE_CLOSED dialog is in the process of closing or destroying. The remote environment has closed the dialog and the user has been notified about this closure. Data may still be available in the MSS for this dialog, but new data cannot be sent using this dialog. Finally, CLOSED indicates that this dialog is closed and that data cannot be sent or received across this dialog.

MSS_Endpoint_Dialogs are terminated by performing a Close_Endpoint_Dialog or Destroy_Endpoint_Dialog operation. If the Close_Endpoint_Dialog operation is performed, then peer MSS users perform this operation independently, and are notified of the remote side closing by a remote close indication. After the local MSS user closes, the remote user cannot send data on this dialog, but the remote user can retrieve any queued input data on this dialog, until it closes its side of the dialog. If the Destroy_Endpoint_Dialog operation is performed, then the remote user is notified immediately that the dialog is "CLOSED" and all waiting data is discarded.

C. Control Message Transfer

Control Message Transfer functions allow MSS users to transfer control messages with each other. Control message content is completely transparent to the MSS. A MSS user initiates a control message transfer by starting a Send-Control-Message operation. The caller identifies the MSS dialog to send on, the length of the message, and a pointer to the start of the message. The target MSS dialog need not be a control dialog, for the control message may be sent over MSS_Endpoint_Dialogs. If sent over an MSS_Endpoint_Dialog, control messages are delivered in order with any data messages sent on the same dialog. The peer MSS component delivers a control message to an MSS user via Receive-Control-Message, providing the MSS user's reference value for the MSS dialog data arrived on, the length of the data, and a pointer to the data. Control messages must be sent and delivered (into and out of the MSS) in a contiguous memory area.

D. Data Transfer

Data Transfer functions allow MSS users to transfer data in an efficient manner. MSS supports both byte-stream and message oriented data transfers. An MSS user selects the mode of operation by its setting (or not setting) the MSS_Endpoint_Dialog's message-oriented option. The MSS requires that both ends of an MSS_Endpoint_Dialog use the same message-oriented option value. An MSS user also must select the mode of data delivery for MSS to use when data arrives in the local environment.

For MSS data transfer, the following operations are used by MSS:

The Deliver-Data operation requests that MSS deliver data over an MSS dialog. Data is delivered to the peer MSS user via either a Data-Notification or Accept-Data operation. This operation may not be performed on a control dialog. However, the request need not be used exclusively for application data, for the MSS user may choose to send control information using this mechanism. All data presented to MSS, excluding the MSS header, is usually in a contiguous memory area. MSS is responsible for delivering data reliably and in order. For both byte-stream and message oriented dialogs, MSS may chose to deliver data to the peer MSS user in more than one piece. If delivered in multiple parts, partial and final transfers are noted as such to the receiver, including indications of the length of this portion of the data and the length of the original Deliver-Data request. For message-oriented dialogs, the MSS and MSS user cooperate to handle message semantics. Two variants of Deliver-Data exist and are applicable to both stream and message oriented dialogs: (a) the "shared-buffer" variant which allows ownership of the data buffer to be passed to MSS, and (b) the "private-buffer" variant in which MSS must copy the data into buffer(s) it is responsible for acquiring. MSS is permitted to reject either variant of this request with a "no resources" indication. For the shared-buffer variant of this request, MSS is responsible for providing a Deliver-Data-Completed indication to the caller when the operation has been completed.

The Deliver-Data-Complete operation indicates to the MSS user that a previously initiated Deliver-Data operation has been completed. This indication may occur independently of processing occurring in the receiving environment; it does not indicate that the peer MSS user has received the data, only that the local MSS component has completed its processing and ensures delivery (barring dialog failure). The MSS user is provided with a transparent (to MSS) reference value which it provided in its corresponding Deliver-Data operation.

The Accept-Data operation is the resultant action of completing a Deliver-Data request initiated by a peer MSS user when the receiving MSS user has selected the Auto-Data-Delivery dialog option. This request always includes passing buffer ownership from MSS to the MSS user; there is no private-buffer variant of this operation. When the MSS user has completed its processing, it is responsible for providing a corresponding Accept-Data-Complete notification to the MSS.

The Accept-Data-Complete operation provides MSS with an indication that a previously initiated Accept-Data operation has been completed. MSS is provided with a transparent (to the MSS user) reference value provided by the MSS in its corresponding Accept-Data operation.

The Data-Notification operation is an indication provided by MSS to inform a MSS user that data is available. This occurs as a result of the MSS completing a Deliver-Data request by a peer MSS user when the MSS user has not selected an Auto-Data-Delivery dialog option. MSS indicates how much data is available but no transfer of data or buffer ownership occurs with this action.

The Retrieve-Data operation is a request made by a MSS user to retrieve data from MSS (previously indicated via a Data-Notification). The MSS user provides a buffer, with maximum data length indication, into which MSS is to copy data. Depending on the amount of data requested in the Retrieve-Data request and the status of previously indicated data, the Retrieve-Data operation may result in the transfer of data consisting of the partial content of a MSS I/O buffer, the entire content of one or more MSS I/O buffers, or a combination thereof. For message oriented dialogs, MSS transfers only up to one complete message in a single Retrieve-Data operation. If the specified maximum data length is less than the length of the next available message, that message is truncated and the remainder of the message is discarded. This status is returned to the MSS user.

E. MSS Over Different Interconnects

As noted above, the MSS varies over different interconnect architectures. The MSS for each interconnect paradigm mentioned above will now be described.

1. OSP Interconnects

Figure 11:
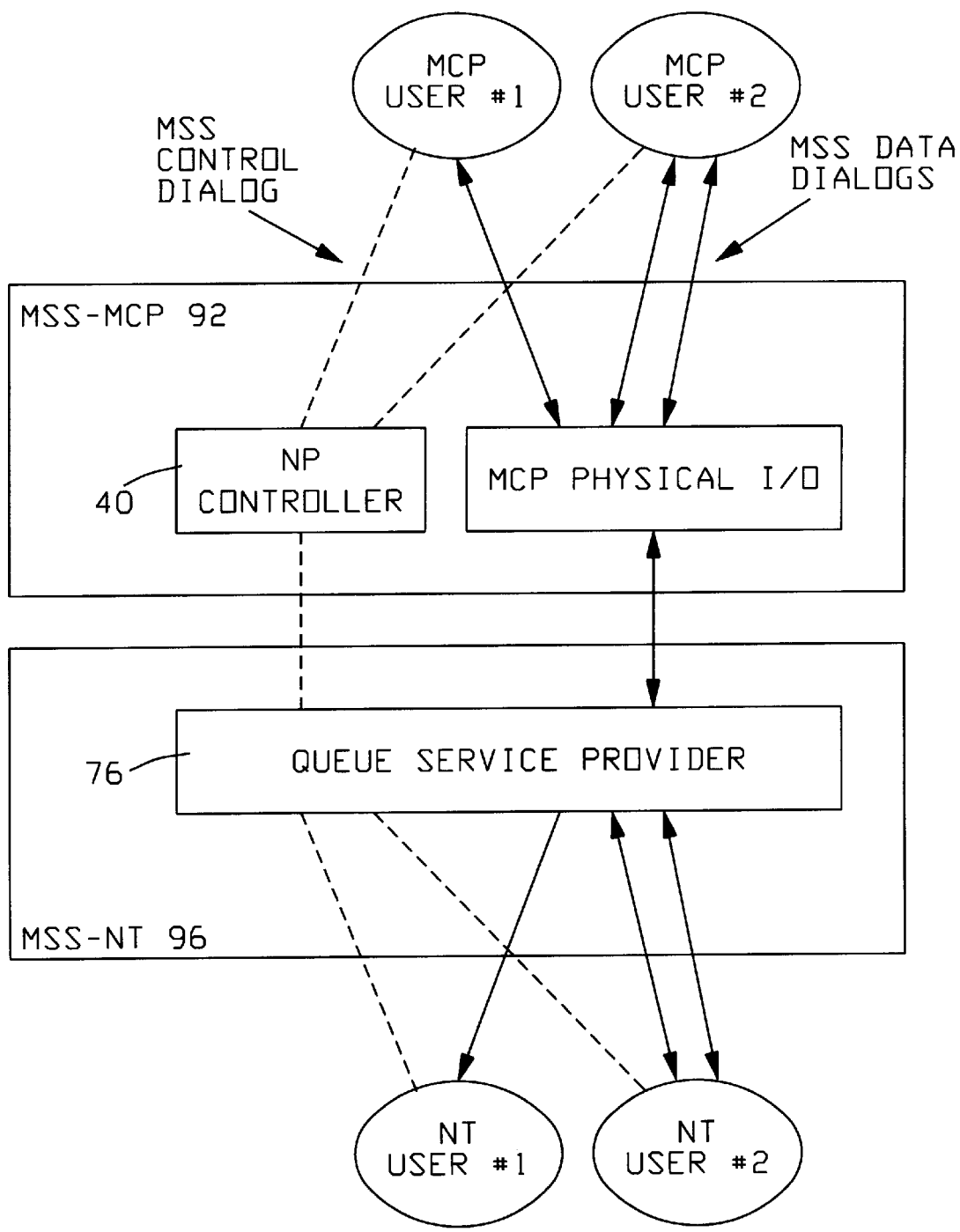
FIG. 11 illustrates how QSPv2 dialogs are used by MSS over the MCP/NPSupport interface to talk with each MSS-NT environment.

Generally, as shown in FIG. 11, the MSS uses the QSPv2 message format as the protocol over the interconnect architecture (HSDC) interface to talk to each remote MSS. In the MCP environment, all outbound data for each NT environment goes through the NP/Controller stack 40 for that device. Inbound control data from the NT environment is received through the NP/Controller stack 40. Inbound data for control dialogs is received via the MSS/CONTROL stack for that device, and inbound data for MSS_Endpoint_Dialogs is received via the MSS/DATA stack for that device. There is one set of stacks per NT environment. MSS dialog IDs are multiplexed over the range of QSPv2 addresses. Outbound MSS_Endpoint_Dialog addresses use ID #2 to determine the NT MSS user. Inbound MSS_Endpoint_Dialogs use ID #1 to determine the MCP MSS user.

For QSP based interconnects, the MSS is a nonshared memory model. Thus, MSS input/output buffers exist in both the MCP and NT environments and the MSS utilizes QSP 76 to move memory content between these buffers. MCP output in this environment is summarized in FIG. 12. As illustrated in the top half of FIG. 12, upon processing a private-buffer Deliver-Data request, the MCP MSS 92 obtains an available MSS MCP output buffer 200 of the appropriate size. Within this buffer, the MCP MSS 92 first places any control information needed by NT MSS 96 to complete the operation, and then copies the Data Transfer Header and application data into this MSS MCP output buffer 200. The MCP MSS 92 then initiates a write for the single area. A large data transfer may be split between multiple buffers.

Figure 12:
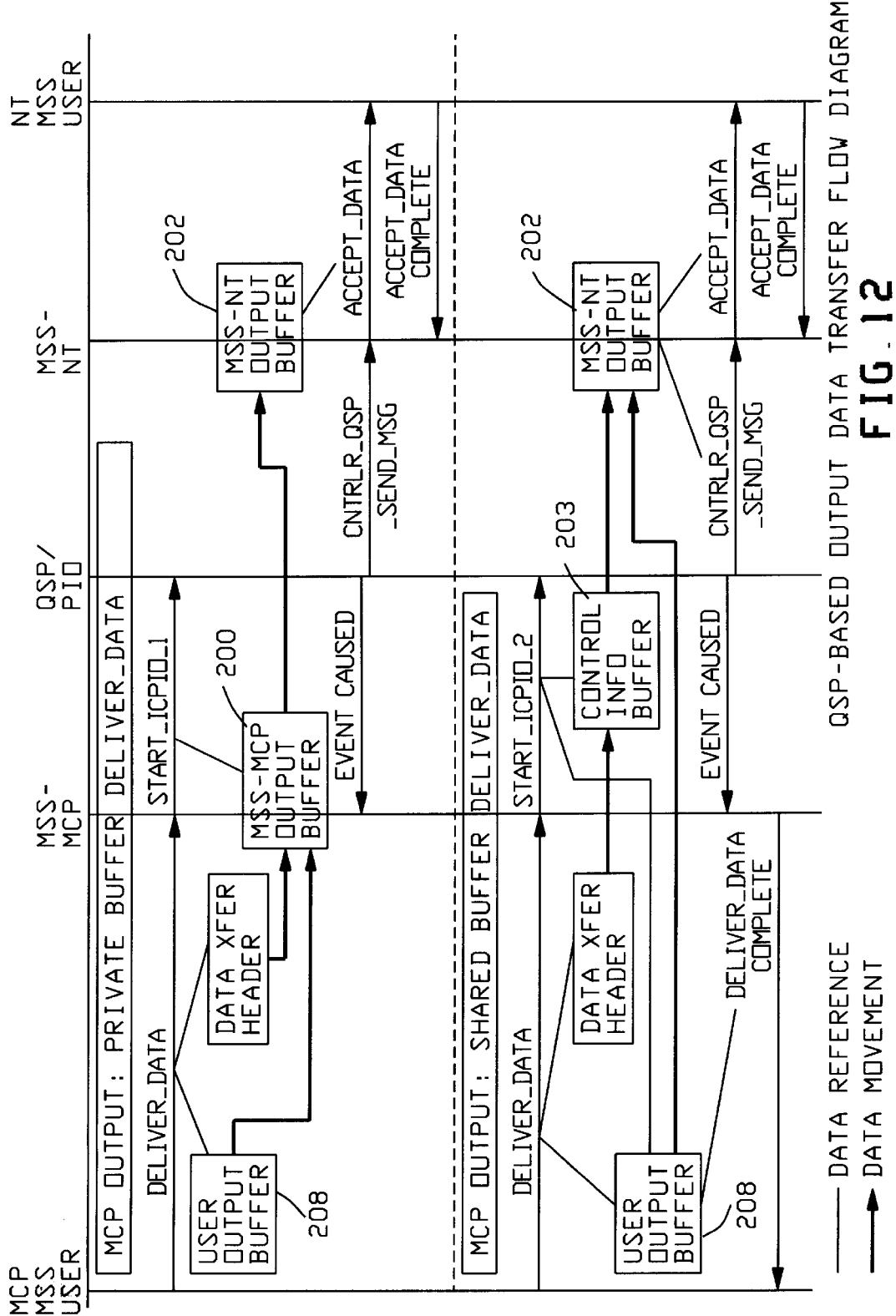
FIG. 12 illustrates the QSP-based output data transfer flow for MCP output using VTL/MSS.

On the other hand, as illustrated in the bottom half of FIG. 12, upon processing a shared-buffer Deliver-Data request, the MCP MSS 92 builds a small 'Control Info Buffer' 203 containing information needed by MSS-NT 96 to complete the operation and the Data Transfer Header. The MCP MSS 92 then initiates a write for the two buffer areas (the Control Info buffer 203 and the Coop application's user output buffer 208). QSP 76 completes the corresponding requests, and MSS-NT 96 provides the NT VTL component 94 with an Accept-Data request. If the NT environment QSP receive request required multiple buffers, MSS-NT 96 issues an Accept-Data request for each buffer, using the control information contained in the first buffer. Finally, when notified by the NT VTL component 94 that the Accept-Data has been completed, MSS-NT 96 returns the corresponding MSS-NT output buffer 202 to its receive buffer pool.

Figure 13:
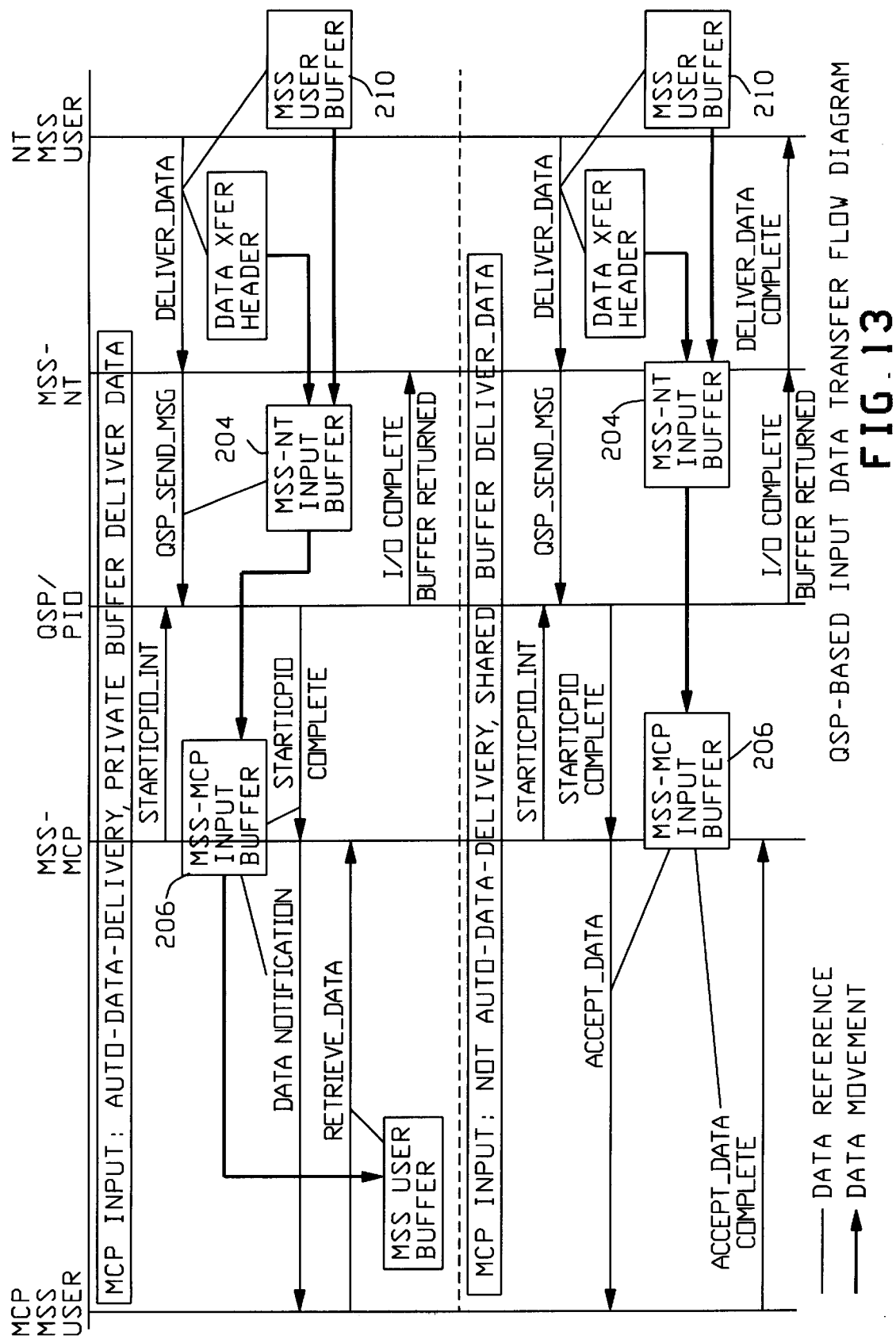
FIG. 13 illustrates the QSP-based input data transfer flow for MCP input using VTL/MSS.

MCP input in this environment is illustrated in FIG. 13. As illustrated, under normal conditions, the MCP MSS 92 component has outstanding read operations in progress, using buffers from a buffer pool. As illustrated in FIG. 13, upon processing a private-buffer Deliver-Data request, MSS-NT 96 obtains an MSS NT input buffer 204 of the appropriate size (large sends may require multiple buffers). In this input buffer 204, MSS-NT 96 first places information needed by MCP MSS 92 to complete the operation and then copies the Data Transfer Header and application data in the buffer(s). MSS-NT 96 processing for a shared-buffer Deliver-Data request is exactly the same as the private-buffer case above except that a completion notification is returned. QSP 76 completes the corresponding MSS requests. The MCP MSS 92 provides the MCP VTL component 90 with a Data-Notification or Accept-Data request. If the QSP receive request required multiple buffers, MCP MSS 92 issues a Data-Notification or Accept-Data request for each buffer, using the control information contained in the first buffer. Since there is no implicit acknowledgment from QSP_Send_Msg() (all input under QSP 76 is asynchronous-data is queued onto a list awaiting read requests to be issued from the host and the data associated with an appropriately-sized read), the MCP MSS 92 will wait for the buffer 206 to be returned to its control (it will be released when the transfer is successful) and then use that event as a completion notification.

2. Emulation Interconnects

The emulation interconnect embodiment of FIG. 8 is based upon the capability for the MCP MSS 92 component to make direct procedure calls into native NT code (i.e. directly into the NT MSS component 96). The NT MSS component 96 can directly access MCP memory space buffers provided to it in these procedure calls. These buffers are used for both user data and control messages passed between the MSS components 92 and 96.

MSS dialogs are maintained via simple data structures (Control Dialog Info Blocks and Endpoint Dialog Info Blocks) within the MCP MSS 92 and MSS-NT 96 components. There is a one-to-one correspondence between an MCP MSS Dialog Info Block and an MSS-NT Dialog Info Block. In addition, the following MSS-NT routines are user callable by the MCP MSS 92:

1. MSS-NT-Rcv-Msg is used to deliver a message from the MCP environment to the NT environment. MCP MSS 92 assembles relevant fields into a "Control-info-Buffer" 203 which is passed in the MSS NT procedure and is directly accessible to MSS-NT 96.

2. MSS_NT_Notify_Input is used by the MCP environment to retrieve messages from the NT environment. MSS_NT_Notify_Input does not actually return input, it only indicates that input is available and the MSS dialog on which it is available. MSS_NT_Notify_Input does not return until a message is available or some error condition is detected.

3. MSS_NT_Retrieve_Input is used by the MCP environment to retrieve messages, previously indicated by MSS_NT_Notifiy_Input, from the NT environment. MCP MSS 92 provides an MSS MCP Input-Buffer 206 or an MSS User Buffer 208 into which MSS-NT 96 puts the message to be delivered.

Figure 14:
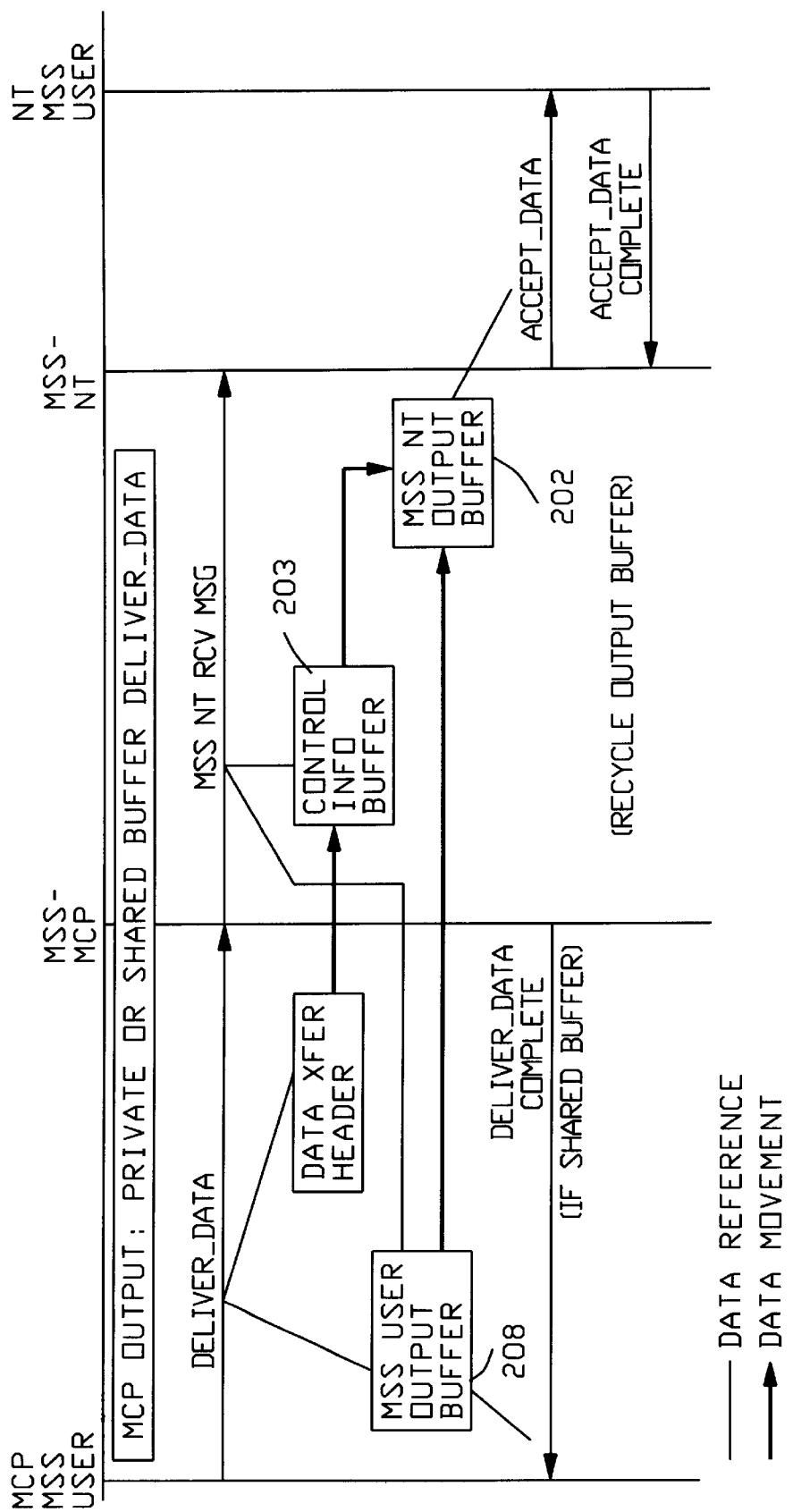
FIG. 14 illustrates MCP output data transfer flow using VTL/MSS in an emulated interconnect embodiment.

MCP output in this environment is summarized in FIG. 14. Upon processing either variant (private-buffer, shared-buffer) of a Deliver-Data request, MCP MSS 92 builds a small "Control Info Buffer" 203 containing information needed by MSS to complete the operation and the Data Transfer Header, and invokes MSS_NT_Rcv_Msg. Among the information provided is the MSS User's Output Buffer 208. MSS-NT_Rcv_Msg processes the Deliver-Data message by copying from the MSS User's Output Buffer 202 into an available MSS NT output buffer(s) 202 (if no output buffer 202 is available, a negative response is provided back to MSS-NT 96 in the routine's return result). Data is transformed from emulated MCP layout to NT layout in the same operation as the data copy. MSS-NT 96 provides NT VTL component 94 with an Accept-Data request. If the MSS-NT 96 required multiple buffers to copy/transform the MCP environment data, an Accept-Data request occurs for each buffer.

Figure 15:
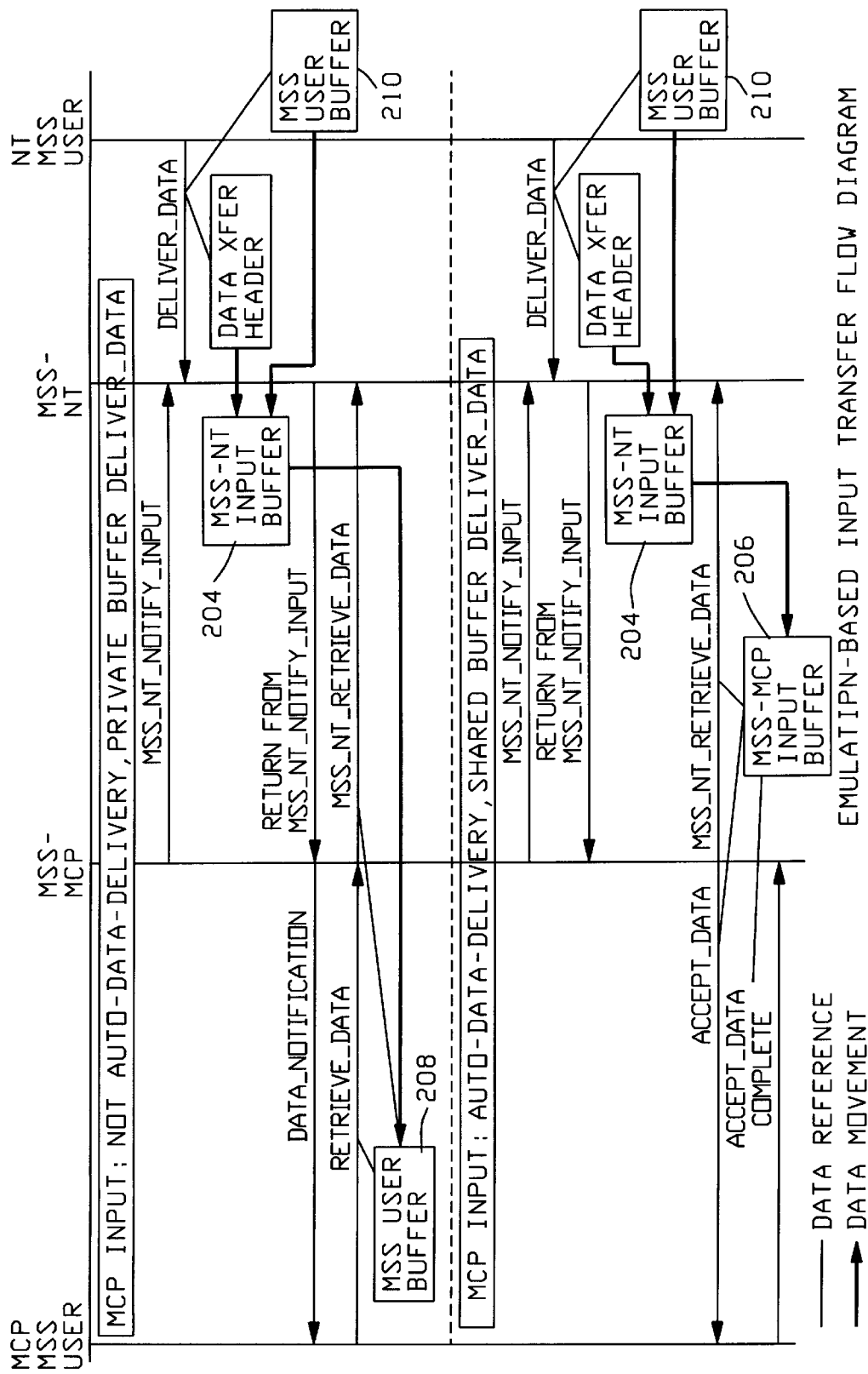
FIG. 15 illustrates MCP input data transfer flow using VTL/MSS in an emulated interconnect embodiment.

MCP environment input in this environment is summarized in FIG. 15. Under normal conditions, a call to MSS_NT_Notify_Input is outstanding. Upon processing either variant (private-buffer or shared-buffer) of a Deliver-Data request, MSS-NT 96 obtains an available MSS NT input buffer 204 of the appropriate size and within this buffer, builds the information needed by MSS to complete the operation and copies the Data Transfer Header and user data (that data is transformed from NT layout to MCP layout in the same operation as the data copy). MSS NT 96 then allows MSS_NT_Notify_Input to return back to the MCP MSS component 92. On the return from MSS_NT_Notify_Input, MCP MSS component 92 processing depends on the MSS_Endpoint_Dialog's Auto-Data-Delivery option: if Auto-Data-Delivery is set, MSS_NT_Retrieve_Data is immediately invoked to retrieve the inbound data into a MSS MCP Input Buffer 206 which is delivered to the MSS user via an Accept-Data operation; otherwise (Auto-Data-Delivery is not set), a Data Notification is issued and processing commences when the MSS user initiates a Retrieve-Data operation.

3. CIA Interconnects

As noted above, the interconnect may also be a CIA of the type described in the afore-mentioned related applications. The MSS of a CIA-based implementation uses one or more CIA dialogs for communication between each pair of nodes and is a non-shared memory model from the MSS perspective, regardless of the actual system environment. Thus, MSS input/output buffers exist in both the MCP and NT environments and the MSS utilizes CIA to move and transform memory content between these buffers. In the CIA environment, MSS is a CIA client (user) which will create buffer pools, pool managers, and dialogs between CIA nodes. It will present both a "pull model" and a "push model" for use by MSS users. MCP output in this environment is summarized in FIG. 16.

Figure 16:
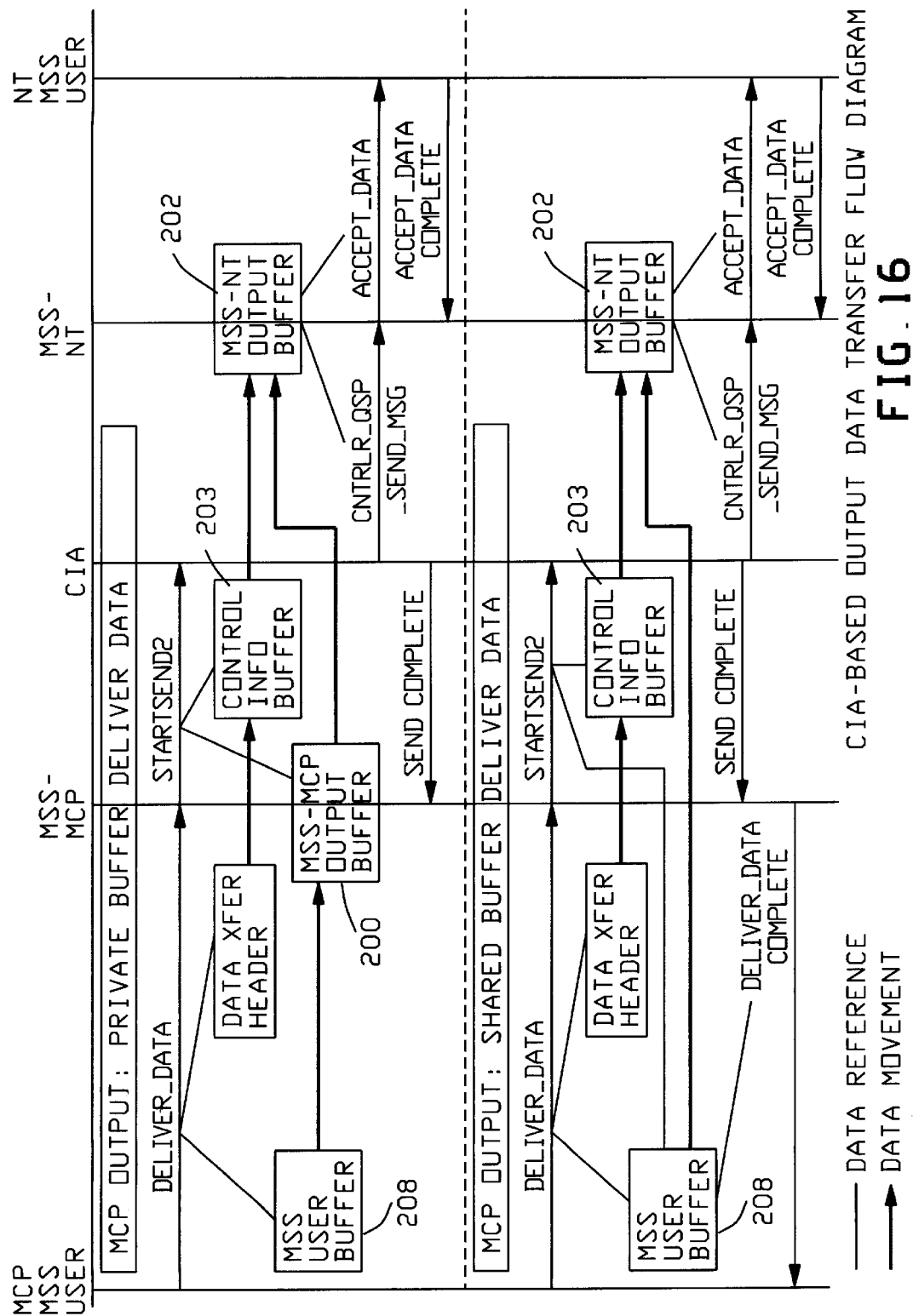
FIG. 16 illustrates MCP output data transfer flow using VTL/MSS in a CIA interconnect embodiment.

As illustrated in FIG. 16, under normal conditions, both MSS components (MCP MSS 92 and MSS-NT 96) have outstanding CIA receive operations using a buffer pool.

Upon processing a private-buffer Deliver-Data request, MCP MSS 92 copies data into an available MSS-MCP output buffer 200, builds a small 'Control Info Buffer' 203 containing information needed by MSS to complete the operation and the Data Transfer Header, and then initiates a CIA send from the two buffer areas. MCP MSS 92 processing for a shared-buffer Deliver-Data request is similar except that the Coop application's output buffer 208 is used in the CIA send request. CIA completes the corresponding send/receive requests, while MSS-NT 96 provides the NT VTL component 94 with an Accept-Data request. If the NT environment CIA receive request required multiple buffers, MSS-NT 96 issues an Accept-Data request for each buffer, using the control information contained in the first buffer. When notified by the NT VTL component 94 that the Accept-Data has been completed, MSS-NT 96 returns the corresponding buffer 202 to its receive buffer pool.

Figure 17:
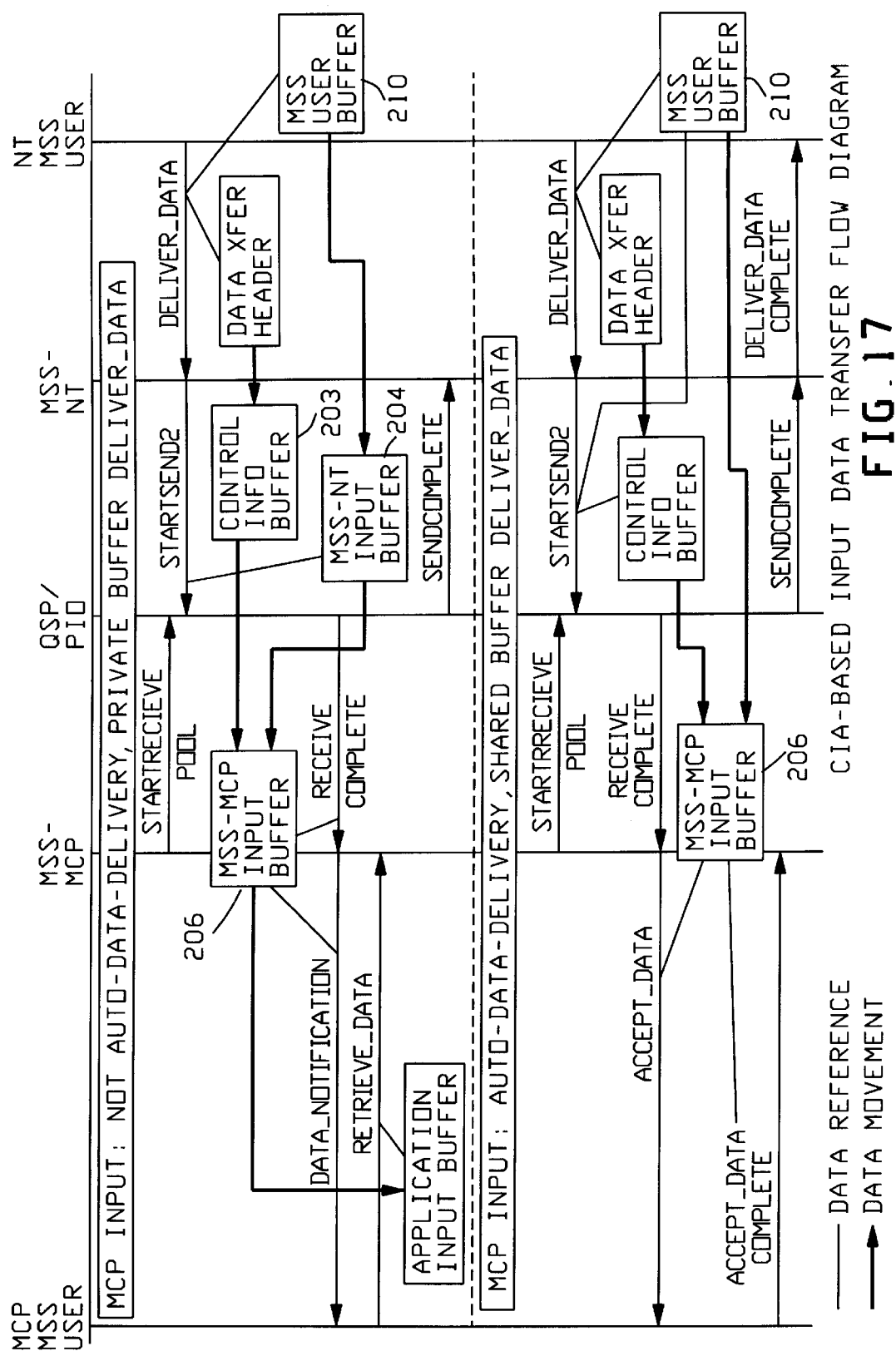
FIG. 17 illustrates MCP input data transfer flow using VTL/MSS in a CIA interconnect embodiment.

MCP input in this environment is summarized in FIG. 17. As illustrated, under normal conditions, the MCP MSS 92 component has outstanding CIA receive operations using a buffer pool. Upon processing a private-buffer Deliver-Data request, MSS-NT 96 copies data into an available MSS NT input buffer 204, builds a small "Control Info Buffer" 203 containing information needed by MSS to complete the operation and the Data Transfer Header, and then initiates a CIA send from the two buffer areas. MSS-NT 96 processing for a shared-buffer Deliver-Data request is similar except that the TDI-Client's output buffer 210 is used in the CIA send request. CIA completes the corresponding send/receive requests, while MCP MSS 92 provides the MCP VTL component 90 with a Data-Notification or Accept-Data request. If the CIA receive request required multiple buffers, MCP MSS 92 issues a Data-Notification or Accept-Data request for each buffer, using the control information contained in the first buffer.

F. MSS Initialization, Termination, and Recovery

1. Initialization

As illustrated in FIG. 18, MSS initialization occurs in two steps. The first step occurs when the networking environment is started via a call to MSS_initialize(). In the MCP environment, this is done from the TCPIPSUPPORT library upon initialization. In the NT environment this is done when the VTL software is loaded and initialized (at NT boot time). The second step is the sending of an MSS_HELLO packet to all complementary MSSs. In the MCP environment, this occurs when the interface has become available and is started by the MCP environment. In the NT environment, the MSS waits until a MSS_HELLO is received and then responds with a corresponding MSS_HELLO packet. When the user is notified that a new user is available, its first responsibility is to greet with that new remote user.

2. Recovery

One of the benefits of the level of abstraction added by the MSS is that the MSS user does not have to worry about managing the recovery of any remote environments. The MSS handles the recovery and notifies its users of any change in the remote "user" environment. The MSS has different logic for each system interconnect, since each system interconnect provides different notifications and procedures in this area.

3. Termination

The MSS must terminate when the last user terminates its link with the MSS. This process does the reverse of MSS_initialize(). As illustrated in FIG. 19, active MSS terminates activity when a dialog change notification is received for each MSS_Endpoint_Dialog terminated as a result of terminating the MSS. In the MCP environment, MSS termination is either started by the arrival of the MSS_GOODBYE message, by a call to MSS_Terminate(), which brings down all dialogs with remote environments, or by a call to MSS_Reset_Remote_User(). On the other hand, in the NT environment, MSS termination is started by the shutdown of networking services, which happens as a result of the shutdown of the Windows NT environment (a call to MSS_Terminate() or a shutdown of the NX/Network Services). This does not handle abnormal terminations of the remote environment. In these cases, the local MSS may have other methods to determine that the other environment has terminated or faulted.

G. Data Transmission via MSS

The MSS provides both a bytestream and a reliable message-oriented interface for users to send information to remote environments and users. It also provides for different notification mechanisms in the receiving environment: either the MSS will notify the user that data is available to be read (a "pull" model), or the MSS will automatically call a user-defined procedure for acceptance of new data (a "push" model). This added layer of abstraction will relieve the network provider of worrying about the underlying I/O constraints and idiosyncrasies of the type present with the TCP/IP protocols. The information will be delivered to the remote environment in the correct order, but it may be fragmented across the system interconnect for performance reasons or system interconnect limitations.

FIG. 20 shows both models of data delivery into a remote environment. The top half of FIG. 20 shows the "pull" model, in which the remote MSS user receives a notification that data is available on a MSS_Endpoint_Dialog, and the MSS user must retrieve the data from the MSS. The bottom half of FIG. 20 shows the "push" model in which the remote MSS calls a pre-defined user routine for delivery of the data to the MSS user. The remote MSS user is responsible for notifying the MSS when it is finished with the data buffer.

On non-message based dialogs, each buffer passed to MSS_Deliver_Data may be fragmented into several MSS_DATA packets for transfer over the system interconnect. This segmentation is up to the system interconnect module (HIF). The remote MSS will not reassemble the data; it is up to the MSS user to reassemble the data into one message. On the other hand, on message-based dialogs, the MSS cannot fragment the data and will return an error if the system interconnect cannot handle the size of the data message.

1. MSS Endpoint Dialogs

MSS_Endpoint_Dialogs are created via a coordinated procedure between complementary users (one running in the MCP environment, one running in the NT environment). FIG. 21 illustrates the initiation process from the MSS's point of view. As shown in FIG. 21, user MSS_Endpoint_Dialogs are established in accordance with the following procedure:

1. A user of the MSS initiates an MSS_Create_Endpoint_Dialog call to its local MSS. The local MSS verifies the parameters, and if successful, creates an entry in the local dialog table and sends an MSS_CREATE_DIALOG packet to the remote MSS specified in the call. The newly created local dialog identifier is returned to the user.

2. The remote MSS verifies the parameters passed in the MSS_CREATE_DIALOG and, if valid, creates an entry in its local dialog table. The new dialog id is returned to the initiating MSS via an MSS_CREATE_RESPONSE packet. If there is a problem either with the parameters or the creation of the local entry, an MSS_ERROR packet is returned to the initiating MSS. This information is returned to the local user when it tries to open the dialog.

3. The newly created local dialog id is passed from the initiating user (the left line in the figure) to the remote user (the right line) via some external mechanism. One such mechanism is the MSS_Send_Control_Msg interface over the control dialog.

4. The user in the remote environment calls the MSS via MSS_Open_Endpoint_Dialog passing the dialog id it received from the initiating user. The local MSS verifies that this dialog is valid, and if no errors have occurred, sends an MSS_OPEN_DIALOG packet to the original initiating MSS (the one which performed the MSS_Create_Endpoint_Dialog). If an error had previously occurred on the dialog (or the dialog had not been created), this error is now returned to the calling user.

5. When the initiating MSS receives the MSS_OPEN_DIALOG, it opens the dialog and sends an MSS_OPEN_RESPONSE back. It notifies its local user that the dialog is now available for data via a Dialog_Change_Notification (AVAILABLE).

6. Upon receipt of the MSS_OPEN_RESPONSE, the remote MSS completes the open dialog scenario by notifying its local user via a Dialog_Change_Indication (AVAILABLE).

7. The dialog can now be used for data transfer.

Figure 22:
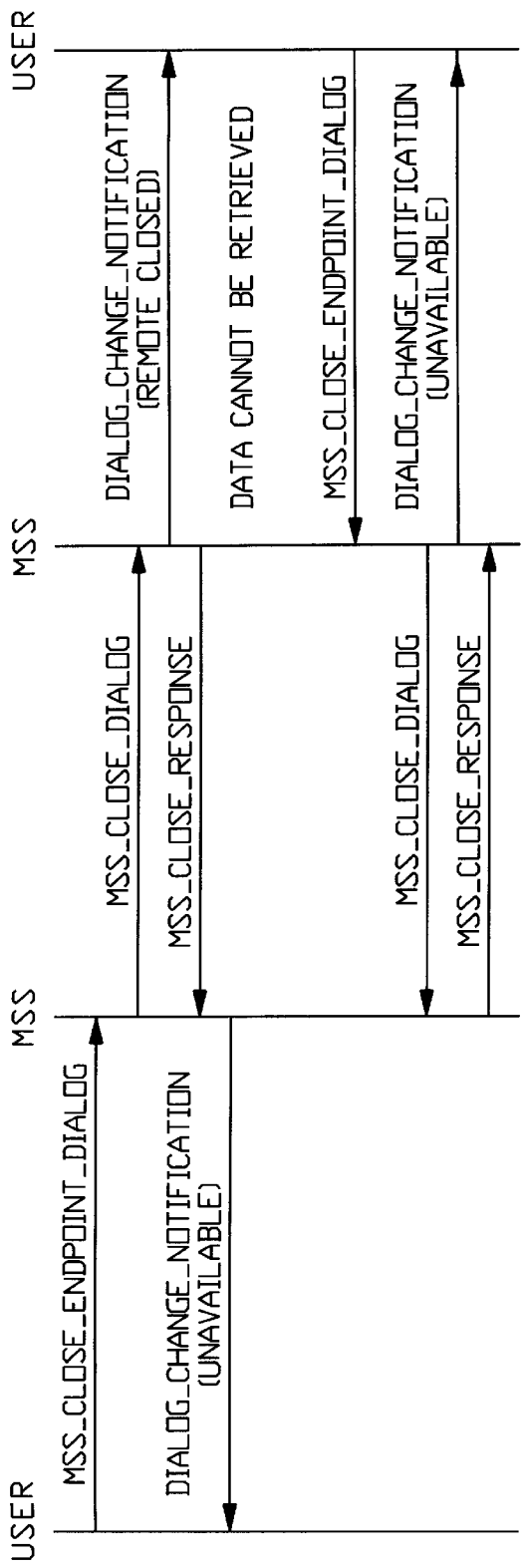
FIG. 22 illustrates the MSS_Endpoint_Dialog Termination process for a normal close from the MSS's point of view.

MSS data dialogs are terminated via a coordinated procedure between complementary users. They may also be terminated as a result of an environment failure. FIG. 22 illustrates the termination process from the MSS's point of view. As illustrated in FIG. 22, the normal closing of an MSS_Endpoint_Dialog proceeds as follows:

1. A MSS user calls MSS_Close_Endpoint_Dialog for a certain MSS_Endpoint_Dialog. The local MSS creates an MSS_CLOSE_DIALOG packet to send to the remote MSS. The local MSS also notifies the local user that the dialog is now unavailable (through a Dialog_Change_Notification).

2. The remote MSS receives the MSS_CLOSE_DIALOG and notifies its local user that the remote user has closed the dialog via a call to Dialog_Change_Notification (REMOTE_CLOSED). Any data waiting to be read on the dialog is still available for the local user to retrieve. The local user, however, cannot send any more data on this dialog. The local MSS sends the MSS_CLOSE_RESPONSE packet to signify that it has processed the close packet.

3. At some later time, the local user calls MSS_Close_Endpoint_Dialog (any outstanding data which has not been read is discarded). The local MSS generates an MSS_CLOSE_DIALOG and sends it to the remote MSS (who responds). The local MSS also generates a Dialog_Change_Notification (UNAVAILABLE) to the local MSS.

Figure 23:
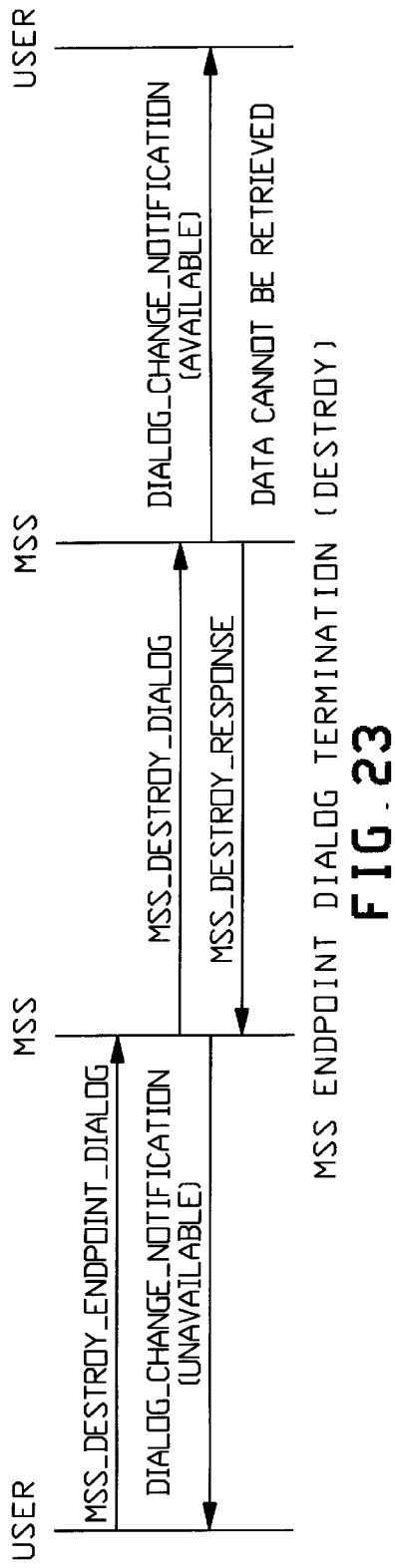
FIG. 23 illustrates the MSS_Endpoint_Dialog Termination process for a destructive close from the MSS's point of view.

An MSS_Endpoint_Dialog can also be destroyed by one of the users. FIG. 23 describes the abortive termination process, including the steps of:

1. An MSS user calls MSS_Destroy_Endpoint_Dialog. The local MSS discards any data waiting on the dialog and sends an MSS_DESTROY_DIALOG packet to the remote MSS. It also notifies the local user that the dialog is no longer available (via Dialog_Change_Notification (UNAVAILABLE).

2. The remote MSS receives the MSS_DESTROY_DIALOG packet and notifies its local user that the dialog is no longer available (via Dialog_Change_Notification (UNAVAILABLE), and discards any unread data). This is an implicit close on this side.

2. MSS Control Dialogs

The MSS also provides a path to the remote environments for delivery of control messages between complementary users. An MSS user may wish to send control messages over this control path (control dialog), or over any other MSS dialog. This path is similar to the data path described above, but certain dialog options are preset (data is automatically delivered to the user, the dialog is message oriented, and the destination MSS must copy this message to another buffer for presentation to the user).

H. MSS Data Structure

All variables which are declared in the MSS are global to all system interconnects, and therefore, the MSS does not have any internal data. The MSS communicates with other instances of the MSS executing in remote environments through exchange of MSS packets. These packets are used to transfer both control and user data between MSS environments as well as to transfer MSS control information. They consist of the MSS command header followed directly by the header and actual data. Each transfer between two MSSs contains at least the command portion.

```
struct mss_packet {
    MSSMSGPTR        p_msg_ptr;
    U16              p_version;
    U16              p_command;
    U32              p_seq_num;
    mss_dialog_id    p_src_dialogid;
    mss_dialog_id    p_dst_dialogid;
    char             *p_cmd_ptr;
    U16              p_cmd_len;
    U16              p_hdr_len;
    U32              p_data_len;
    U16              p_flags;
    U32              p_local_endpoint;
}MSSPACKET, *MSSPACKETPTR;
```

The fields are as follows:

p_version: The version of the MSS interface.

p_command: The MSS command.

p_seq_num: The sequence number of this packet. This is unique between each pair of MSSs, starts at the number specified in the MSS_HELLO packet and is incremented by one for every packet sent.

p_src_dialogid: The source MSS dialog id for this packet.

p_dst_dialogid: The destination MSS dialog id for this packet. The destination system interconnect address is in the system interconnect header which is present on the packet when received in the destination environment.

p_cmd_ptr A pointer to any command parameters present in this packet.

p_cmd_len Length of the MSS command parameter information present in this MSS packet.

p_hdr_len: Length of the user header information present in this MSS packet.

p_data_len: Length of the user data information present in this MSS packet.

p_flags: Bit information about this packet.

p_local_endpoint: The local endpoint in the system interconnect address and is useful in distributing data.

This field is only valid on MSS_DATA and MSS_CONTROL_DATA messages.

p_msg_ptr: Pointer to the actual data.

The data portion of these packets are kept as messages. The MSS_MESSAGE and data block structures have the following format:

```
struct mss_message {
    U16         m_hsize;      /* header size */
    boolean     m_hdrndata;   /* TRUE if hdr/data share
                                 the 1st buffer */
    U32         m_dsize;      /* total data size */
    char        *m_hptr;      /* pointer to header */
    MSSDBLKPTR  *m_dptr;      /* pointer to data */
    MSSMSGPTR   *m_next;      /* pointer to next msg */
} MSSMESSAGE, *MSSMSGPTR;
struct mss_data_block {
    U32         d_blksize;    /* total size of block */
    char        *d_blkptr;    /* ptr to start of data*/
    U32         d_sizeleft;   /* size of unread data */
    char        *d_ptr;       /* ptr to unread data */
    BOOLEAN     d_shared;     /* is buffer shared with
                                 user? */
    MSSDBLKPTR  *d_next;      /* ptr to next dblk */
} MSSDBLK, *MSSDBLKPTR;
```

Some environments may enforce the restriction that each message has only one data block (this is especially true for outbound data). On inbound data, however, the MSS may have to segment the message into one or more data blocks because of a system-interconnect restriction.

I. MSS Command Set

The commands and packet structures which are used by the MSS to communicate and transfer data with other MSSs (operating in different environments) will now be described. Each command will only describe the fields of the MSS packet which it sets. All other fields are to be initialized to zero. Sequence numbers in the packets are the next valid sequence number, except for the MSS_HELLO command. In all cases, p_src_dialogid is set to the sending endpoint of the MSS and p_dst_dialogid is the destination dialog id.

In commands (e.g., MSS_CREATE_DIALOG), the local parameters (prefixed by local_) refer to the local environment (the environment in which the command was issued). The remote parameters (prefixed by remote_) refer to the remote environment (the corresponding environment for the dialog creation). In responses, the reverse is true. The local parameters refer to the remote environment (the environment from which the create was issued), and the remote parameters refer to the local environment (the environment creating the response). For example, when all responses are generated, the MSS fills in the remote attributes, not the local.

MSS_HELLO is used by the local MSS to greet with all remote MSSs when the local MSS finishes initialization. This passes local information about this environment's MSS to the remote environment. The remote MSSs respond with an MSS_HELLO packet with their information.

p_version=highest level this MSS supports.

p_command=MSS_HELLO;

p_seq_num=starting sequence number, usually 1.

p_cmd_len=sizeof (mss_hello_params)

```
struct mss_hello_params {
    mss_endpoint_id          local_ctl_address;
    U16                      version;
    mss_environment_type     environment;
    mss_user_type            user_type;
    mss_user_instance_type   user instance;
};
```

The endpoints passed in this command specify the system interconnect addresses for the remote MSS to use for communication with this instance of the MSS. In the interconnect implementation of FIG. 6, for example, these correspond to the RQR (Remote Queue References) used in the QSP header. These are usually exchanged on a stub's initialization with its corresponding host process. When each remote environment's MSS_HELLO response is received, this causes a USER_DIALOG_NOTIFICATION to be sent to each user of the MSS signifying that this remote environment is now ready for use.

MSS_GOODBYE is used by the local MSS to inform all remote MSSs that it is terminating. The remote environment does not respond to this command. When the remote environment receives the MSS_GOODBYE command, all MSS_Endpoint_Dialogs with this remote environment are destroyed (the user is notified through a DIALOG_CHANGE_NOTIFICATION) and then the control dialog is destroyed. This causes a USER_CHANGE_NOTIFICATION to be sent to each user of the MSS signifying that this environment is no longer active.

MSS_CREATE_DIALOG is used to communicate the local create parameters (from MSS_Create_Endpoint_Dialog) to the remote MSS. The parameters are transferred through the use of the structure MSS_create_params.

p_command=MSS_CREATE_DIALOG;

p_cmd_len=sizeof (MSS_create params);

```
struct mss_create_params {
    mss_dialog_id      local_dialog_id;
    mss_options        options;
    mss_endpoint_id    local_address;
};
```

When the remote environment receives this command it creates a dialog endpoint based on the parameters passed and to the environment associated with the control dialog (ctl_dialog_id) from which it was received. The local_address is the system interconnect dependent address to be used for this dialog. If successful, it returns information about the newly created endpoint in the MSS_CREATE_RESPONSE. If not successful, it returns an MSS_ERROR.

MSS_CREATE_RESPONSE is used to respond to the MSS_CREATE_DIALOG primitive. It signifies that the endpoint was created successfully. This information is stored in the local dialog table.

p_command=MSS_CREATE_RESPONSE;

p_cmd_len=sizeof (MSS_create_rsp_params);

```
struct mss_create_rsp_params {
    mss_dialog_id    local_dialog_id;
    mss_dialog_id    remote_dialog_id;
```

```
    mss_endpoint_id          remote_address;
};
```

In the response, remote_dialog_id is the newly created endpoint in the remote environment. Remote_address is the system interconnect dependent address used to communicate with the remote environment.

MSS_OPEN_DIALOG is used to open a previously created endpoint (the endpoint was created in the remote environment and the dialog id was passed by some other means, such as the control dialog, into this environment).

p_command=MSS_OPEN_DIALOG;

p_cmd_len=sizeof (mss_dialog_pair);

```
    struct mss_dialog_pair {
        mss_dialog_id       local_dialog_id;
        mss_dialog_id       remote_dialog_id;
    };
```

When the remote environment receives this command it opens the dialog. If successful, it returns an MSS_OPEN_RESPONSE; if there was an error, it returns MSS_ERROR.

MSS_OPEN_RESPONSE is used to respond to the MSS_OPEN_DIALOG command. It returns the status of the open.

p_command=MSS_OPEN_RESPONSE;

p_cmd_len=sizeof (mss_dialog_pair);

MSS_CLOSE_DIALOG is used to close a dialog (as a result of a user calling MSS_Close_Endpoint_Dialog). If successful, it returns an MSS_CLOSE_RESPONSE; if there was an error, it returns MSS_ERROR.

p_command=MSS_CLOSE_DIALOG;

p_cmd_len=sizeof (mss_dialog_pair);

MSS_CLOSE_RESPONSE is used to respond to the MSS_CLOSE_DIALOG command. It returns the status of the close.

p_command=MSS_CLOSE_RESPONSE p_cmd_len=sizeof (mss_dialog_pair);

MSS_DESTROY_DIALOG is used to close a dialog and destroy the data (as a result of a user calling MSS_Destroy_Endpoint_Dialog). If successful, it returns an MSS_DESTROY_RESPONSE; if there was an error, it returns MSS_ERROR.

p_command=MSS_DESTROY_DIALOG;

p_cmd_len=sizeof (mss_dialog_pair);

MSS_DESTROY_RESPONSE is used to respond to the MSS_DESTROY_DIALOG command. It returns the status of the destroy.

p_command=MSS_DESTROY_RESPONSE;

p_cmd_len=sizeof (mss_dialog_pair);

MSS_ERROR is used to note an error response from one MSS environment back to the originating MSS environment. The response includes an mss_result error code along with the offending command.

p_command=MSS_ERROR;

p_cmd_len=sizeof (mss_error_packet);

p_hdr_len=offending_packet->p_hdr_len;

p_data_len=offending_packet->p_data_len;

```
    struct mss_error_packet {
        mss_result       error_code;
        MSS_PACKET       offending_packet;
    };
```

The MSS can use this to determine which outstanding command failed and propagate the error_code back to the calling user.

MSS_DATA is used to transfer bytestream data from one MSS environment to another. The data portion of the message is user data to be queued onto the dialog id specified in the command header.

p_command=MSS_DATA;

p_hdr_len=sizeof (user_header_data);

p_data_len=sizeof (user_data);

The data follows the MSS_DATA packet header. Upon receipt, the MSS will queue the data to the dialog specified in the packet.

MSS_CONTROL_DATA is used to transfer control information from one MSS environment to another. It is identical to the MSS_DATA packet, except that it contains control information instead of user data. The user sends the control information as a user header.

p_command=MSS_CONTROL_DATA;

p_hdr_len=sizeof (user_header_data);

MSS_HEARTBEAT is used to check the status of any remote environments/MSSs. Heartbeats are sent of no new message has been sent from the remote MSS in a predetermined period of time (e.g., 10 seconds). If heartbeats have not been received in a long period of time (e.g., 5 minutes), the control dialog is then marked as UNAVAILABLE and all dialogs through that control dialog are terminated. If a MSS_HEARTBEAT is received on an AVAILABLE control dialog, the remote environment/MSS is still communicating, and any inactivity time is reset. On the other hand, if a MSS_HEARTBEAT is received on an UNAVAILABLE control dialog, it is ignored.

J. MSS User Procedures

Procedures which can be called by a user of the MSS for establishing communications dialog and the like with a remote MSS are described in this section. As will be described in the next section, VTL is a MSS user in the preferred embodiment of the invention.

MSS_Initialize is a routine which initializes the interface between the MSS and its user. It is called from a platform-specific initialization routine and is responsible for initializing all structures (table space, headers).

```
    mss_result MSS_initialize (user_type, user_instance)
        mss_user_type mss_user;
    mss_user_instance user_instance;
{
    /*
    First verify the parameters passed from the user.
    */
    if (NOT valid_user_type (user_type))
        return (INVALID_USER_TYPE );
    if instance_already_used (user_type, user_instance))
        return (INSTANCE_ALREADY_USED);
    /*
```

```
* Check to see if this is the first user of this
* environment. If so, initialize the environment.
*/
if (mss_users==0) {
  Allocate table space for dialog tables
  Initialize any locks used by the MSS.
  Allocate memory for MSS internal structures.
}
mss_users++;
return (SUCCESS);
}
```

MSS_Terminate is a procedure which terminates the interface between the user and the MSS. This procedure will destroy all dialogs (abortive close) and notify the remote environments. The MSS_Endpoint_Dialogs are done first, followed by the control dialogs. If this is the last user of the MSS, the MSS will also terminate and deallocate any structures.

```
mss_result MSS_terminate (user_type, user_instance)
mss_user_type mss_user;
mss_user_instance user_instance;
{
  /*
  *First verify the parameters passed from the user.
  /*
  if (NOT valid_user_type (user_type))
    return (INVALID_USER_TYPE))
  if (instance_already_used (user_type, user_instance))
    return(INSTANCE_ALREADY_USED);
  Search MSS_Control_Dialog_Table for any control
    dialogs from this user and instance.
  If none, capture debug information and return MSS_
    UNAVAILABLE.
  For each control dialog,
    Search MSS_Data_Dialog_Table for any data dia-
      logs from this control dialog. For each one found,
      close the data dialog by sending
      MSS_DESTROY_DIALOG to other side and
      DIALOG_NOTIFICATION (Unavailable) to local
      user.
    Close the control dialog by sending MSS_GOODBYE
      to other side and USER_NOTIFICATION
      (unavailable) to the local user.
  Endfor
  if (--mss_users==0) {
    deallocate any MSS_structures.
    Destroy any spinlocks.
    [The reverse of MSS_initialize]
  }
  return (SUCCESS);
};
```

MSS_RESET_REMOTE_USER is a procedure which terminates the interface between the user and the MSS of a remote user. If any dialogs are still not closed, this procedure will destroy all such dialogs (abortive close) and notify the remote environment. The MSS_Endpoint_Dialogs are done first, followed by the control dialog. The control dialog is then reestablished (via automatic reinitialization or from this procedure). This is equivalent to an MSS_terminate() and an MSS_initialize() for one user.

| mss_result | MSS_Reset_Remote_User() |
| mss dialog_id | control_dialog_id; |

```
{
  Validate control_dialog_id. If not valid, return
    INVALID_DIALOG_ID. If not AVAILABLE, return
    DIALOG_NOT_OPEN.
  Search MSS_Data_Dialog_Table for any data dialogs
    from this control dialog. For each one found, close the
    data dialog by sending MSS_DESTROY_DIALOG
    to other side and DIALOG_NOTIFICATION
    (unavailable) to local user.
  Close the control dialog by sending MSS_GOODBYE to
    other side and USER_NOTIFICATION (unavailable)
    to the local user.
  If the interface won't automatically reinitialize itself, start
    MSS_HELLO sequence.
  return (SUCCESS);
}
```

MSS_Create_Endpoint_Dialog is a procedure which creates an MSS_Endpoint_Dialog endpoint in the local environment and returns a dialog ID which can be used from a remote environment to open this dialog. The MSS will return the parameter local_user_reference with any operation over this dialog. The parameter message_offset specifies how much room in reserve in the beginning of each buffer. If successful, this procedure starts the process of opening an MSS_Endpoint_Dialog. The just-created MSS_Endpoint_Dialog is in the PENDING-OPEN state, and the open will be completed when the remote environment performs an MSS_Open_Endpoint_Dialog with the Dialog_ID returned. When this happens, this user will be notified through an MSS_Endpoint_Dialog change notification.

| mss_result | MSS_Create_Endpoint_Dialog() |
| mss_dialog_id | control_dialog_id; |
| user_token | local_user_reference; |
| WORD | options; |
| ULONG | message_offset; |
| mss_dialog_id | *pDialogID; |

```
{
  Validate local parameters (control_dialog) and options.
    Return an appropriate error code if an error is found.
  Create data dialog from control dialog information.
  If data dialog table is full, return OUT_OF_
    RESOURCES. Send MSS_CREATE_DIALOG com-
    mand over the control dialog to the other side.
  Mark dialog as PENDING_OPEN.
  *pDialogID=newly created dialog id.
  return (SUCCESS);
}
```

MSS_Open_Endpoint_Dialog is a procedure which opens a previously created MSS_Endpoint_Dialog (from a remote environment). Local_user_reference, options, and message_offset have the same meaning as in MSS_Create_Endpoint_Dialog(). Upon successful completion, the dialog is still PENDING_OPEN. When the other side confirms the open, an MSS_Endpoint_Dialog change notification will be sent to the user.

| | |
|---|---|
| mss_result | MSS_OPEN_ENDPOINT_DIALOG() |
| mss_dialog_id | remote_dialog_id; |
| user_token | local_user_reference; |
| WORD | options; |
| ULONG | message_offset; |
| mss_dialog_id | *pDialogID; |

{
 Verify options (return UNKNOWN_OPTIONS if any found). Check MSS_Data_Dialog_Table for a match. If no match, return INVALID_DIALOG_ID. If dialog already open, return DIALOG_ALREADY_OPEN.
 Send MSS_OPEN_DIALOG to remote environment with dialog_id pair and options.
 *pDialogID=newly created dialog id. return (SUCCESS);
}

MSS_Close_Endpoint_Dialog is a procedure which starts the close of an MSS Endpoint_Dialog. Any inbound data received from the remote environment which is still queued to the dialog is flushed. Any outbound data queued in a remote environment may still be retrieved in the remote environment (until NO_DATA_AVAILABLE is returned by MSS). The local dialog is immediately closed and all subsequent operations return with DIALOG_NOT_OPEN. The remote dialog cannot send any more data once closed and receives DIALOG_CHANGE_INDICATION with a status of REMOTE_CLOSED. Once the remote dialog closes, the data is removed.

| | |
|---|---|
| mss_result | MSS_Close_Endpoint Dialog() |
| mss_dialog_id | dialog_id; |

{
 Lookup dialog_id in local MSS_Data_Dialog_Table.
 If not found, return INVALID_DIALOG_ID.
 If not open, return DIALOG_NOT_OPEN.
 Flush local_dialog (any queued data).
 Send MSS_CLOSE_DIALOG to other environment.
 Set dialog status to CLOSED.
 return (SUCCESS);
}

MSS_Destroy_Endpoint_Dialog is a procedure which closes and destroys an MSS_Endpoint_Dialog. Any data queued in both environments is automatically flushed (NO_DATA_AVAILABLE is returned by MSS any subsequent data retrievals). The local dialog is immediately closed and all subsequent operations return with DIALOG_NOT_OPEN. The remote dialog receives a DIALOG_CHANGE_INDICATION with a status of CLOSED. The remote dialog cannot send any more data once closed.

| | |
|---|---|
| mss_result | MSS_Destroy_Endpoint_Dialog() |
| mss_dialog_id | dialog_id; |

{
 Lookup dialog id in local MSS_Data_Dialog_Table.
 If not found, return INVALID_DIALOG_ID.
 If not open, return DIALOG_NOT_OPEN.
 Flush local and remote dialog (any waiting data).
 Send MSS-DESTROY-DIALOG to other environment.
 Set dialog status to CLOSED.
 return (SUCCESS);
}

MSS_Send_Control_Msg is a procedure which sends a control message from one MSS user to another MSS user across a dialog. Control messages can be sent over either a control dialog or an MSS_Endpoint_Dialog. If OUT_OF_RESOURCES is returned, this signifies that the platform is in very serious condition and is being flow controlled (control messages have priority over data messages). If MSS_UNAVAILABLE is returned, this indicates that the remote environment is no longer communicating with the system interconnect. If SUCCESS is returned, this indicates that the dialog is active and data can be sent and received over this control dialog. It also indicates that the remote user is active and MSS_Endpoint_Dialogs may be created with the remote environment.

| | |
|---|---|
| mss_result | MSS_Send_Control_Msg() |
| mss_dialog_id | dialog_id; |
| buffer_ptr | message_ptr; |
| ULONG | message_len; |

{
 Verify dialog_id and get entry into either MSS_Control_Dialog_Table or MSS_Data_Dialog_Table.
 If I can't find it, return INVALID_DIALOG_ID or MSS_UNAVAILABLE.
 Verify that this dialog is open. If not, return DIALOG_NOT_OPEN.
 Get a buffer for the message. If I can't, return OUT_OF_RESOURCES.
 Copy message into local buffer.
 Send MSS_CONTROL_DATA message to remote environment via system interconnect specific routine which returns retval.
 return (retval);
}

MSS_Deliver_Data is a procedure which sends a data message over an MSS_Endpoint_Dialog. If the option SHARED_BUFFER is set, this buffer becomes property of the MSS until delivery is complete. Otherwise (private), the MSS must copy the buffer into an MSS-allocated buffer for the transfer. This option is only for the data portion of the data, the header is always copied into an MSS control buffer for the transfer to the remote environment. The options passed to MSS_Deliver_Data have precedence over the options specified at dialog creation. If OUT_OF_RESOURCES is returned to the caller, this is an implicit NOT_READY on this dialog. A DIALOG_CHANGE_INDICATION will be sent on this dialog when the dialog subsequently becomes available. In this case, this message has not been sent to the remote user. When complete, the MSS will signify this by either returning ALREADY_COMPLETED or by calling Deliver_Data_Complete() at some later time.

| | |
|---|---|
| mss_result | MSS_Deliver_Data() |
| mss_dialog_id | dialog_id; |

| | |
|---|---|
| user_token | user_local_reference; |
| buffer_ptr | message_ptr; |
| buffer_id | message_bid; |
| ULONG | message_len; |
| buffer_ptr | header_ptr; |
| USHORT | header_len; |
| WORD | options; |

{

Validate dialog_id to make sure that it is a valid dialog id and it is OPEN. If not found, return INVALID_DIALOG_ID. If not OPEN, return DIALOG_NOT_OPEN.

Check options. Set local options between deliver options and dialog options. If options are invalid, return INVALID_BUFFER_OPTION.

If shared, check buffer id. If not valid, return INVALID_BUFFER_ID.

If private then
  Allocate buffer for MSS_Input_Size+Header_len+message_len; if no buffer, return OUT_OF_RESOURCES.
  Copy header and data into buffer.
  buffer1=new buffer id; buffer2=NULL;
  d_shared=FALSE;
else /* shared */
  Allocate buffer for MSS_Input_Size+Header_len; if no buffer, return OUT_OF_RESOURCES.
  Copy header into buffer.
  buffer1=new buffer id ; buffer2=message_bid;
  d_shared=TRUE;
Build MSS_Data header in buffer1;
put message on in_progress list of dialog send (buffer1, buffer2) [via HIF]
Return send result to caller (either SUCCESS or ALREADY_COMPLETED).
}

MSS_Retrieve_Data_Msg is a procedure which is called by a user to retrieve a message from MSS. There is only a private version of this command (the data is copied into the user's buffer). Upon return, the MSS returns the length of the data copied to the user's pointer. The pointer is set to the beginning of the data (left unchanged). If MESSAGE_ORIENTED is set and all of the data of the message at the head of the queue could not be transferred into the user's buffer, the data is truncated and MESSAGE_TRUNCATED is returned. If MSS_Header_Length=0, then this procedure will only copy the data, and the header will be discarded. If Max_Data_Length=0, then this procedure will only copy the header, and the data will be kept for a subsequent call. Message_Offset (from the Create/Open of this dialog), does not apply because the user is passing a pointer to the place in a buffer where it wants the data to be copied. It is assumed that the user has already adjusted this pointer for message_offset.

| | |
|---|---|
| mss_result | MSS_Retrieve_Data_Msg() |
| mss_dialog_id | dialog_id; |
| user_token | user_local_reference; |
| buffer_ptr | message_ptr; |
| ULONG | message_maxlen; |
| buffer_ptr | header_ptr; |
| USHORT | header_maxlen; |
| ULONG | *data_length; |
| USHORT | *header_length; |
| boolean | *end_of_message; |

{

Validate dialog id and make sure that it is valid and OPEN.

If not, return INVALID_DIALOG_ID or DIALOG_NOT_OPEN.

If no data is available on this dialog id, return NO_DATA_AVAILABLE.

If the dialog is message_oriented begin dequeue first message off of data awaiting on data dialog.
  if (header_maxlen !=0) && (m_hptr !=NULL)
    copy min(header_maxlen, m_hsize) of header to user's header_ptr.
    *header_length=amount copied.
  endif
  if (data_maxlen !=0) && (m_dptr !=NULL)
    copy min(message_maxlen, m_dsize) of data to user's message_ptr.
    if message_length>message_maxlen, retval=MESSAGE_TRUNCATED.
    *data_length=amount copied.
  endif
  end_of_message=TRUE;
  release message.
Else /* not message oriented */
  peek at first message on data dialog queue. assume end_of_message=FALSE;
  if (header_maxlen !=0) && (m_hptr !=NULL
    copy min(header_maxlen, m_hsize) of header to user's header_ptr.
    *header_length=amount copied.
  endif
  throw away header if non-null.
  if (data_maxlen !=0) && (m_dptr !=NULL
    copy min (data_maxlen, m_dsize) of data to user's message pointer.
    *data_length=amount copied.
    if *data_length==m_dsize then
      release message.
      end_of_message=TRUE;
    endif
  endif
endif
}

MSS_Receive_Message is a routine which is called by a system interconnect dependent module when an MSS packet which has successfully arrived from the system interconnect. The MSS packet is to be delivered to an MSS user. The system interconnect has already transformed the I/O buffer into the MSS_MESSAGE structure described above. The MSS packet becomes owned by the MSS. This routine may also change the structure of the message depending on content [break out header from data].

| | |
|---|---|
| mss_result | MSS_Receive_Message() |
| MSSMSGPTR | *m_ptr; |
| mss_dialog | m_dialog_id; |

-continued

| | |
|---|---|
| mss_bufferid | m_buffer_id; |
| ULONG | *user_return_value; |

```
{
    if dialog_id=my_control_endpoint then
        MSS_control_msg_handler(m_ptr,
            user_return_value);
        return (ALREADY_COMPLETED);
    Lookup dialog_id in control and data dialog table.
    If not found, return INVALID_DIALOG_ID (the system
        interconnect will log this).
    If MSS_CONTROL_DATA then
        allocate buffer for message and copy into it.
        retval=Receive_Control_Msg (m_dialog_id,
            table->user_reference, &buffer, m_ptr->h_size+
                m_ptr->d_size, &user_return_value);
        if retval !=SUCCESS or ALREADY_COMPLETED
            check retval.
        return (retval);
    else if MSS_DATA then
        If auto-data-delivery is set then
            retval=Accept_Data (m_dialog_id,
                table->user_reference, m_ptr->d_ptr,
                m_buffer_id, m_ptr->d_size,
                m_ptr->h_ptr, m_ptr->h_size,
                user_return_value);
            if retval !=SUCCESS or ALREADY_
                COMPLETED check retval.
        else
            queue data to the end of data_ptr queue on that
                dialog.
            retval=Data_Notification (m_dialog_id,
                table->user_reference, m_ptr->d_size,
                m_ptr->h_ptr, m_ptr->h_size,
                user_return_value);
            if retval !=SUCCESS or ALREADY_
                COMPLETED check retval.
    else if MSS_ERROR then
        log error and decode error packet. else
        log error about unknown packet received. return
            (retval);
}
```

MSS_Accept_Data_Complete is a procedure which is called by the MSS user to acknowledge that it has finished processing the data successfully. Ownership of the buffer is returned to the MSS. The buffer is always returned.

| | |
|---|---|
| mss_result | MSS_Accept_Data_Complete() |
| mss_dialog_id | dialog_id; |
| mss_buffer_id | buffer_bid; |
| user_token | user_local_reference; |

```
{
    Verify that the dialog is a data dialog. If not, release the
        buffer anyway and return INVALID_DIALOG_ID.
    Check to see if the buffer_bid is on the dialog's data
        queue. If not, release the buffer and return INVALID_
        BUFFER_ID.
    Remove the buffer from the dialog's data queue and
        release the buffer. return (SUCCESS);
}
```

MSS_Event_Handler is a routine which is called by a system interconnect dependent module to inform the MSS that an event has occurred in the system environment.

| | |
|---|---|
| mss_result | MSS_Event_Handler() |
| mss_event_type | what_happened; |
| INTEGER | path_index; |

```
{
    switch (what happened) {
    MSS_AVAILABLE:
        /* A new control dialog has come up */
        Allocate entry in control dialog table and fill in. /*This
            creates control/data endpoints for this
            environment.*/
        Send MSS_HELLO across system interconnect, if
            appropriate.
    MSS_UNAVAILABLE:
        /* A local control dialog is going away.*/
        Take path_index, lookup in control for environment.
        Destroy data dialogs and inform users.
        Destroy control dialog and inform user.
    }
}
```

MSS_Control_Msg_Handler is a routine which is called by MSS_Receive_Message() to handle any MSS to MSS control information such as dialog management and flow control primitives.

| | |
|---|---|
| mss_result | MSS_Control_Msg_handler() |
| MSSPACKETPTR | *p_ptr; |
| ULONG | *user_return_value; |

```
{
    mss_result errorcode;
    switch (p_ptr->p_command) {
    MSS_HELLO:
        take dialog_id out of command, and index into
            MSS_CTL_Dialog_Table.
        If entry is not valid, create entry and make available (&
            notify users via USER_CHANGE_
            NOTIFICATION).
        If entry is valid, and it was unavailable, make it
            available (& notify users via USER_CHANGE_
            NOTIFICATION).
        If entry is valid and available, do nothing.
        If I made it available, send MSS_HELLO back with
            my endpoint ids.
    MSS_GOODBYE:
        retrieve dialog_id out of command, and check MSS_
            CTL_Dialog_Table for a match.
        If no match, log an error.
        If a match and available, kill all data dialogs with this
            environment and notify users (via DIALOG_
            CHANGE_NOTIFICATION)
        if a match and available, mark unavailable and notify
            users (via USER_CHANGE_NOTIFICATION).
        If a match and unavailable, ignore (already there).
    MSS_CREATE_DIALOG:
        Create entry in MSS_Data_Dialog_Table and fill in
            from control dialog endpoint specified in command.
        If I can't create, return OUT_OF_RESOURCES in
            MSS_ERROR. Return newly created dialog id in
            MSS_CREATE_RESPONSE response packet.
```

MSS_CREATE_RESPONSE:
  Lookup entry in MSS_Data_Dialog_Table. If not found, return MSS_ERROR with INVALID_DIALOG_ID. Fill in remote dialog id and remote address from response.
MSS_OPEN_DIALOG:
  Lookup entry in MSS_Data_Dialog_Table and verify both the addresses in the dialog pair. If I find a match, then return MSS_OPEN_RESPONSE, issue dialog_change_indication to user, and mark dialog_status as open.
  Otherwise, return MSS_ERROR with INVALID_DIALOG_ID.
MSS_OPEN_RESPONSE:
  Lookup entry in MSS_Data_Dialog_Table. If not found, return INVALID_DIALOG_ID.
  Mark local dialog id as OPEN.
  dialog_change_indication (m_dialog_id, table->user_reference, dialog->status, user_return_value);
MSS_CLOSE_DIALOG:
MSS_DESTROY_DIALOG:
  Lookup dialog id in MSS_Data_Dialog_Table. If not found, send back MSS_ERROR with errorcode=INVALID_DIALOG_ID.
  If not open, MSS_ERROR errorcode=DIALOG_NOT_OPEN.
  IF close,
    Mark dialog as REMOTE_CLOSED.
  IF destroy,
    Throw away in_progress list.
    Throw away any pending data.
    Mark dialog as CLOSED.
  dialog_change_indication (m_dialog_id, table->user_reference, dialog->status, user_return_value);
MSS_CLOSE RESPONSE:
MSS_DESTROY_RESPONSE:
  Lookup dialog id in MSS_Data_Dialog_Table, if not found, return MSS_ERROR with INVALID_DIALOG_ID.
  Remove entry from table.
MSS_ERROR:
  Log error from offending command in a environment specific manner. Check offending command and handle (e.g.:)
  if on a CREATE, deallocate entry from table.
  if on an OPEN, set dialog state to ERROR.
}
  return (errorcode);
}

K. MSS Dialog Establishment

As noted above, the MSS uses an interface over the QSP-based CNP platform, the emulated interface, or the CIA interface described in the afore-mentioned related applications. The NT MSS interface is a driver loaded on the NT server 102 which is responsible for any NT-specific functionality needed to implement the MSS in the NT environment. This is represented in FIGS. 6–8. Generally, the MSS-NT interface has to define all the structures needed to communicate with the CNP QSP 76 and to LDM 82. It performs the complementary actions to the MCP MSS interface described above.

Figure 24C:
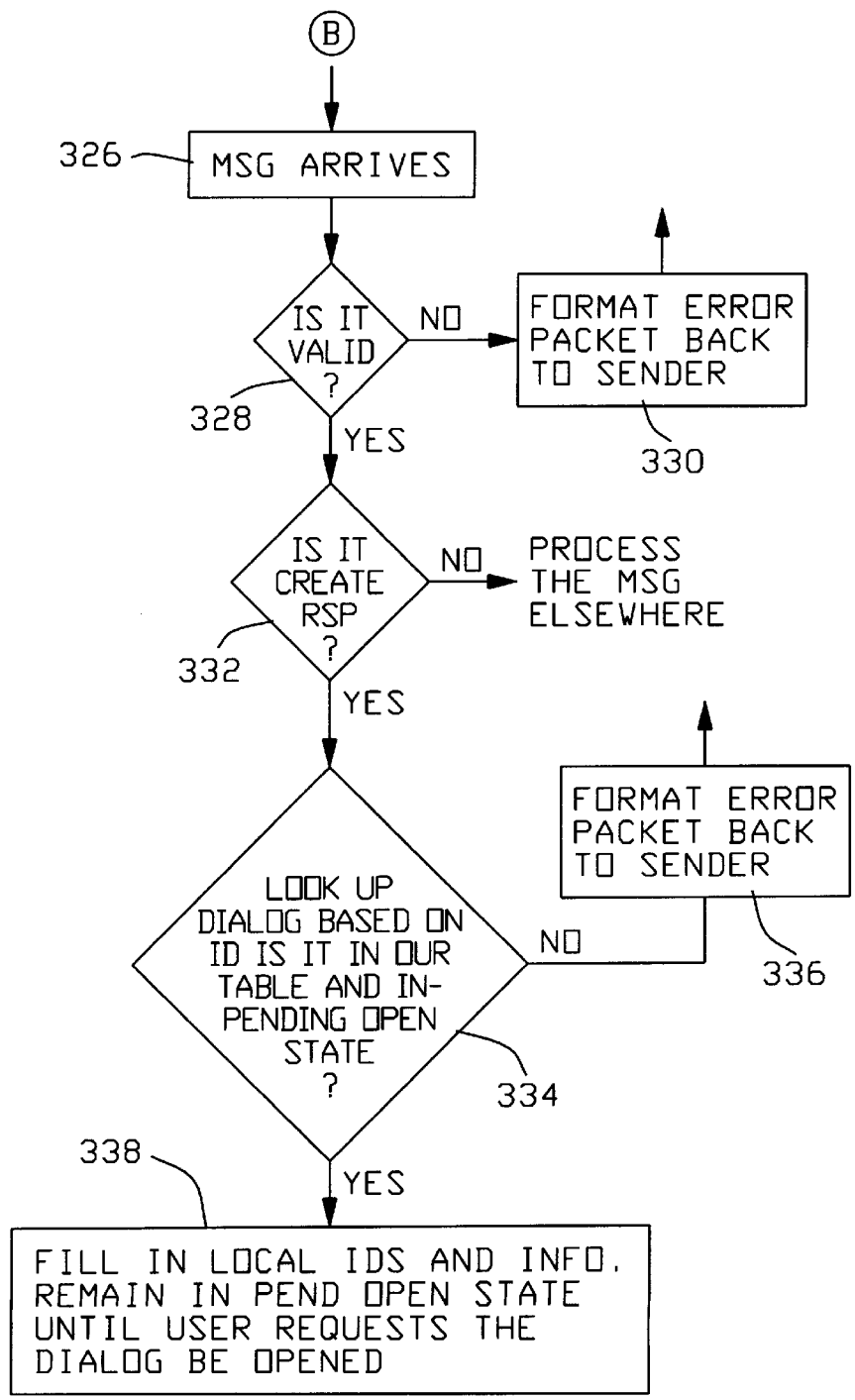
Figure 24D:
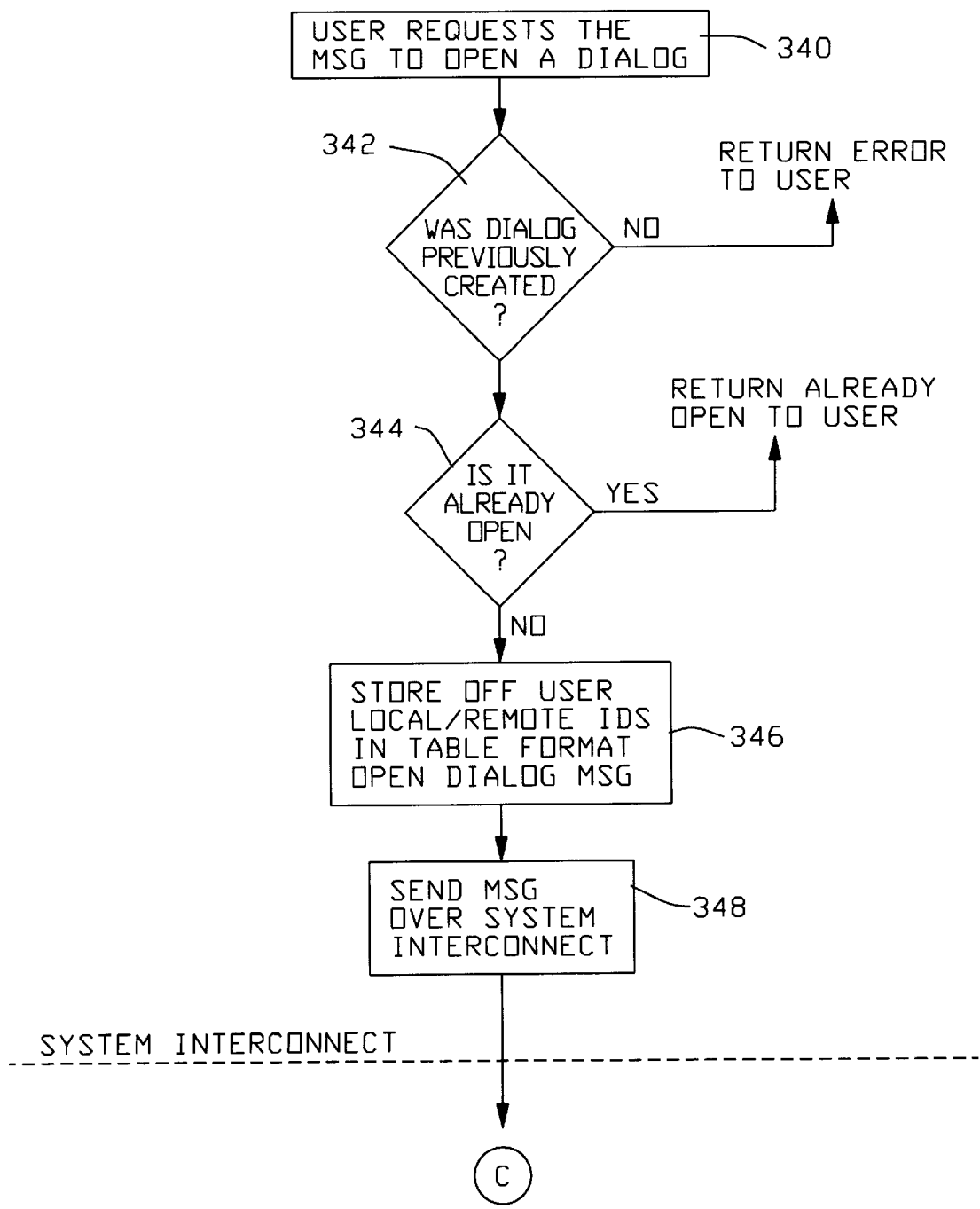

FIGS. 24(*a*)–24(*f*) illustrate MSS dialog establishment in accordance with the invention. As illustrated in FIG. 24(*a*), the user's application requests that a dialog be created. At step 300, the MSS user passes this request to the MSS to create a dialog. At step 302, it is determined whether a dialog may be created, which requires an entry in the dialog table and availability of the MSS control dialog. If it is determined at step 302 that a dialog cannot be created, an MSS_ERROR message is returned. However, if a dialog can be created at step 302, the dialog table entry is obtained, a local ID is assigned, and the dialog state is set to PENDING_OPEN at step 304. Next, at step 306, the MSS_CREATE_DIALOG message is formatted with the local ID, and the resulting message is sent to the remote MSS via the system interconnect at step 308.

As illustrated in FIG. 24(*b*), when the dialog message arrives at the remote MSS, at step 310, its validity is checked at step 312. If the dialog message does not pass the reliability checks at step 312, a MSS_ERROR packet is returned to the sender at step 314. However, if the dialog message is reliable, it is determined at step 316 whether the dialog message includes a MSS_CREATE_DIALOG request. If not, the dialog message is processed elsewhere. However, if the dialog message is a MSS_CREATE_DIALOG request, then the local dialog table is checked at step 318 to determine whether a dialog may be created between the MCP MSS 92 and the MSS-NT 96. If not, a MSS_ERROR packet is returned to the sender at step 320. Otherwise, the MSS gets the dialog table entry, stores the initiator's local ID (from the dialog message), and formats a response message with the receiving system's local ID at step 322. The response message is then returned to the initiating system via the interconnect at step 324.

As illustrated in FIG. 24(*c*), the response message arrives at step 326, and its validity is evaluated at step 328. If the response message is invalid, a MSS_ERROR packet is returned to the sender at step 330. If the response message is valid, it is determined at step 332 whether the response message is a MSS_CREATE_RESPONSE message. If not, the message is processed elsewhere; if so, the dialog is looked up at step 334 based on the return ID to determine if the requested dialog is available and in a PENDING_OPEN state. If the dialog is unavailable or not in a good state, a MSS_ERROR packet is returned to the sender at step 336. Otherwise, the local IDs and information are provided to the dialog, and the MSS remains in the PENDING_OPEN state at step 338 until the MSS user requests at step 340 (FIG. 24(*d*)) that the dialog be opened.

As illustrated in FIG. 24(*d*), when the MSS user requests to open a dialog at step 340, it is determined at step 342 whether the dialog in the message has previously been created. If not, an error code is returned. Otherwise, it is determined at step 344 whether the dialog has already been opened. If so, an error code is returned to the MSS user indicating that the requested dialog is already open. Otherwise, the local and remote IDs in the dialog table are stored and the MSS_OPEN_DIALOG message is formatted at step 346 and sent over the interconnect at step 348.

As illustrated in FIG. 24(*e*), when the MSS_OPEN_DIALOG message is received at step 350, its validity is checked at step 352, and, if invalid, a MSS_ERROR packet is returned to the sender at step 354. If the MSS_OPEN_DIALOG message is valid, it is determined at step 356 whether the IDs in the MSS_OPEN_DIALOG message match entries in the local dialog table. If not, a MSS_ERROR packet is returned to the sender at step 358. Otherwise, the MSS state is set to "OPEN" at step 360 and the MSS user is notified at step 362 that the requested dialog is open. An MSS_OPEN_RESPONSE message is formatted at step 364 and transmitted over the interconnect to the other closely coupled system at step 366.

Figure 24F:
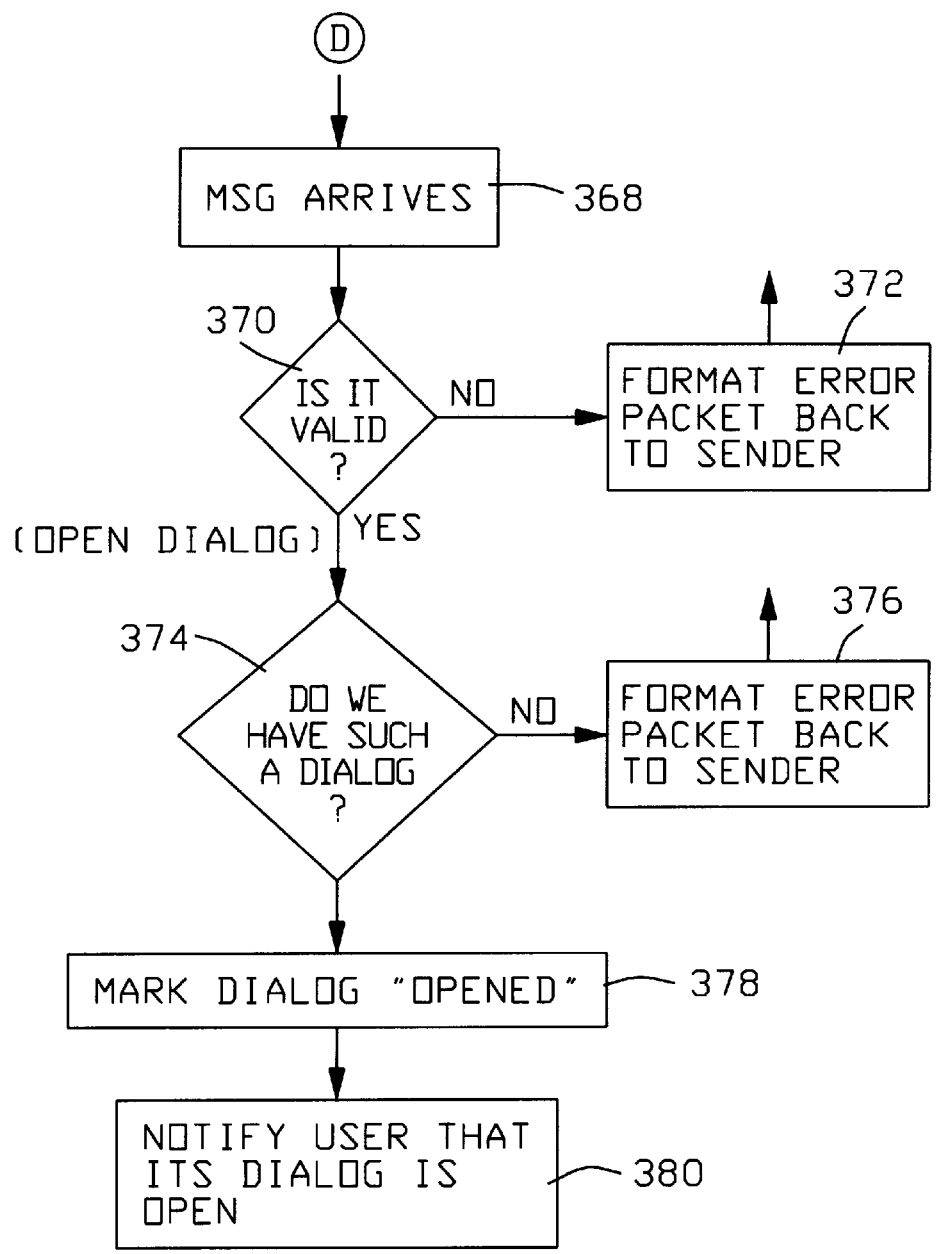

As illustrated in FIG. 24(f), when the MSS_OPEN_RESPONSE message is received at step 368, its validity is checked at step 370, and, if invalid, a MSS_ERROR packet is returned to the sender at step 372. If the requested dialog is not found in the dialog table at step 374, a MSS_ERROR packet is returned to the sender at step 376. Otherwise, the dialog is marked as "OPEN" at step 378, and the MSS user is notified at step 380 that the requested dialog is opened. The MSS is now ready for data transfer.

Figure 25B:
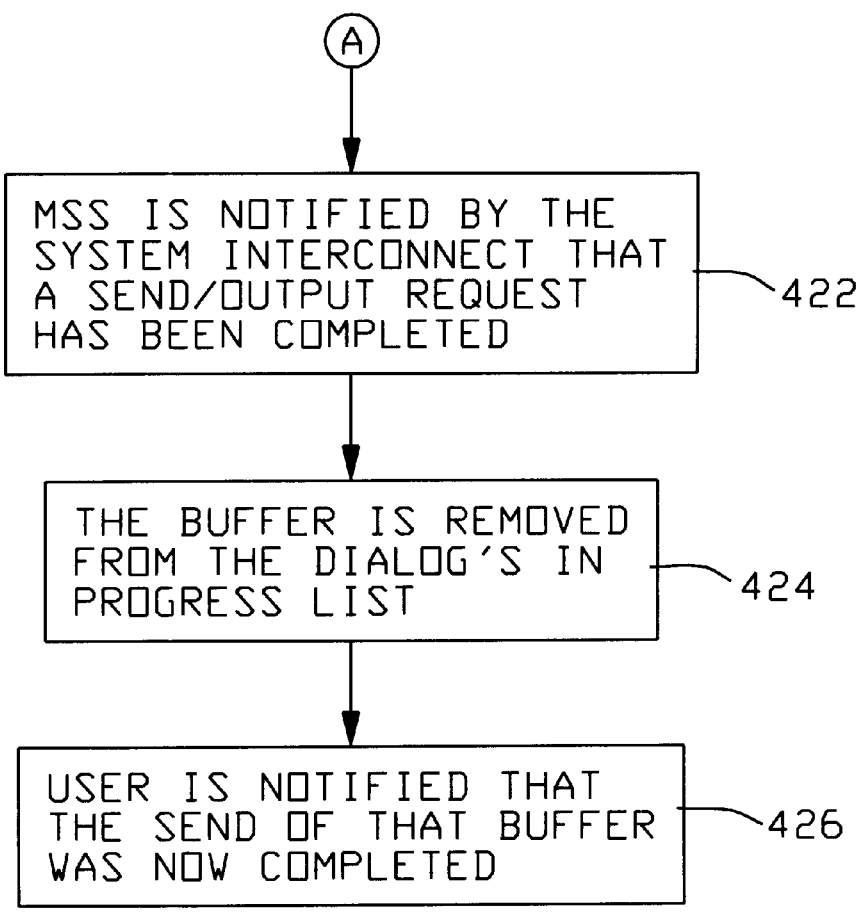

FIGS. 25(a)–25(b) illustrate the procedure for outputting data from the MSS user over the interconnect using the MSS dialog of the invention. As illustrated in FIG. 25(a), the MSS user first requests that data be transmitted at step 400. It is then determined at step 402 whether the requested dialog is valid and open. If not, an error code is returned. Otherwise, it is determined at step 404 whether the opened dialog has a private or a shared data buffer. If the data buffer is private, it is determined at step 406 whether a buffer may be obtained which is the size of the data to be transmitted along with is control headers. If no such buffer is available, a resource error is returned to the MSS user. Otherwise, the user and MSS headers are formatted into the private data buffer along with the user data at step 408. An appropriate message is then added to the dialog's "in-progress" list at step 410 prior to sending the one buffer over the interconnect at step 412. On the other hand, if the data buffer is shared, it is determined at step 414 whether a buffer may be obtained which is the size of the control headers. If no such buffer is available, a resource error is returned to the MSS user. Otherwise, the control headers are formatted into the shared data buffer at step 416. An appropriate message is then added to the dialog's "in-progress" list at step 418 prior to sending the control data and user data buffer over the interconnect at step 420.

Whether the data buffers are public or private, the MSS is notified at step 422 (FIG. 25(b)) by the interconnect that a send/output request has been completed, and the data buffer is removed from the dialog's in-progress list at step 424 once the user data has been sent. The MSS user is then notified at step 426 that the send of that buffer is now completed.

Figure 26B:
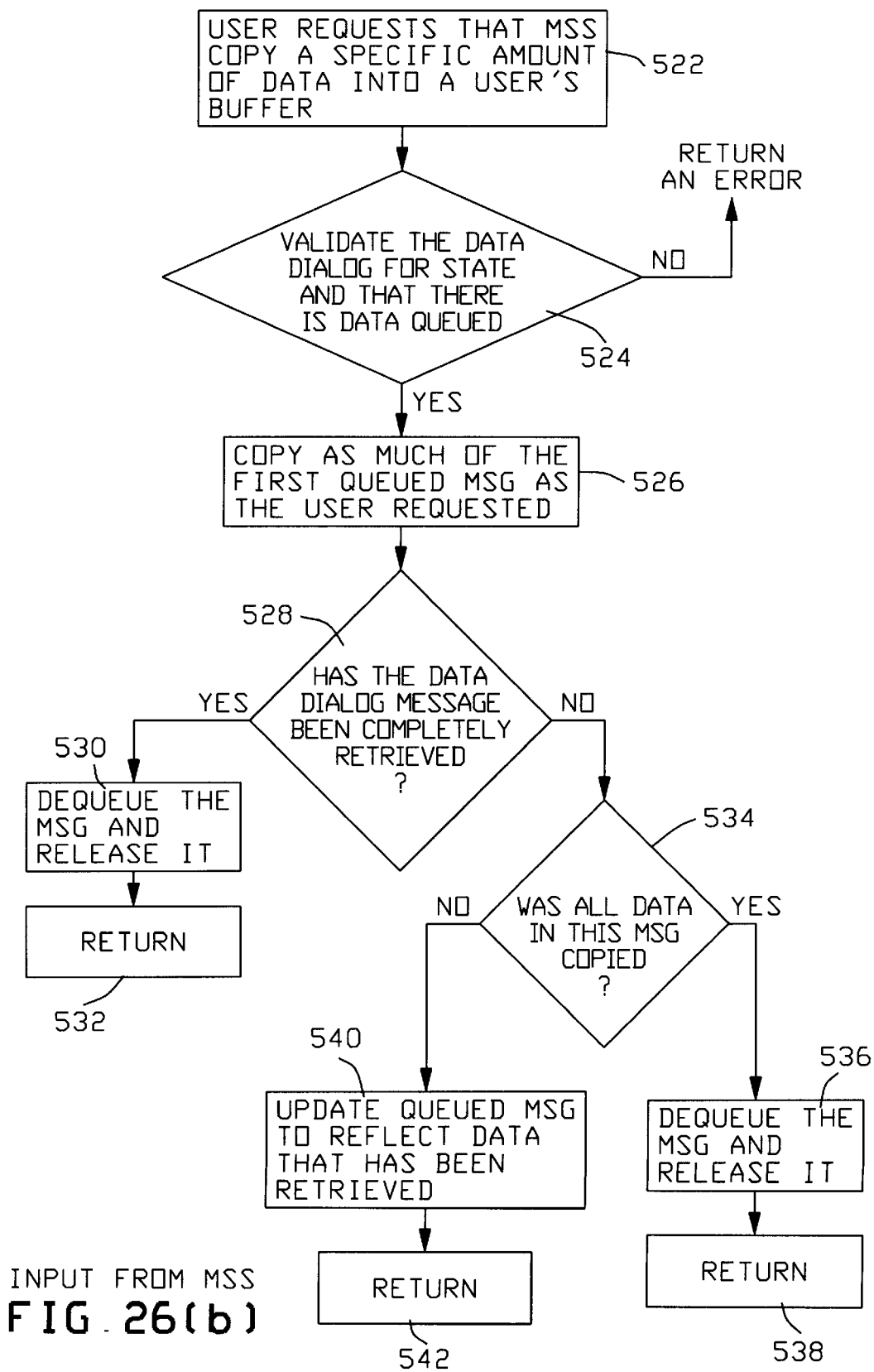

FIGS. 26(a)–26(b) illustrate the procedure for inputting data to the MSS user from the interconnect using the MSS of the invention. As illustrated in FIG. 26(a), when a message arrives at the MCP from the interconnect at step 500, the message is given a validity check at step 502. If the message does not pass the validity check, a MSS_ERROR packet is returned to the sender at step 504; otherwise, it is determined at step 506 whether the input data is for a dialog. If not, the data is processed elsewhere. If the data is for an MSS_Endpoint_Dialog, it is determined at step 508 whether the selected dialog supports automatic delivery. If not, the received message is put on the MSS_Endpoint_Dialog's inbound queue at step 510, and the MSS user is notified at step 512 that the data message has been queued. However, if the dialog supports automatic delivery, the MSS user is notified at step 514 that there is input data for a dialog, and the MSS user is passed the actual buffer containing the data message. When it is determined at step 516 that the MSS user is finished with the data buffer, the data buffer is released at step 518; otherwise, the system waits at step 520 for an indication that the MSS user is finished with the data buffer so that the data buffer may be released.

FIG. 26(b) illustrates the processing performed by the MSS in order to provide the input data to a user. As shown at step 522, the user requests that the MSS copy a specific amount of data into a data buffer accessible by the user's destination application. At step 524, the MSS_Endpoint_Dialog is validated and it is verified that data is queued for transfer (FIG. 26(a)). If the validation fails, an error code is returned; otherwise, at step 526 as much of the first queued message as requested by the user is copied to the user's data buffer. If it is determined at step 528 that the MSS_Endpoint_Dialog message has been completely retrieved, then at step 530 the message is dequeued and released and processing ends at step 532. On the other hand, if there is more input data to receive, it is determined at step 534 whether all data in the current message has been copied. If so, the message is dequeued and released at step 536, and processing ends at step 538. However, if there is more data in the input message to be copied, the queued message is updated at step 540 to reflect that data has not been retrieved. The processing then ends at step 542.

Figure 27A:
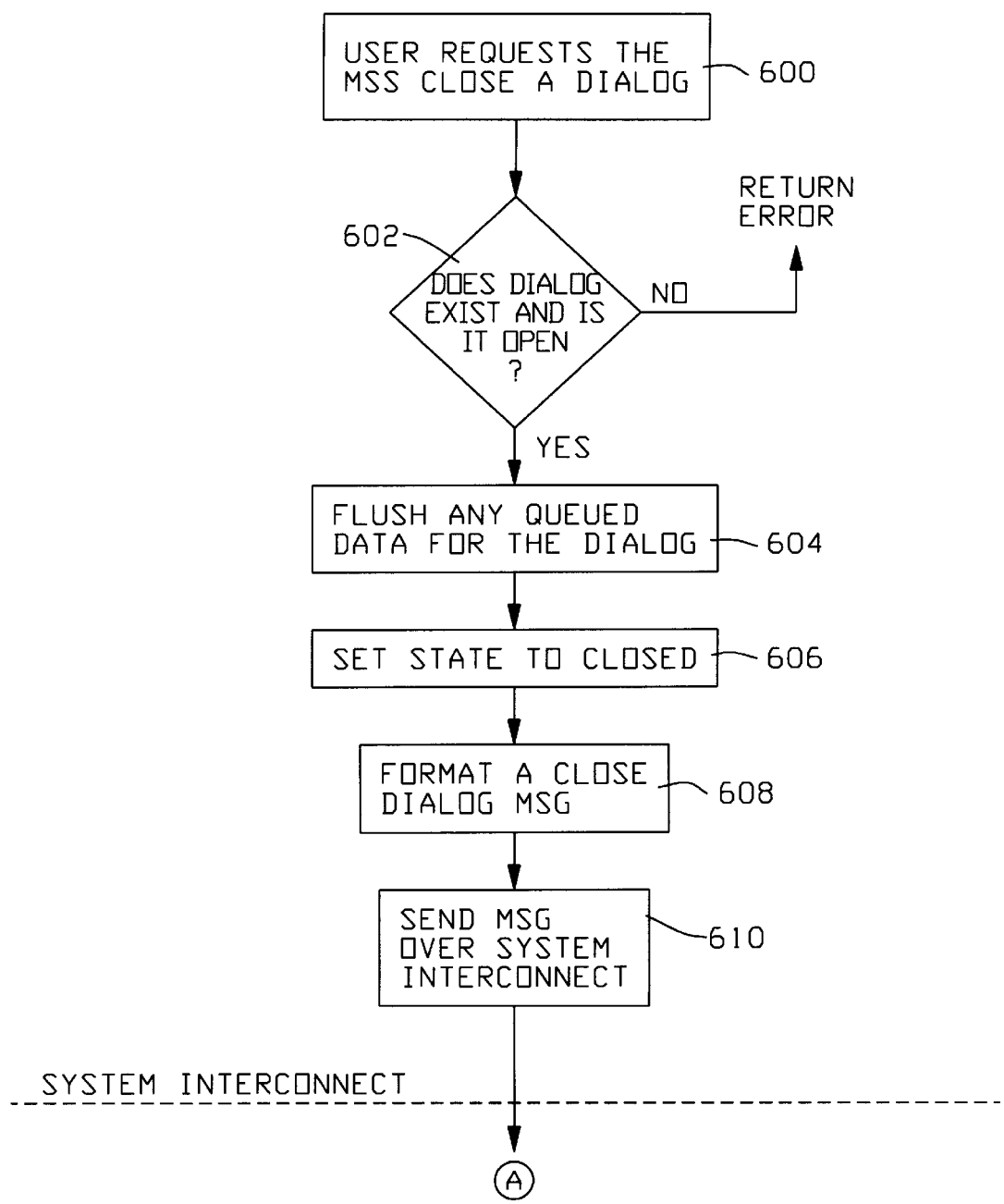
Figure 27C:
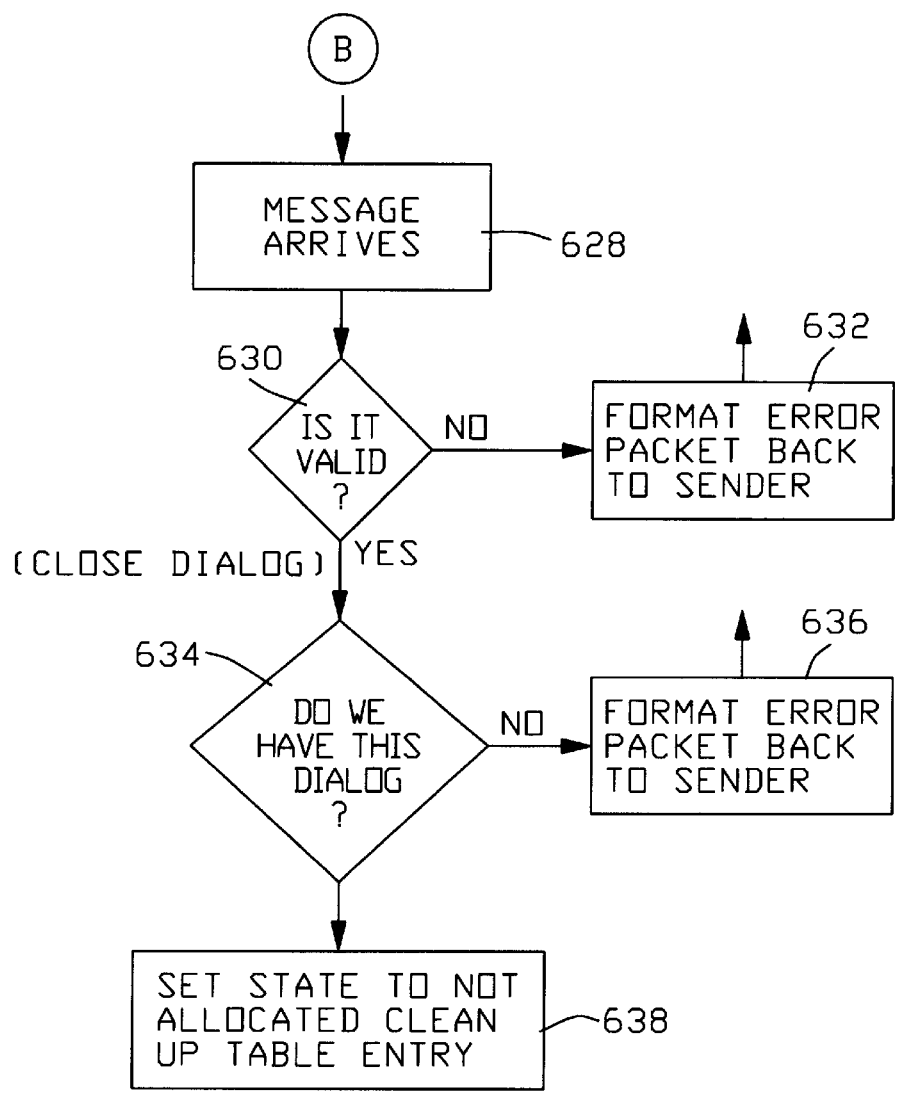

FIGS. 27(a)–27(c) illustrate dialog termination of the MSS_Endpoint_Dialog created in accordance with the invention. As illustrated in FIG. 27(a), termination begins at step 600 when the MSS user requests that MSS close a dialog. If it is determined at step 602 that the dialog to be closed does not exist or is not opened, an error code is returned; otherwise, any queued data for the dialog to be closed is flushed at step 604, and the MSS state is set to "closed" at step 606. A MSS_CLOSE_DIALOG message is then formatted at step 608 and sent over the interconnect at step 610. The MSS_CLOSE_DIALOG message is received at step 612 (FIG. 27(b)) and its validity is checked at step 614. If the message is invalid, a MSS_ERROR packet is returned to the sender at step 616; otherwise, it is determined at step 618 whether the dialog identified in the MSS_CLOSE_DIALOG message exists and is open. If the dialog does not exist or is closed, a MSS_ERROR packet is returned at step 620. If the dialog is present and open, at step 622 the MSS state is marked "REMOTE_CLOSED," and a MSS_CLOSE_RESPONSE message is formatted at step 624 and sent over the interconnect at step 626.

Finally, as illustrated in FIG. 27(c), when the MSS_CLOSE_RESPONSE message is received at step 628, its validity is checked at step 630, and, if invalid, a MSS_ERROR packet is returned to the sender at step 632. If the requested dialog is not found in the dialog table at step 634, a MSS_ERROR packet is returned to the sender at step 636. Otherwise, the dialog table entry is cleaned up at step 638.

Those skilled in the art will appreciate that the MSS dialog of the invention may be utilized by a number of MSS users in the transport layer. However, in a preferred embodiment of the invention, the MSS is invoked by a virtual transport layer ("VTL") protocol of the type described in the next section, as in the examples illustrated in the figures.

II. VIRTUAL TRANSPORT LAYER ("VTL")

This section describes the functionality and operation of the VTL and its interaction with the user and the MSS, which is, in turn, described in detail in section I above. Description of the VTL will be provided in three major areas: (1) Dialog Establishment, (2) Data Transfer, and (3) Dialog Termination. All interaction between the MSS and its user is accomplished through procedure calls—the MSS invokes the MSS user procedures described above and vice-versa.

As will be apparent from the following description, VTL implements a reliable, connection oriented transport layer protocol which minimizes the amount of headers that need to be appended to the data for it to reach its destination and to be reassembled. In particular, the data dialogs created using the messaging techniques described herein eliminate the need to put address data on every block of data and also permits the data blocks to be much larger. Other advantages of the techniques of the invention will be apparent from the following description.

A. Initialization, Recovery, and Shutdown of VTL

VTL-NT and VTL-MCP environments may initialize, shutdown (in an orderly fashion) or fail independent of any other environment. However, on certain platforms, it may be impossible for all actions to be independent. For example, in an emulated platform, a NT VTL component 94 cannot fail without MCP VTL component 90 failing since a NT VTL component 94 failure brings down the whole NT environment. However, the NT VTL component 94 only initializes and shuts down with NT initialization/shutdown; the NT VTL component 94 cannot be operated independently of the entire NT environment. In particular, the NT VTL component 94 cannot be terminated and reinitialized without the NT system 102 being reinitialized. This is because it is assumed that all TCP/IP dialogs were initiated through the NT VTL component 94, and hence that it knows about all files using TCP/IP. If this is not true, and the NT VTL component 94 receives a request for an unknown file, it will not be processed. If NT TCP/IP 58 is terminated independently from NT Shutdown, the NT VTL component 94 will also terminate and cannot be re-initialized without an NT restart.

1. Initialization

In order to be transparent to network applications, VTL must be positioned such that it can intercept any appropriate networking API requests. Obviously, this mechanism is dependent on the particular system environment in which VTL resides. In the preferred embodiment, VTL NT 94 accomplishes this by inserting itself as a filter-driver on top of the TCPIP.SYS driver 58; VTL MCP 90 accomplishes this by being tightly-coupled with the MCP TCP/IP transport provider implementation.

As noted above, it is the MSS's responsibility to establish communication with its counterpart in remote environments and to inform its local users about availability of remote MSS users and environments. When informed of availability of a NT VTL component 94, MCP VTL component 90 is responsible for initiating a handshake with NT VTL component 94 in order to allow further processing to occur. The handshake between the respective VTL components verifies compatibility between the two components and accomplishes exchange of critical initialization data.

2. Recovery

"Recovery" is the processing performed when communication with a remote environment is lost unexpectedly. MSS is responsible for detecting unavailability of a remote MSS user and informing the local MSS user of any such occurrence (via the User-Change-Notification procedure). On receiving this notification, the MCP VTL component 90 and the NT VTL component 94 perform appropriate processing on the loss of a remote environment. In particular, the surviving VTL component handles loss of a peer VTL component by cleaning up any VTL dialogs between itself on the unavailable peer. This includes dialogs which are fully established, dialogs in the process of being established, and dialogs in the process of being terminated.

3. Shutdown (Orderly)

No special processing is performed by either MCP VTL component 90 or NT VTL component 94 upon shutdown of the NT environment. The NT VTL component 94 does not, for example, inform the MCP VTL component 90 that it is shutting down. Instead, each relies on the other's recovery processing to accomplish desired results. When one VTL component shuts down, its peers are notified that each applicable MSS dialog has become unavailable, causing recovery processing as discussed above.

B. TCP Dialog Establishment

This section describes TCP dialog establishment using VTL based on which type of open operation (Passive Open versus Active Open) is initiated in the MCP environment by VTL in accordance with the techniques of the invention.

1. Virtual Transport Establishment

Figure 28A:
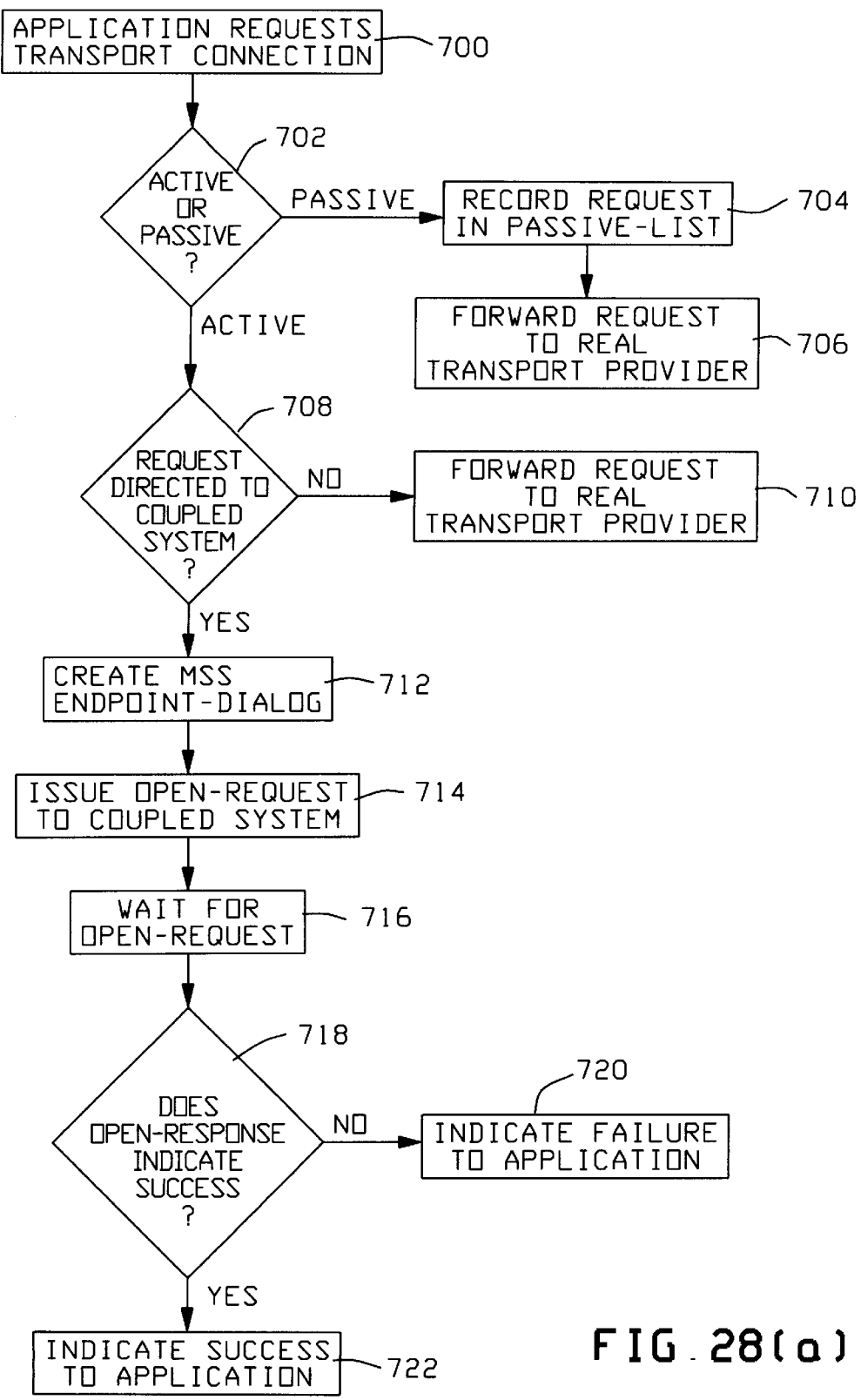
FIG. 28(a) illustrates virtual transport layer establishment in accordance with the invention.
Figure 28B:
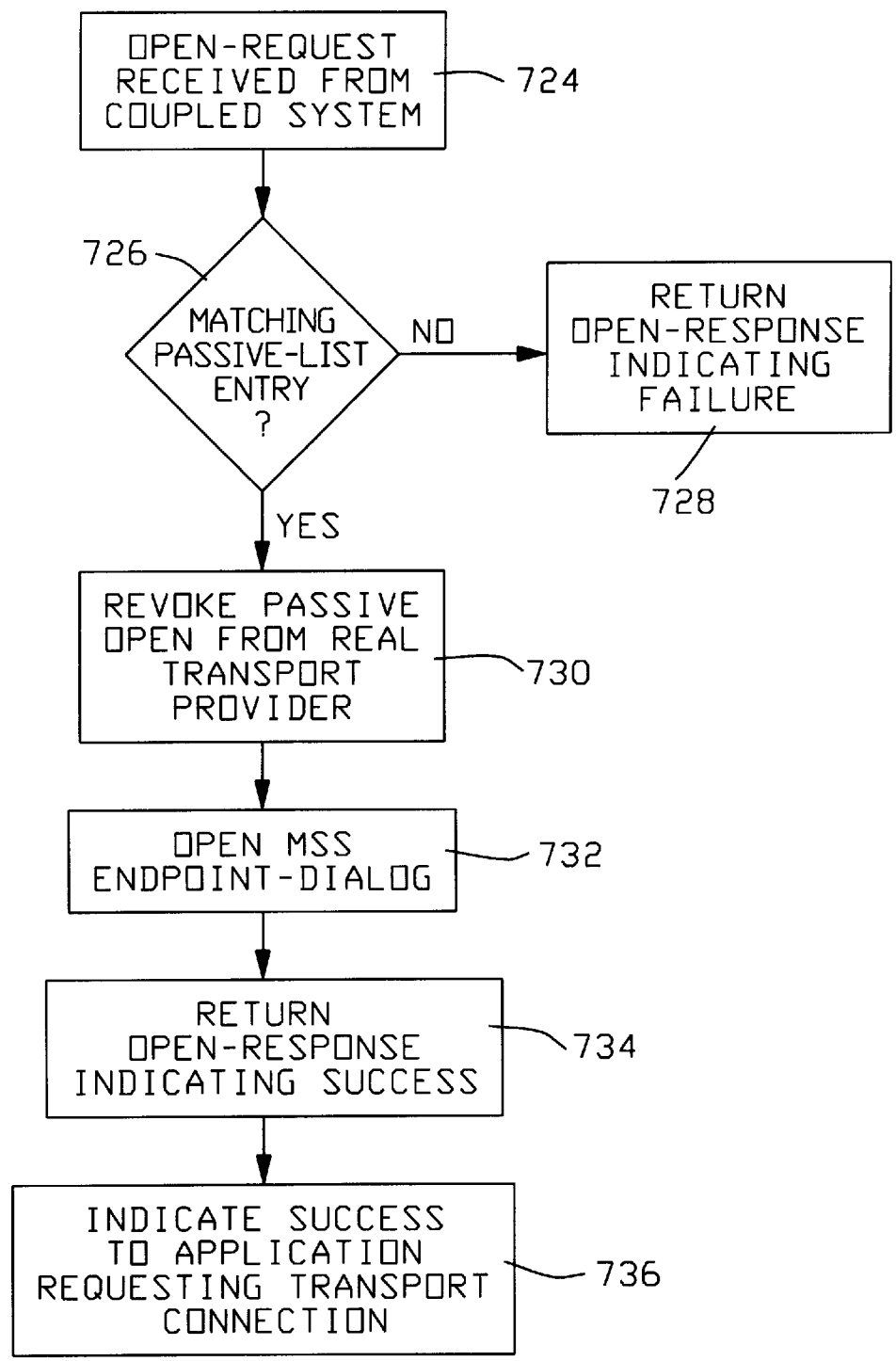
FIG. 28(b) illustrates the VTL Dialog Open Request processing performed by the coupled system receiving the VTL Dialog Open Request.

FIG. 28(*a*) illustrates virtual transport layer TCP establishment in accordance with the invention. As illustrated in FIG. 28(*a*), at step 700, an MCP or NT application requests a transport connection, and it is determined at step 702 whether the request is for an active TCP open or a passive TCP open transport connection. If the request is for a passive TCP open, the request is recorded at step 704 in the passive list and forwarded to the TCP/IP network transport provider at step 706. On the other hand, if the request is for an active TCP open, it is determined at step 708 whether the request is directed to the coupled system (i.e., the NT server 102 or the A Series server 100 of FIGS. 6–8) via the interconnect. If not, the request is forwarded to the TCP/IP network transport provider at step 710. However, if the request is directed to the coupled system via the interconnect, then an MSS Endpoint Dialog is created at step 712 and an open request is issued to the coupled system via the interconnect at step 714. The issuing system then waits for an open response at step 716. If the response received at step 718 indicates that the open was not successful, the failure is indicated to the requesting application at step 720; otherwise, the requesting application is informed at step 722 that the open was successful. The coupled systems may then communicate via the open connection over the interconnect.

FIG. 28(*b*) illustrates the open request processing performed on the side of the coupled systems receiving the open request. As illustrated, an open request is received from the coupled system at step 724, and it is determined at step 726 whether the open request matches a passive list entry of the receiving system. If not, a response indicating failure is returned at step 728. However, if the open request matches a passive list entry, the passive open is revoked from the regular network transport at step 730, and an MSS Endpoint Dialog is opened at step 732. A response is returned at step 734 indicating that the open request was processed successfully, and the "success" indication is returned to the requesting application at step 736.

FIG. 29 illustrates processing of MCP environment Passive Opens in accordance with the invention. As illustrated, the MCP environment application initiates processing by requesting a Passive Open via one of the existing APIs. As described above with respect to step 704 of FIG. 28(*a*), this Passive Open request is recorded by MCP VTL 90 for possible later use. In this scenario, an NT environment TDI-Client 98 requests, at a later time, a Directed Open (TDI-Connect) to match the MCP application's Passive Open. At that point, as illustrated in FIG. 29, NT VTL component 94 calls MSS_Create_Endpoint_Dialog. NT VTL component 94 then sends an Open Request to MCP VTL component 90 (using the control dialog). MCP VTL 90 then opens its side of the MSS_Endpoint_Dialog via MSS Open-Endpoint-Dialog. The MSS then issues a Dialog-Change (Available) command to MCP VTL component 90 and NT VTL component 94. MCP VTL component 90 responds with an Open-Response (Success) to NT VTL component 94 and issues an OpenComplete (Success) to the MCP environment application. Upon receiving the Open-Response (Success) command, NT VTL component 94 issues a TDI-Connect Complete to the TDI-Client 98 to complete the open processing.

Figure 30:
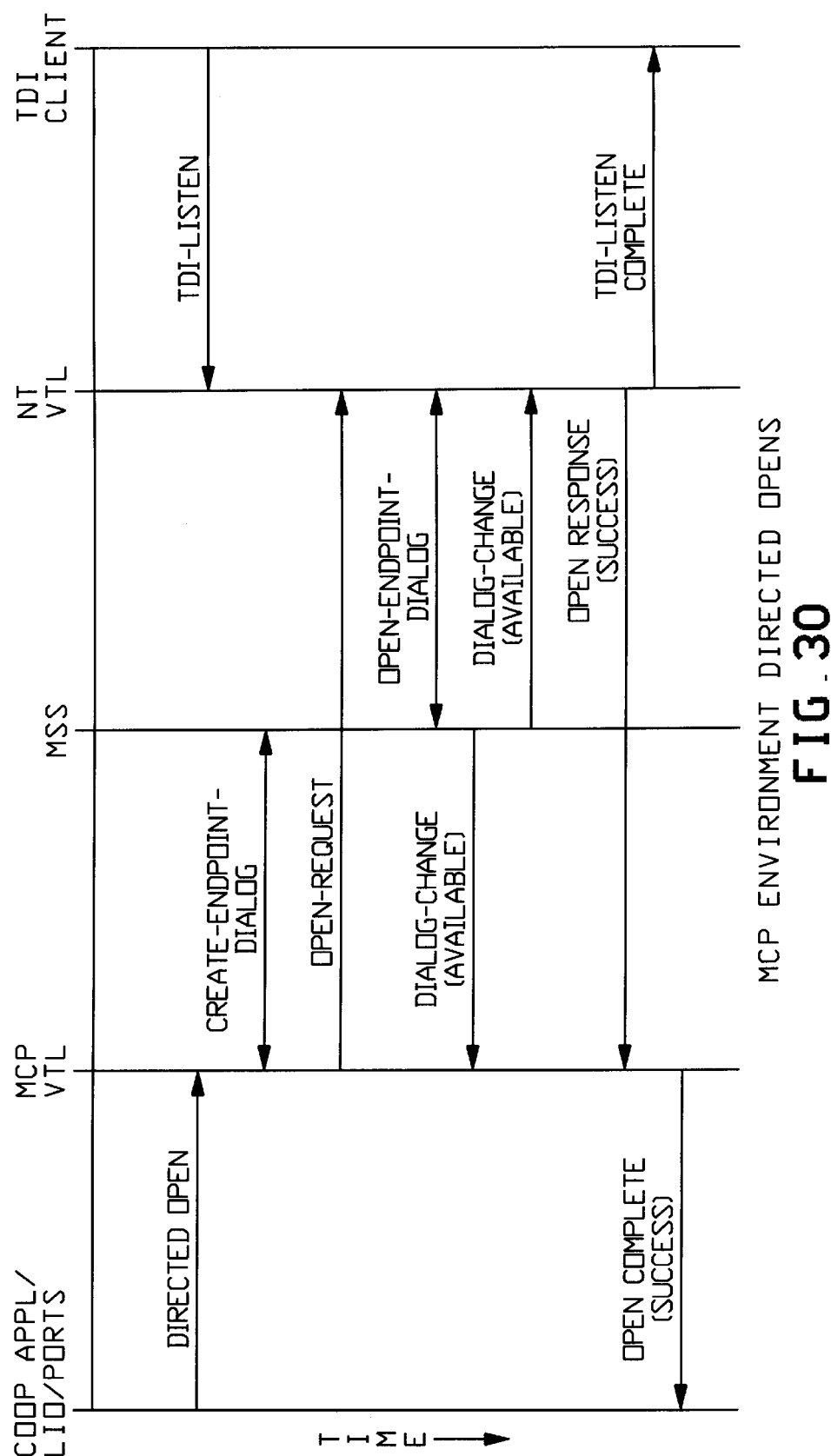
FIG. 30 illustrates the flow of TCP dialog establishment for VTL Directed (Active) Opens from the MCP environment when NT TCP/IP is not aware of the MCP environment IP addresses such that the IP addresses cannot be used as a local IP address in the NT environment.

FIG. 30 illustrates processing of MCP environment Active Opens in accordance with the invention. As illustrated, with the exception of API-dependent mechanisms, processing in this scenario is symetrical with the MCP environment Passive Open case just described.

2. VTL Data Transfer

By way of background, it should be noted that for input to MCP environment applications using Unisys Proprietary API models such as the LIO/Ports interface, all application data must be placed into an application-supplied buffer. Output is presented to networking software in an application-supplied buffer which cannot be referenced after returning control to the application. In the preferred MCP environment TCP/IP implementation, this requires copying all input and output application messages between application buffers and networking software controlled buffers. It should be further noted that one of the key aspects provided by the Unisys Proprietary API model cooperative (Coop) service interface is sharing of buffers between the application and network transport. This capability avoids data copies necessary when using the LIO/Ports interface of the type mentioned above.

Also by way of background, is should be noted that TDI output works in a manner similar to the Coop interface; the TDI-client-supplied buffer area is owned by the transport until the TDI-Client 98 is notified that the output (send) operation is completed. This completion notification is accomplished by a direct call from the NT I/O SubSystem into a client-supplied procedure when the NT transport completes the I/O operation. On TDI, TCP input may occur in any of the following ways (under control of the TDI-Client 98):

1. The TDI-Client 98 can be notified that input is available. This notification is accomplished by a procedure call from the TDI-Provider into the TDI-Client 98. On receiving notification, the TDI-Client 98 may do one of the following: a) accept the input, including copying it if necessary; b) provide the TDI-Provider with a TDI-Client buffer into which the TDI-Provider will copy the appropriate amount of data; or c) neither of the above. The TDI-Client's actions are indicated via return parameter values. For TCP data, if the client indicates action c), it must invoke one of the other mechanisms at some point.

2. The TDI-Client 98 can invoke an asynchronous receive operation, providing a buffer into which the transport copies input data. The TDI-Client 98 is notified when the receive operation is complete. Although a 'non-blocking' receive operation is defined in TDI, the implementation for TCP/IP does not appear to support the 'non-blocking' semantics (that is, to immediately complete the receive with an appropriate result if no data is present when the receive is invoked).

Figure 31:
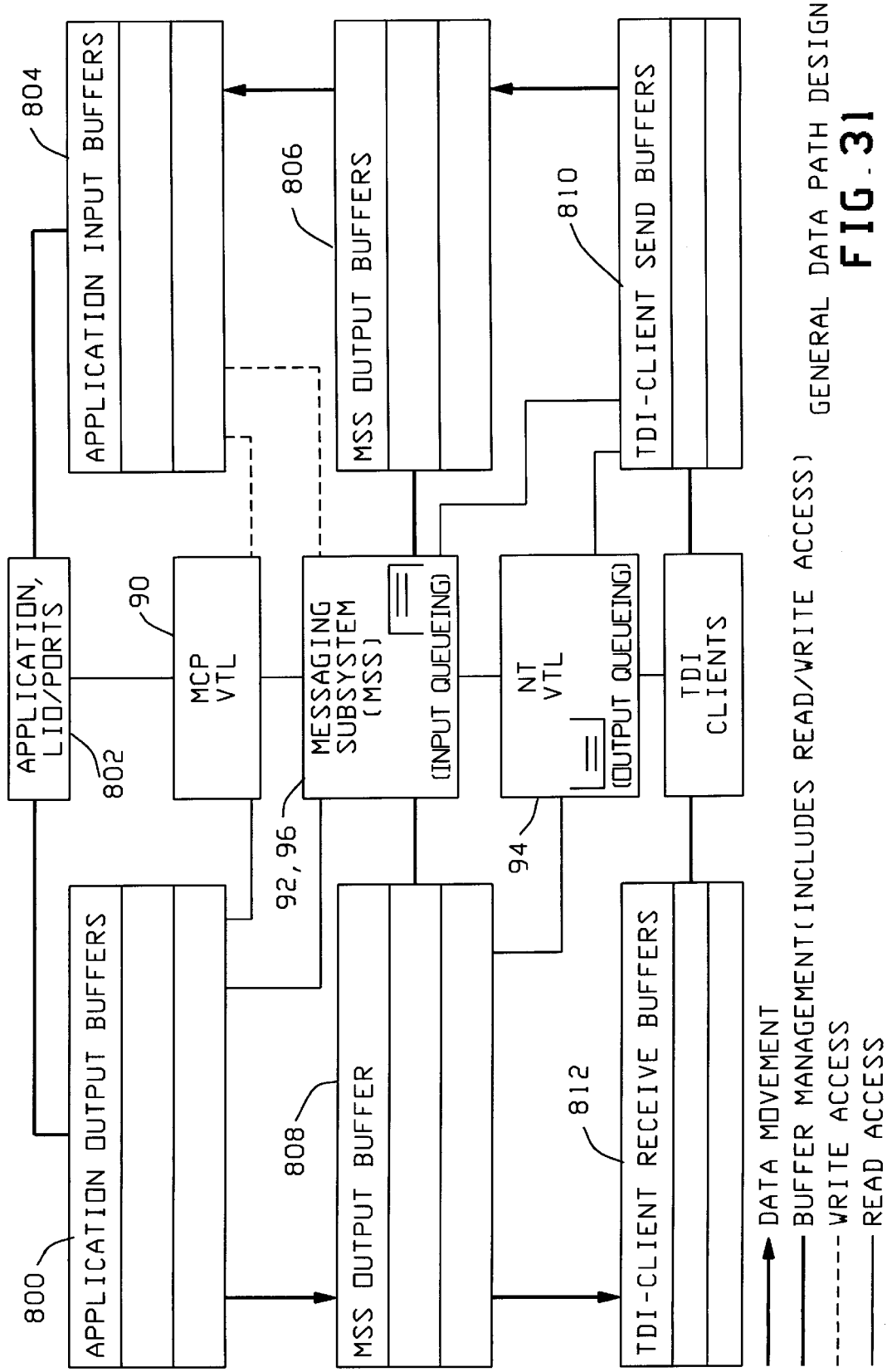
FIG. 31 illustrates VTL data transfer in accordance with the invention.

FIG. 31 depicts VTL data transfer in accordance with the invention. Output is shown on the left of FIG. 31, while input is shown on the right of FIG. 31. For simplicity, FIG. 31 shows only usage of the LIO/Ports API. Consideration of the Coop API involves sharing the application output buffers 800 which can be used as MSS output buffers 808 and sharing the MSS input buffers 806 which can be passed directly to Coop applications.

As illustrated in FIG. 31, application output buffers 800 may be buffers passed to MCP VTL component 90 on the Coop interface or buffers from the LIO/Ports interface 802, while application input buffers 804 are the buffers presented to MCP VTL component 90 for application reads and are applicable only on the LIO/Ports interface 802. MSS input buffers 806 and MSS output buffers 808 are owned and maintained by the MSS, with sharing capability with other components, including Coop applications and TDI-Client Receive buffers 812 and TDI-Client Send buffers 810 of the TDI-Client 98. In an MSS capable of sharing memory space between its NT and MCP environments, no data movement within the MSS is necessary and input/output buffers may be shared among the NT and MCP environments. It is also possible that sharing may be uni-directional (e.g., MSS output buffers 808 are shared but not MSS input buffers 806). When buffer sharing is not possible or practical, unique MSS input buffers 806 and MSS output buffers 808 may reside in both the MCP and NT environments with MSS (through its underlying interconnect) facilitating movement of data between the environments. While the MSS is responsible for management of buffers used for data storage, MCP VTL component 90 and NT VTL component 94 are responsible for flow control functions and manage movement of data to other components.

Figure 32:
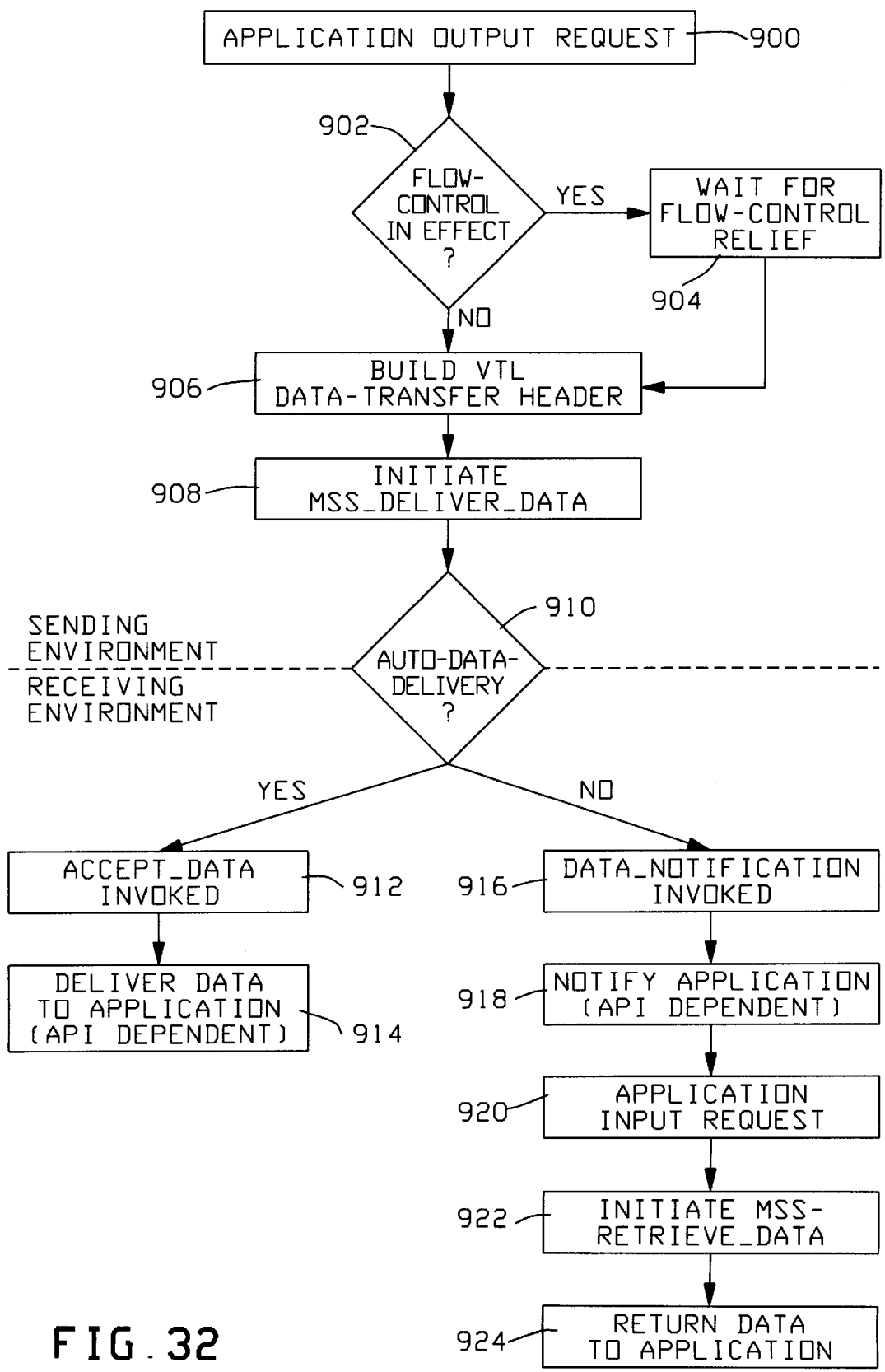
FIG. 32 illustrates VTL data transfer processing in accordance with the invention.

FIG. 32 illustrates VTL data transfer processing in accordance with the invention. As illustrated in FIG. 32, an application initiates a VTL data transfer request at step 900, and it is determined at step 902 whether flow-control is in effect. If so, the system waits for flow-control relief at step 904. At step 906, the VTL protocol header is built, and at step 908, the MSS Deliver Data request is initiated. If it is determined at step 910 that Auto-Data-Delivery is set, the receiving system invokes Accept-Data at step 912 and delivers data to the receiving application via the appropriate API at step 914 for processing. Otherwise, Data_Notification is invoked at step 916 and the application is notified through the proper API at step 918 that data is to be delivered. The application input request is then received at step 920 and MSS_Retrieve_Data is initiated at step 922. The data is then returned to the calling application at step 924.

Figure 33:
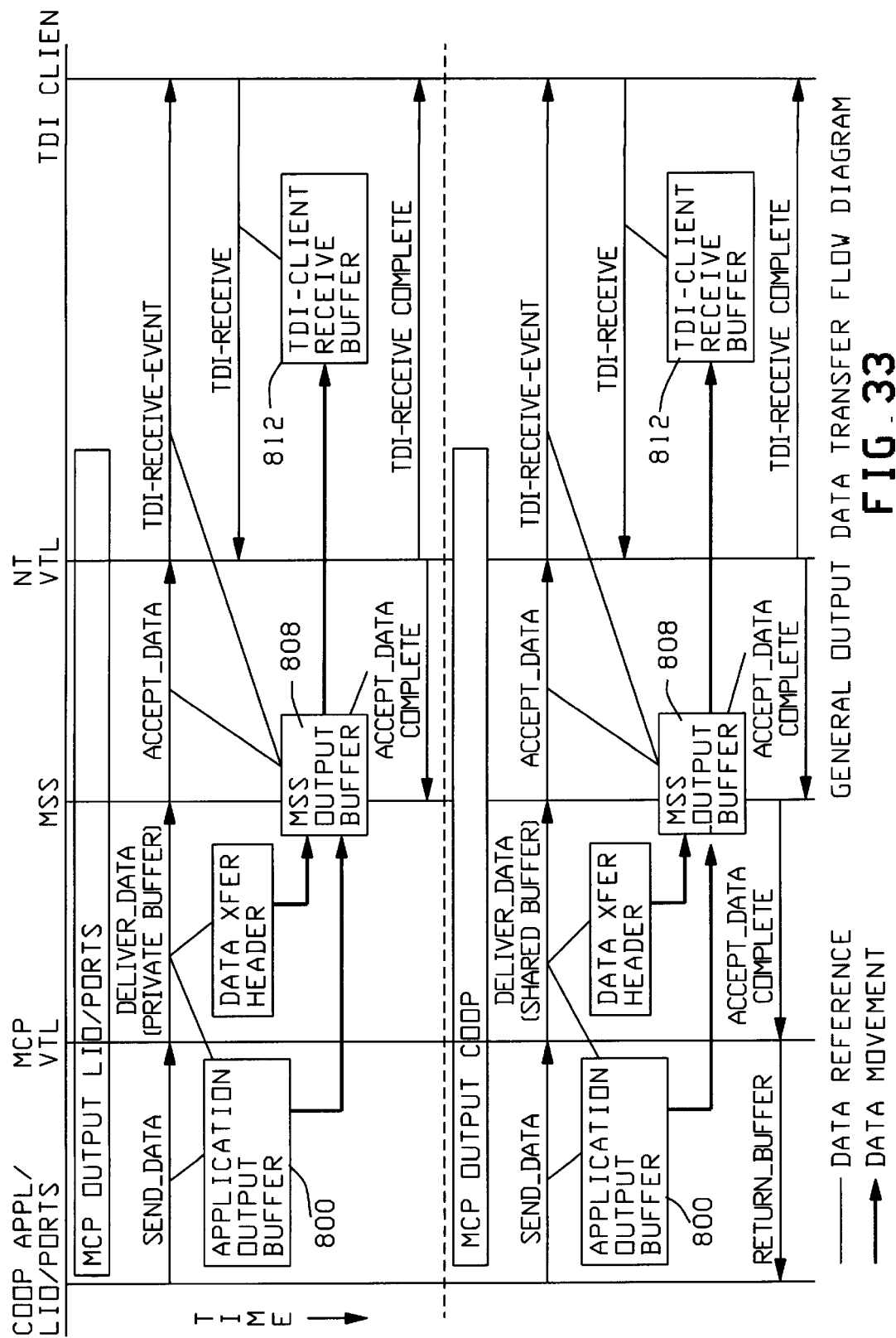
FIG. 33 illustrates normal VTL output data transfer flow from the MCP environment.

FIG. 33 illustrates normal VTL data transfer processing for output data from the MCP environment. The upper portion shows MCP environment output using the LIO/Ports API while the lower portion shows output using the Coop interface. NT environment processing is independent of the MCP environment API in use.

For LIO/Ports applications 802, MCP VTL component 90 is invoked with a length indicator and an application output buffer 800; Coop applications also invoke MCP VTL component 90 with a length indicator and an application output buffer 800, passing ownership of the buffer to MCP VTL component 90. In either case, MCP VTL component 90 first checks flow control conditions. If output is disallowed because of flow control conditions, the request is rejected without any further processing. If flow control conditions allow output, a Deliver-Data request is issued to MCP MSS 92, using the appropriate variant depending on which API is in use. MCP VTL component 90 includes a Data-Transfer-Header in the Deliver-Data request. The Data-Transfer-Header contains information needed by the NT VTL component 94 to properly process the data. If MCP MSS 92 rejects this request with a 'no resources' condition, the application request is rejected with no further processing. Otherwise (MCP MSS 92 does not reject the request), the Deliver-Data request is completed in an MSS implementation dependent manner. If the shared-buffer variant was requested, MCP MSS 92 provides MCP VTL component 90 with a Deliver-Data-Complete notification at an appropriate time. On receipt of the Deliver-Data-Complete, MCP VTL component 90 returns ownership of the output buffer 800 to the Coop application.

As a result of processing the Deliver-Data request from the MCP environment, NT MSS 96 issues one or more Accept-Data requests to the NT VTL component 94. The number of Accept-Data requests is dependent on the number of buffers MSS 96 required to receive the original data. Each Accept-Data request requires a corresponding Accept-Data-Complete notification from NT VTL component 94, as described below.

NT VTL component 94 processing of an Accept-Data request is dependent on the peer TDI-Client's requested behavior and status of past Data-Transfer requests. In this description, it is assumed that the TDI-Client 98 has no prior unaccepted data, has requested TDI-Receive event notification, and returns a TDI-Receive request in response to these event notifications. In this scenario, NT VTL component 94 invokes the native TDI-Client's receive event handler, indicating the entire content of the Accept_Data operation. The TDI-Client 98 (by definition) returns a TDI-Receive request which is adequate to receive all indicated data. On processing the TDI-Receive, NT VTL component 94 copies the data content into the TDI-Client 98 supplied buffer, invokes the local TDI-Client's completion routine (by completing the corresponding I/O SubSystem request), and invokes the MSS Accept_Data_Complete routine. On receipt of the Accept-Data-Complete notification, NT MSS 96 performs implementation dependent actions, including recycling the buffer.

VTL Data input is summarized in the flow diagram of FIG. 34. The upper portion shows MCP environment input using the LIO/Ports API 802 while the lower portion shows input using the Coop interface. NT environment processing is independent of the MCP environment API in use.

As illustrated in FIG. 34, MCP environment input begins with a TDI-Send operation initiated by the peer TDI-Client. TDI-Send semantics are such that the TDI provider (NT VTL component 94) owns the application output buffer 810 until indicating back to the TDI-Client 98 that the TDI-Send has been completed. Since NT VTL component 94 is the owner of the application output buffer 810, a shared-buffer Deliver-Data request is issued to NT-MSS 96. In this case, NT-MSS 96 at some later point delivers a Deliver-Data-Complete notification, at which point NT VTL component 94 provides the TDI-Client 98 with completion notice for the TDI-Send operation.

As a result of processing the Deliver-Data request from the NT environment, MCP MSS 92 issues one or more Accept-Data or Data-Notifications to MCP VTL component 90, depending on the number of buffers MSS 96 required to receive the original data.

Processing for a Data-Notification from MSS 96 results in an Input-Notification being issued to LIO/Ports. For processing of LIO/Ports input continues when the application performs a corresponding read (or LIO/Port resumes a waiting read). An application read, when data is present, results in a Retrieve-Data request being issued by LIO/Ports to MCP VTL 90. This Retrieve-Data request contains a user buffer and length indication and results in a corresponding private-buffer Retrieve-Data request being issued to the MCP MSS 92. MCP MSS 92 copies the appropriate amount of queued input data into the application's input buffer 804 and returns to MCP VTL component 90. MCP VTL component 90, in turn, performs its own completion processing and returns to LIO/Ports.

On receiving an Accept-Data request, MCP VTL component 90 forwards the input data to the Coop application via a Data-Indication. The Coop application, at some later point, invokes MCP VTL component 90 to return buffer ownership. MCP VTL component 90, in turn, notifies MCP MSS 92 that the Accept-Data operation has completed.

3. Orderly TCP Dialog Termination

FIG. 35(a) illustrates termination of a virtual transport layer connection in accordance with the invention. As illustrated, the application requests the disconnect at step 900 and issues a close request to the coupled system on the MSS ndpoint Dialog at step 902. At step 904, the requesting application waits for receipt of a close response and a close request from the coupled system. Upon receipt of the close response and close request, the MSS Endpoint Dialog is closed at step 906 and completion of the close is indicated to the requesting application at step 908.

FIG. 35(b) illustrates the close request processing performed by the system receiving the close request. As illustrated, the close request is received at step 910, and the corresponding application is notified at step 912 via the appropriate API for the interconnect. Receipt of the close request is recorded at step 914, and a close response is issued to the requesting application at step 916. The VTL connection is then closed.

Normal processing for orderly dialog termination initiated by the MCP environment is illustrated in FIG. 36. With the exception of API-dependent mechanisms, processing when termination is initiated by the NT environment is symetrical. As illustrated in FIG. 36, the MCP environment application initiates processing by performing an orderly Close operation via one of the existing APIs. The MCP VTL component 90 moves the transport connection's state to Close_Requested and issues a Close(Orderly) request to the NT VTL component 94. The Close request must be issued on the MSS_Endpoint_Dialog corresponding to this transport connection to ensure that any outstanding output is received by the NT VTL component 94 prior to receipt of the Close Request. Per normal semantics of networking APIs, the MCP environment application can no longer perform output operations, and any input received must be delivered to the application which can continue to perform input operations. On processing the Close Request, the NT VTL component 94 provides the TDI-Client 98 with a TDI-Disconnect-Event which, per normal networking API definition, informs the TDI-Client 98 that the remote application has requested orderly dialog termination. The NT VTL component 94 then issues a Close-Response to the MCP VTL component 90. The Close-Response is issued on MSS Control-Dialog as it does not need to be in sequence with data originating from the NT environment. On processing the Close-Response, the MCP VTL component 90 simply records the fact that the Close-Response has been received for future usage. Per normal network application behavour, the TDI-Client 98 initiates a corresponding request for orderly dialog termination (TDI-Disconnect). Per normal networking API semantics, the TDI-Client 98 may perform additional output operations prior to requesting dialog termination.

The NT VTL component 94, on processing the orderly termination request, issues a Close(Orderly) request to the MCP VTL component 90. As with the MCP VTL component's Close-Request, this Close-Request must also be issued on the MSS_Endpoint_Dialog corresponding to the transport connection. On processing the Close-Request, the MCP VTL component 90 moves the transport connection's state to CLOSED (thus completing the MCP application's termination request) and issues a Close-Response to the NT VTL component 94. The MCP VTL component 90 then invokes the MSS to close its side of the MSS_Endpoint_Dialog corresponding to this transport connection.

On processing the Close-Response from the MCP VTL component 90, the NT VTL component 94 notifies the TDI-Client 98 that its termination request has been successfully completed (TDI-Disconnect-Complete) and invokes the MSS to close the corresponding Endpoint-Dialog. Each VTL component is notified independently when the MSS_Endpoint_Dialog is Closed. This notification triggers final processing, including deallocation of resources. Depending on actual timing, MSS may inform the VTL components that the MSS_Endpoint_Dialog has been closed by the remote side prior it the local side requesting a close.

Excluded from the above description for simplicity is consideration for outstanding data flow during orderly dialog termination. Due to flow control, output data may be outstanding when an application request orderly termination. Per semantics of the termination request, this data must be delivered properly before completing the termination process. Likewise, input data may be outstanding when a Close-Request is received. Normal networking APIs allow applications to retrieve this data while orderly dialog termination is in progress. Any VTL implementation must handle these scenarios appropriately.

4. Abortive TCP Dialog Termination

Normal processing for abortive dialog termination initiated by the NT environment is shown in FIG. 37. With the exception of API-dependent mechanisms, processing when termination is initiated by the MCP environment is symetrical. As illustrated in FIG. 37, the NT environment application initiates processing by requesting an abortive dialog termination (TDI-Disconnect, specifying the Abortive option). On processing this request, the NT VTL component 94 issues a Close-Request(Abortive) to the MCP VTL component 90. This close request is issued on the MSS control dialog because (unlike orderly termination described above), normal networking API semantics for abortive dialog termination do not ensure completion of any previous data transfer requests. The NT VTL component 94 also immediately completes the application's request (TDI-Disconnect-Complete). On processing the Close-Request, he MCP VTL component 90 moves the transport connection's state to Deactivation-Pending which, per normal networking API definition, informs the MCP application that the tranport dialog is no longer available. The MCP VTL component 90 issues a Close-Response to the NT VTL component 94 and invokes the MSS to close its side of the MSS_Endpoint_Dialog corresponding to this transport connection. On processing the Close-Response, the NT VTL component 94 invokes the MSS to close its side of the MSS_Endpoint_Dialog corresponding to this transport connection. Each VTL component is notified independently when that the MSS_Endpoint_Dialog is Closed. This notification triggers final processing, including deallocation of resources. Depending on actual timing, MSS may inform the VTL components that the MSS_Endpoint_Dialog has been closed by the remote side prior it the local side requesting a close.

Excluded from the above description for simplicity are the following important considerations, and any VTL implementation must handle these scenarios appropriately: (1) outstanding data flow: As mentioned with orderly termination, data may be outstanding when abortive dialog termination is initiated. However, unlike orderly termination, outstanding data may be discarded as part of abortive dialog termination; (2) partially established dialogs: Abortive termination may be initiated at any point during dialog establishment; and (3) overriding orderly termination: Abortive termination may be initiated at any point during orderly dialog termination.

C. VTL Protocol

In a preferred embodiment of the invention as described above for the Unisys ClearPath HMP NX enterprise server, the VTL protocol is designed to optimize performance of the MCP components (at the cost of potentially decreasing performance of the NT components). To this end, field container sizes and alignments are selected to be favorable for MCP environment manipulation.

1. Common VTL Data Structures

The data structures used in the VTL protocol are described in this section.

String-Structure

Character strings are transmitted with the following format:

Field: String-Length

Data Type: Unsigned Integer

Length: 2 bytes

Description: Specifies the number of bytes in the String-Value field which follows.

Field: String-Value

Data Type: Array of characters.

Length: As specified by String-Length field.

Description: The character string value.

IP-Address-Structure

The IP version in which the IP address is formatted is as follows:

Field: IP-Version

Data Type: Unsigned Integer

Length: 1 byte

Description: Identifies the IP version this IP-Address is formatted in.

Field: Pad

Data Type: Not applicable.

Length: 1 byte

Description: This field is used to maintain byte-alignment of fields favorable for MCP environment interpretation of this data structure.

Field: IP-Address

Data Type: Array of 1-byte, unsigned integers.

Length: When IP-Version is 4, length is 4 bytes.

Description: The IP address.

2. VTL Control Message Interfaces

All control messages contain, at their start, the header described below.

VTL Control Message Header

Field: Interface-Level

Data Type: Unsigned integer

Length: 2 bytes

Description: Identifies the level of interface this message contains.

Field: Message-Class

Data Type: Unsigned integer

Length: 2 bytes

Values: REQUEST=1; RESPONSE=2; NOTIFICATION=3

Description: Identifies the class for this message. A REQUEST contains a request for action. A RESPONSE is the result of completing processing for a REQUEST. A NOTIFICATION provides unsolicited information.

Field: Message-Type

Data Type: Unsigned Integer

Length: 2 bytes

Values: For requests/responses: HANDSHAKE; OPEN-CONNECTION;CLOSE-CONNECTION; OPEN-CONNECTION-ABORT For notifications: CREDIT-ADJUSTMENT Description: Identifies the type of message—with class, provides unique identification for all messages. A RESPONSE to a REQUEST contains the same Message-Type as the corresponding request.

Field: Message-Length

Data Type: Unsigned Integer

Length: 6 bytes

Description: The length, in bytes, of this message (including the header).

Field: Request-Reference

Data Type: Unsigned Integer

Length: 6 bytes

Description: In a request, a requester specified value which will be returned in the corresponding response. Its value is completely transparent to all modules except the requester. In a notification, its value is irrelevant but should be set to all zeros.

Field: Requester-Connection-Reference

Data Type: Unsigned Integer

Length: 6 bytes

Description: In a message which is applicable to an individual Connection, this field contains the requester's assigned reference value for that Connection. The requesting VTL component provides the responding VTL component with this value in its OPEN-CONNECTION request. When the message does not apply to a particular Connection, its value must be all zeros.

Field: Responder-Connection-Reference

Data Type: Unsigned Integer

Length: 6 bytes

Description: In a message which is applicable to an individual Connection, this field contains responder's assigned reference value for that Connection. The responding VTL component provides the requesting VTL component with this value in its OPEN-CONNECTION response. When the message does not apply to a particular Connection, its value must be all zeros. Also, in both the OPEN-CONNECTION and OPEN-CONNECTION-ABORT requests, its value must be zeroes because the requesting VTL component does not yet know the responder's assigned value.

Field: Status

Data Type: Unsigned Integer

Length: 4 bytes

Description: In a response message, provides the response/error code for the requested operation. For all other message classes, this value must be all zeros.

Field: Pad

Data Type: Not applicable.

Length: 2 bytes

Description: This field is used to maintain byte-alignment of fields favorable for MCP environment interpretation of fields which follow this header.

Close-Connection Request/Response

This request is issued to close (and destroy) a VTL Connection. Close requests and their resultant responses are always issued on MSS_Endpoint_Dialogs.

In addition to the control message header, this request contains the following fields:

Field: Close-Type

Data Type: Unsigned Integer

Length: I byte

Values: ORDERLY; ABORTIVE

Description: Specifies whether an orderly or an abortive close should be performed.

Any of the following status codes may be returned: STATUS-SUCCESS indicates that the request was completed successfully; STATUS-ALREADY-CLOSED indicates that the target connection is already closed; STATUS-ALREADY-CLOSING indicates that a close operation of this type (orderly/abortive) has already been initiated or that an orderly close was requested when an abortive close was already in progress. There are no fields other than the control message header for any of these responses.

Handshake Request/Response

This request is issued by the MCP VTL component 90 to initialize communication with an NT VTL component 94. In addition to the control message header, this request contains the following fields:

Field: MCP-VLAN-IP-Address

Data Type: IP-Address-Structure

Description: This field is used by the MCP VTL component 90 to provide the NT VTL component 94 with the MCP environment's VLAN IP address corresponding to the target NT environment.

Field: MCP VTL Version

Data Type: String-Structure

Description: A string identifying the version (e.g., software level) of the VTL component. This value is used for diagnostic purposes only. Any of the following status codes may be returned: STATUS-SUCCESS indicates that the Handshake request was successful and STATUS-INCOMPATIBLE-INTERFACE-LEVEL indicates that the NT VTL component 94 does not understand the specified interface level. When STATUS-SUCCESS is returned, the following fields are present after the control message header:

Field: NT-VLAN-IP-Address

Data Type: IP-Address-Structure

Description: This field is used by the NT VTL component 94 to provide the MCP VTL component 90 with the NT environment's VLAN IP address.

Field: NT VTL Version

Data Type: String Structure

Description: A string identifying the version (e.g., software level) of NT VTL component 94. This value is used for diagnostic purposes only.

When STATUS-INCOMPATIBLE-INTERFACE-LEVEL is returned. the following fields are present after the control message header:

Field: Supported-Interface-Level

Data Type: Unsigned Integer

Length: 2 bytes

Values: Indicates the highest interface level, less than the requester's specified interface level, which is supported by the responder. The MCP VTL component 90 may attempt another handshake at that interface level or lower.

Open-Connection Request/Response

This request is issued to create and open a VTL Connection. In addition to the control message header, this request contains the following fields:

Field: Pad

Data Type: Not applicable.

Length: 1 byte

Description: This field is used to maintain byte-alignment of fields favorable for MCP environment interpretation of fields in this data structure. One or more Pad fields may be included.

Field: Local-Port-Number

Data Type: Unsigned integer

Length: 2 bytes

Description: Specifies the local Port Number to be used for this Connection. In all cases, a zero value is permitted completion of the open operation results in selection of a local Port Number.

Field: Remote-Port-Number

Data Type: Unsigned integer

Length: 2 bytes

Description: Specifies the remote Port Number to be used for this Connection.

Field: Receive-Credit-Limit

Data Type: Unsigned integer

Length: 4 bytes

Description: The number of receive credits initially available to the responder.

Field: My-MSS-Dialog-Id

Data Type: MSS-Dialog-Id

Description: Specifies the requester's MSS dialog id for the Endpoint-Dialog to be used with the Connection.

Field: Local-IP-Address

Data Type: IP-Address-Structure

Description: Specifies the local IP address to be used for this Connection. A zero value is permitted completion of the open operation results in selection of a local IP address.

Field: Remote-IP-Address

Data Type: IP-Address-Structure

Description: Specifies the remote system to connect to (this will always be the responder's VLAN IP address).

Any of the following status codes may be returned: STATUS-SUCCESS indicates that the request was completed successfully; STATUS-INSUFFICIENT-VTL-RESOURCES indicates that VTL was not able to procure resources required to complete this request; STATUS-INSUFFICIENT-RESOURCES indicates that some underlying system component was not able to procure resources required to complete this request; STATUS-CONNECTION-REFUSED indicates that the transport connection attempt was refused by the remote system; STATUS-NETWORK-UNREACHABLE indicates the remote network is not reachable by the transport; STATUS-HOST-UNREACHABLE indicates the remote system is not reachable by the transport.

When STATUS—SUCCESS is returned, the following fields are present after the control message header (none of the other responses contain data fields):

Field: Local-Port-Number

Data Type: Unsigned integer

Length: 2 bytes

Description: Indicates the local port number for this connection.

Field: Remote-Port-Number

Data Type: Unsigned integer

Length: 2 bytes

Description: Indicates the remote port number for this connection.

Field: Pad

Data Type: Not applicable.

Length: 2 bytes

Description: This field is used to maintain byte-alignment of fields favorable for MCP environment interpretation of fields in this data structure. One or more Pad fields may be present.

Field: Send-Credit-Limit

Data Type: Unsigned integer

Length: 4 bytes

Description: The number of send credits initially available to the requester.

Field: Local-IP-Address

Data Type: IP-Address-Structure

Description: Indicates the local IP address for this connection.

Field: Remote-IP-Address

Data Type: IP-Address-Structure

Description: Indicates the remote IP address for this connection.

Open-Connection-Abort Request/Response

This request is used to abort an in-progress Open-Connection operation. It should be noted that the Open-Connection operation may have been completed in the responding environment but not yet reflected in the requesting environment.

In the request, there are no data fields (other than the control message header). Only STATUS-SUCCESS may be returned, indicating that the request was completed successfully. When STATUS-SUCCESS is returned, the following fields are present after the control message header:

Field: Open-Completed

Data Type: BOOLEAN

Length: 1 byte

Values: 0(=>FALSE)
1(=>TRUE)

Description: Indicates whether the original Open-Connection had been completed in the responder's environment.

3. Data Transfer Interfaces

All data transfers between VTL components include a Data Transfer Header. When the MSS completes a data transfer in multiple pieces, the Data Transfer Header is included only in the first piece. The data transfer header for data transfer includes the following fields:

Field: Interface-Level

Data Type: Unsigned Integer

Length: 2 bytes

Description: Identifies the level of interface this message contains.

Field: Credited-Adjustment

Data Type: Signed Integer
Length: 4 bytes
Description: Indicates piggy-back credit grants or reductions.
The most significant bit is used for sign (one is negative); the remaining bits indicate credits granted/reduced. This value may be zero.
Field: Sequence-Number
Data Type: Unsigned Integer
Length: 4 bytes
Description: The sequence number for this data transfer operation—each data transfer operation is numbered sequentially starting at one and wrapping around as needed.
Field: Data-Flags
Data Type: Bit Mask
Length: 2 bytes
Description: Contains individual flags as defined below:
ENTIRE-MESSAGE—maps to usage of the PUSH flag.
URGENT-DATA—indicates that this data transfer contains urgent data.

Those skilled in the art will appreciate that the present invention is not limited to use with only one network protocol provider on each system. Rather, the present invention can be used to transfer data to and from multiple network protocol providers on each system. In addition, those skilled in the art will appreciate that the present invention is intended to provide communications over interconnects having 2 or more endpoints. For example, the interconnect may be a network such as a LAN or a plurality of interconnects which connect several closely coupled computer systems independent of conventional network protocols.

Also, it is understood that changes may be made to the embodiments described above without departing from the broad inventive concepts thereof. For example, while the present invention is described above in the context of a system comprising an A Series server and an NT server, it is understood that the methods and apparatus of the present invention can be employed with any closely coupled computer systems, whether of the same or different types. Additionally, the interconnection of the present invention is not limited to the particular embodiments disclosed. Rather, the term "interconnection" is intended to encompass other methods and apparatus for transferring data between the I/O subsystems of the first and second computer systems. For example, other embodiments may not require the functionality of the QSP and LANSG components. Rather, a more direct interface between the interconnection device driver (ICD) and the MSS and VTL could be employed. Accordingly, the present invention is not limited to the particular embodiments disclosed, but is intended to cover all modifications that are within the spirit and scope of the invention as defined by the appended claims.

What is claimed is:

1. Apparatus which enables a first network application, executing on a first computer system, and a second network application, executing on a second computer system which is directly interconnected and closely coupled to the first computer system, to communicate with each other without affecting the first and second network applications, said first and second computer systems being heterogeneous, said apparatus comprising:

an interconnection coupling an input/output (I/O) subsystem of the first computer system to an I/O subsystem of the second computer system and over which data can be transmitted between the first and second computer systems independent of a network interface card; and an interconnection messaging system executing on the first and second computer systems that provides general purpose transport interfaces and that simulates a predetermined transport layer protocol to the first and second network applications whereby said first and second network applications may communicate in a manner which is transparent to the first and second network applications.

2. The apparatus as in claim 1, wherein the interconnection between the I/O subsystem of the first computer system and the I/O subsystem of the second computer system comprises a physical connection between the I/O subsystems over which data can be transmitted.

3. The apparatus as in claim 1, wherein the interconnection messaging system includes a messaging subsystem ("MSS") which provides said general purpose transport interfaces, said general purpose transport interfaces being independent of communication protocols of the interconnection, and which provides further interfaces on either end of the interconnection which are dependent on the communication protocols of the interconnection, whereby only the further interfaces must be changed when the interconnection is changed.

4. Apparatus as in claim 3, wherein the MSS includes an MSS component on each of said first and second computer systems, each MSS component having at least one local MSS user connected thereto through said independent transport interface, an MSS component on the first computer system creating a dialog to each complementary remote MSS user of the second computer system.

5. Apparatus as in claim 4, wherein each MSS component includes means for building dialog tables for local MSS users informing the local MSS users about any complementary remote MSS users accessible via the interconnection and for updating said dialog tables as complementary remote MSS users are added or removed.

6. Apparatus as in claim 4, wherein each MSS component includes means for performing dialog management functions which allow the local MSS users to establish, receive status about, and destroy dialogs with the complementary remote MSS users over the interconnection.

7. Apparatus as in claim 4, wherein each MSS component includes means for performing control message functions which allow the local MSS users and the complementary remote MSS users to pass control messages to each other in a manner which is independent of the communication protocols of the interconnection.

8. Apparatus as in claim 4, wherein each MSS component includes means for transferring data between local and complementary remote MSS users over data dialogs established between said local and remote MSS users.

9. Apparatus as in claim 4, wherein one of said local and one of said complementary remote MSS users are complementary virtual transport layer ("VTL") components which simulate said predetermined transport layer protocol so that the first and second network applications may communicate with each other over the interconnection in a manner which is transparent to the first and second applications.

10. The apparatus of claim 9, wherein said complementary VTL components provide transport dialog establishment, data transfer, and transport dialog termination between said first and second computer systems using the MSS.

11. Apparatus as in claim 9, wherein said VTL components respectively interface with said first and second network applications, and said VTL components are implemented on the first and second computer systems as complementary MSS users which are connected to the MSS through the independent transport interfaces of the MSS.

12. Apparatus as in claim 11, wherein each MSS component includes means for performing control message functions which allow the local VTL component and the complementary remote VTL component to create a reliable control dialog over which the complementary VTL components may exchange message sequences to coordinate creating and opening dialogs.

13. Apparatus as in claim 12, wherein when data is to be transferred from said first network application to said second network application over said interconnection, said VTL component interfaced to said first network application appends a VTL data transfer header to data to be transferred to said second network application and initiates a data transfer over said open dialog.

14. A method for enabling a first network application, executing on a first computer system, and a second network application, executing on a second computer system which is directly interconnected and closely coupled to the first computer system via an interconnection between an input/output (I/O) subsystem of the first computer system and an I/O subsystem of the second computer system to transmit data therebetween independent of a network interface card and in the native protocols of the first and second network applications, comprising the steps of:

- simulating a predetermined transport layer protocol to the first and second network applications on the respective first and second computer systems;
- creating a dialog over the interconnection through which the first and second network applications may communicate in a manner which is transparent to the first and second network applications;
- opening the dialog for data transfer between the first and second network applications;
- applying to the data to be transferred a data transfer header; and
- transferring the data and the data transfer header over the interconnection via the open dialog.

15. The method of claim 14, comprising the additional steps of creating a plurality of dialogs over the interconnection for a plurality of pairs of said first and second applications whereby the applications in each pair may communicate in a manner which is transparent to the native protocols of the first and second applications in the pair, and specifying the dialog which is to be used for the data transfer between the applications in the pair.

* * * * *